United States Patent [19]

Niemann

[11] 4,302,818
[45] Nov. 24, 1981

[54] MICRO-VECTOR PROCESSOR

[75] Inventor: George W. Niemann, Dallas, Tex.

[73] Assignee: Texas Instruments Incorporated, Dallas, Tex.

[21] Appl. No.: 56,361

[22] Filed: Jul. 10, 1979

[51] Int. Cl.³ ............................................. G06F 7/38
[52] U.S. Cl. .................................... 364/736; 364/200
[58] Field of Search ........................ 364/736, 200, 715

[56] References Cited

U.S. PATENT DOCUMENTS

| | | | |
|---|---|---|---|
| 3,794,984 | 2/1974 | Deerfield et al. | 364/200 |
| 4,128,880 | 12/1978 | Cray, Jr. | 364/200 |
| 4,172,287 | 10/1979 | Kawabe et al. | 364/736 |

Primary Examiner—David H. Malzahn
Attorney, Agent, or Firm—Thomas G. Devine; Melvin Sharp; N. Rhys Merrett

[57] ABSTRACT

A micro-vector processor has an input and output section, a supervisor section, a vector unit section, and a memory common to all of the sections and accessible by each. The signals to be processed are supplied by the input section in digital form to the data memory unit. The supervisor section is programmable and acts as the overall micro vector processor control processor. The supervisor unit sets up, starts, and monitors the actual signal processor, the vector unit. The supervisor orders the vector unit to go to a reserve location in the data memory unit where it finds the beginning address of a command-parameter list (CPL) previously loaded into data memory by the supervisor unit, containing the name of, and the parameters for, the utility algorithm which the vector unit is to execute. The algorithms that the vector unit performs are contained in the form of micro instructions in a read-only memory (ROM) which controls the operation of the vector unit. The vector unit sends results to the data memory unit and informs the supervisor that its task has been completed. The results are sent from the data memory to the output section.

The vector unit, once started by the supervisor unit, is completely autonomous from the supervisor unit. The supervisor unit may control a plurality of vector units by simply invoking each one which then runs autonomously. Also, the entire micro-vector processor may be connected in an array with other micro-vector processors to form a distributed signal processing system.

31 Claims, 55 Drawing Figures

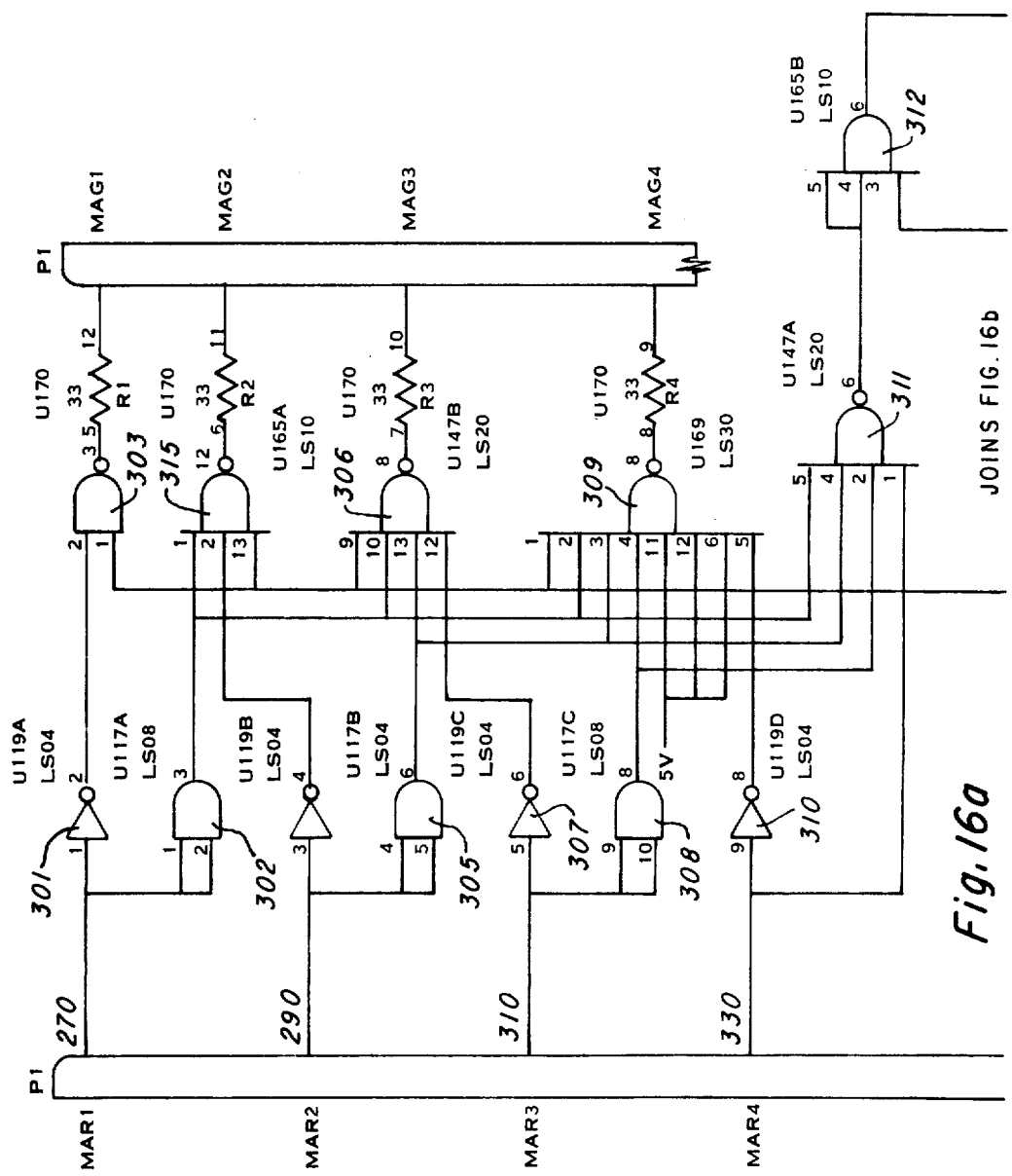

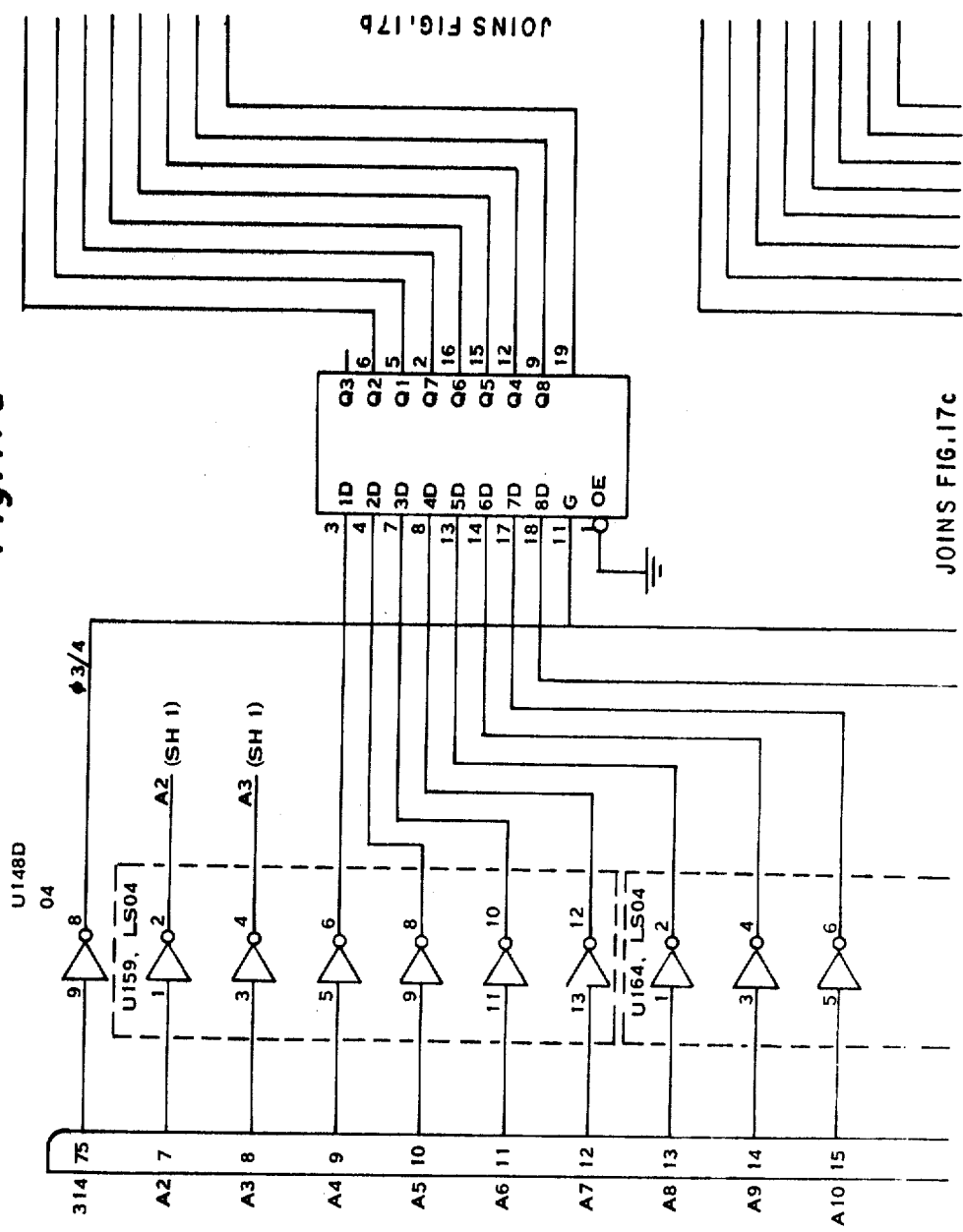

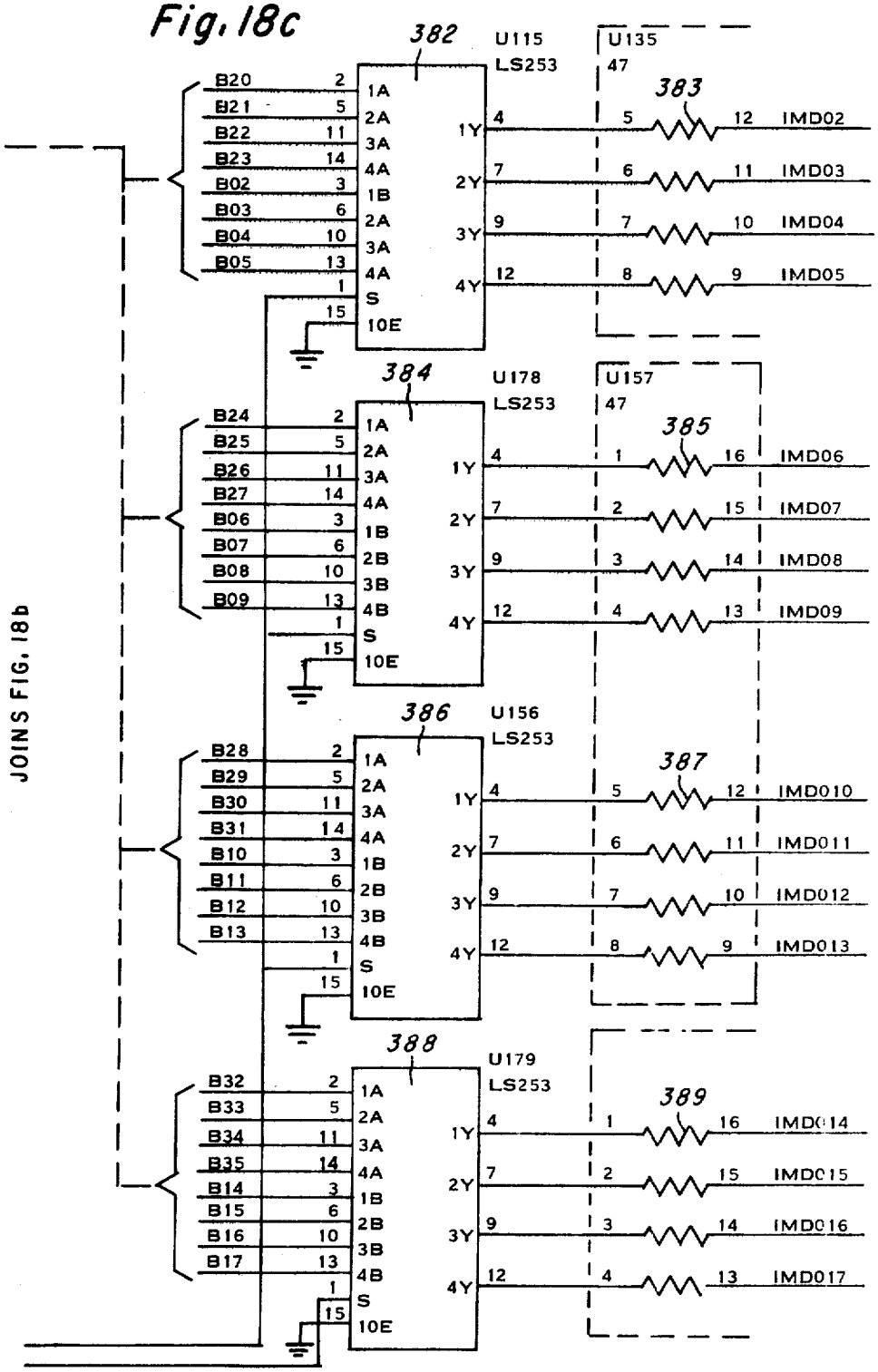

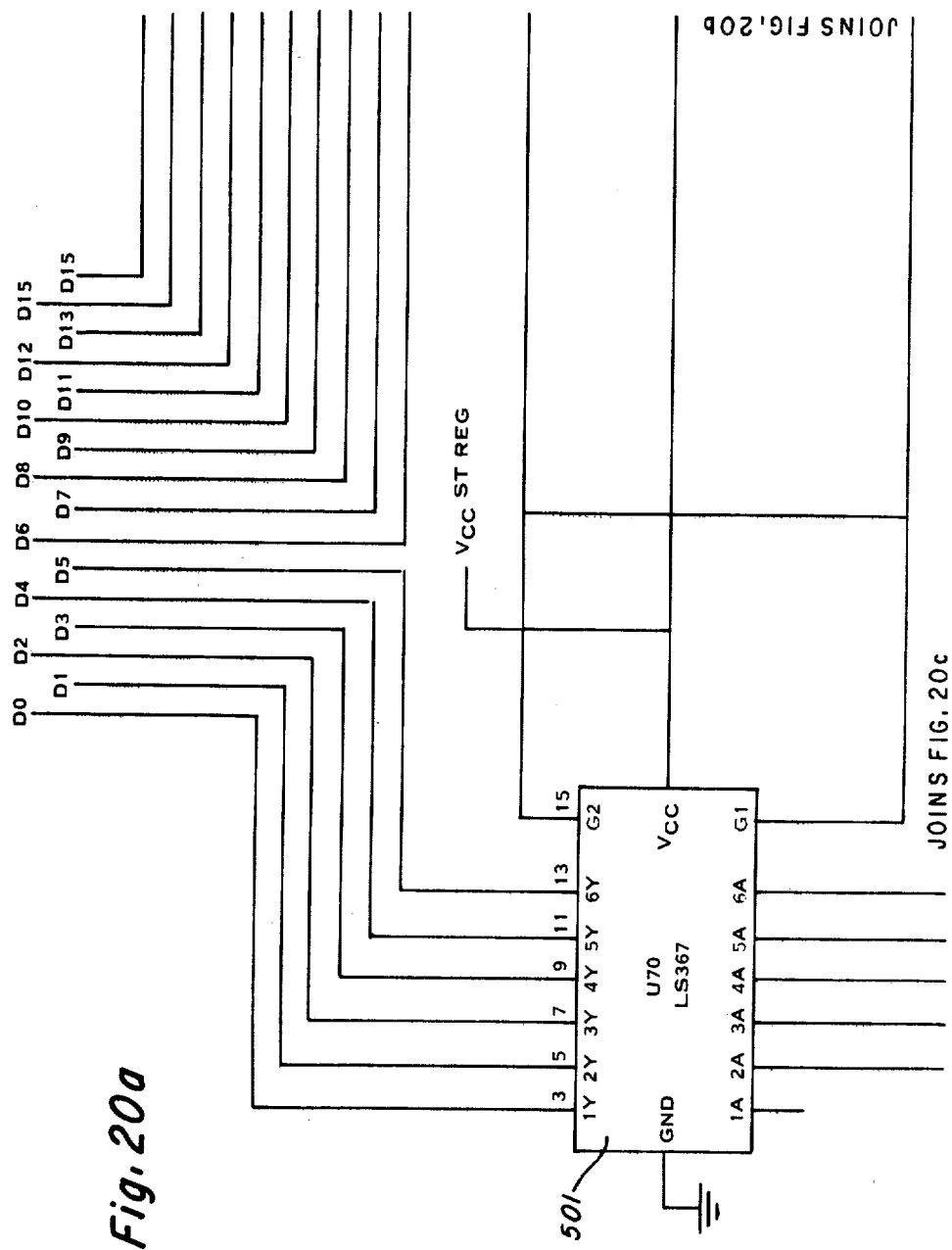

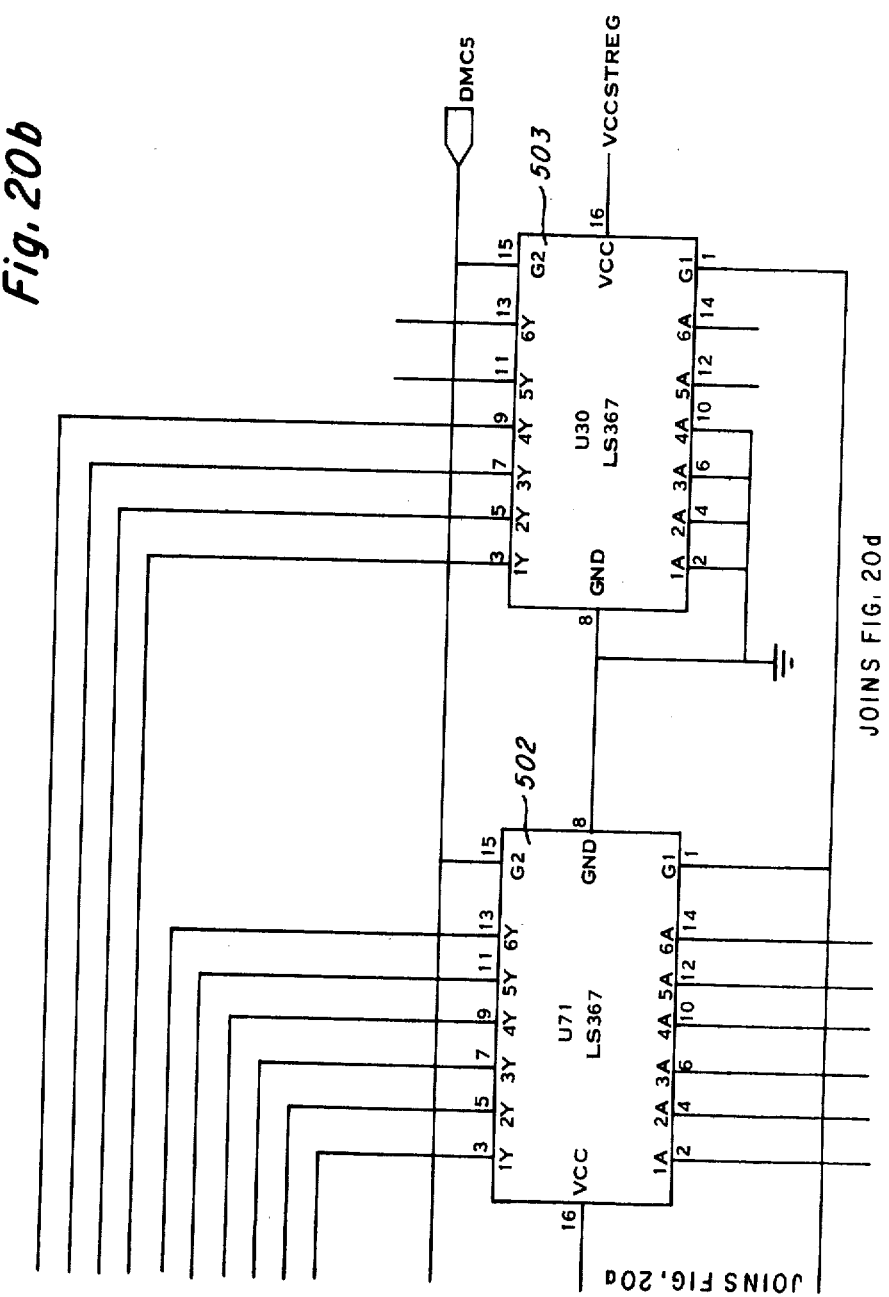

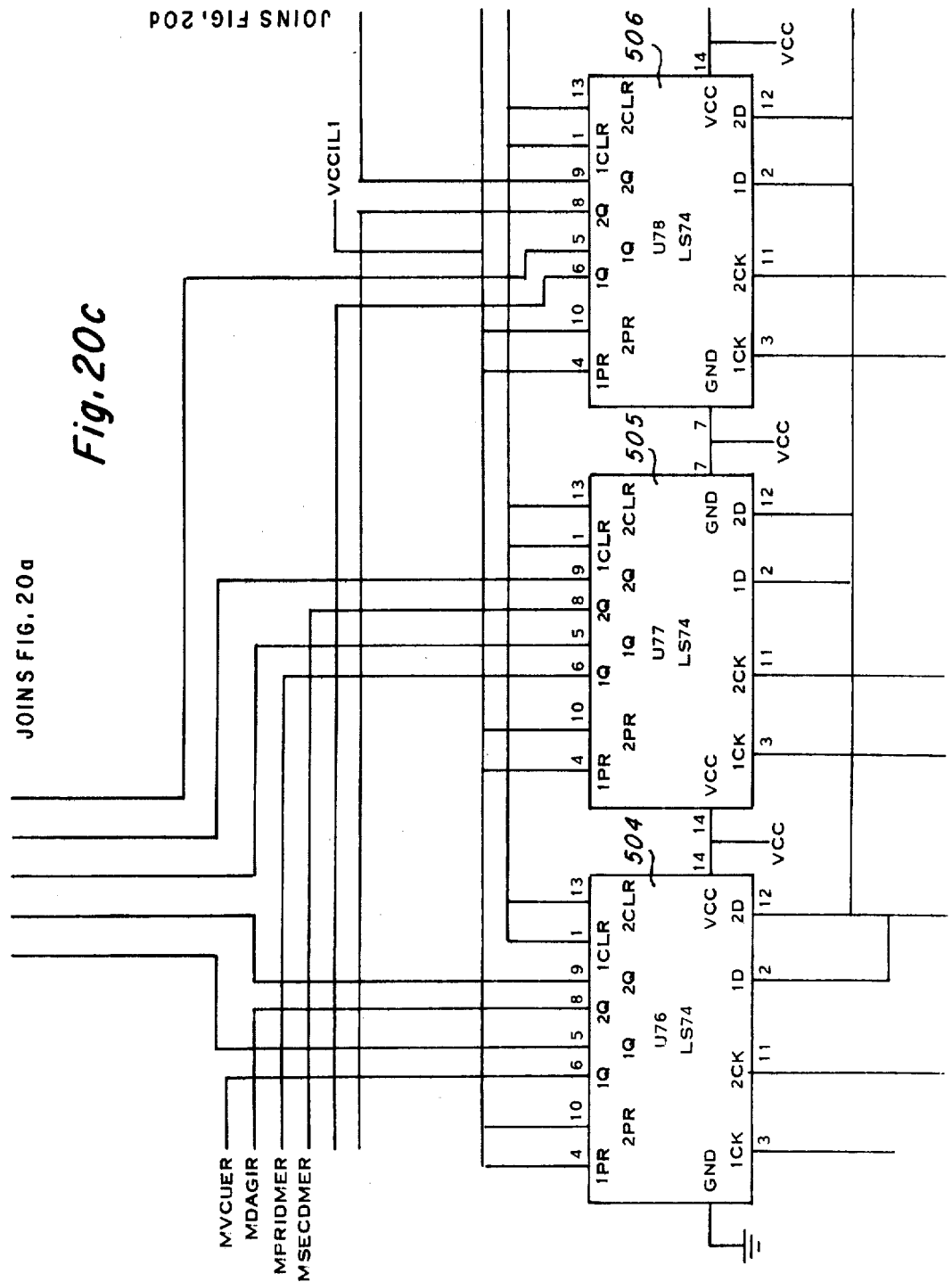

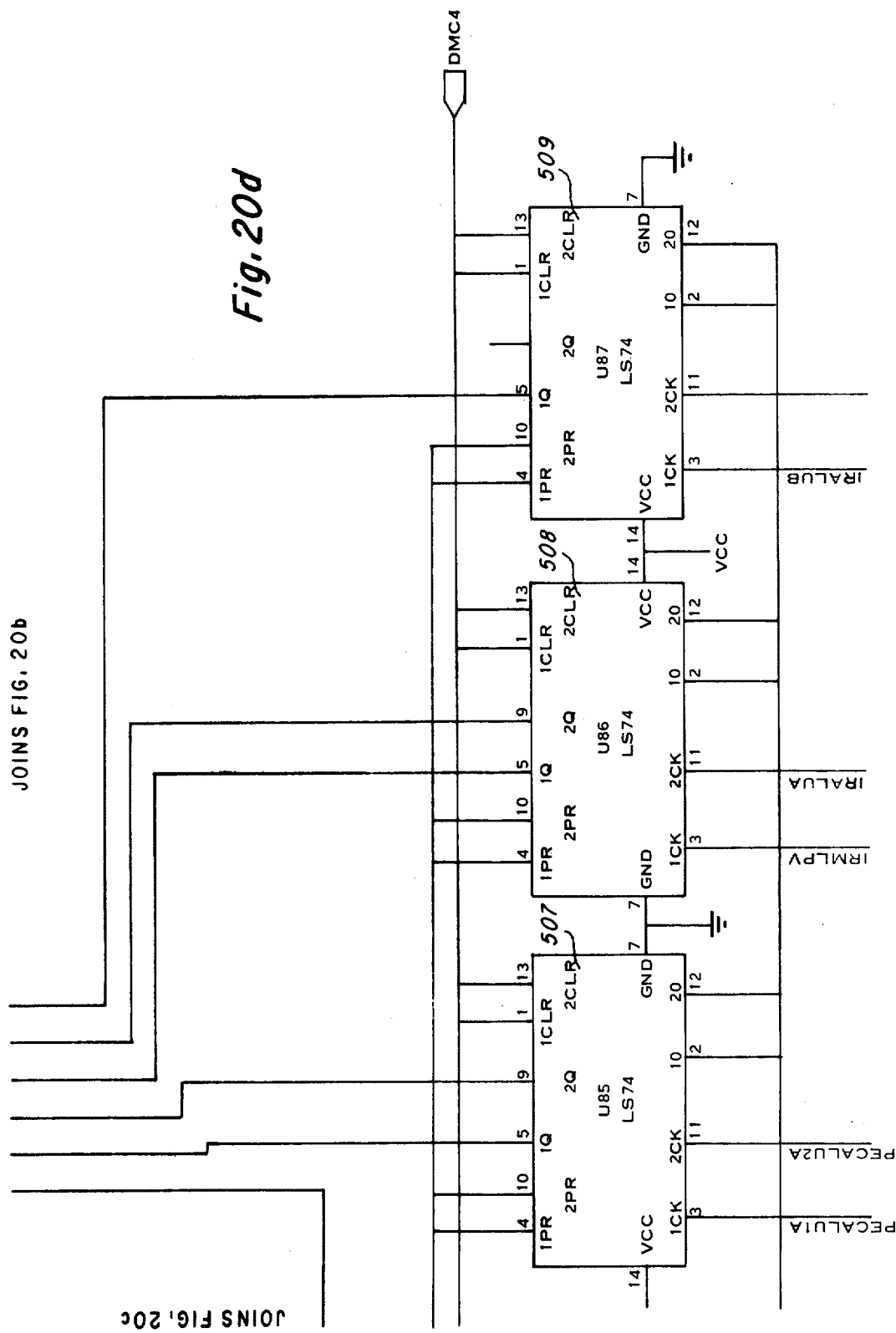

Fig. 24b
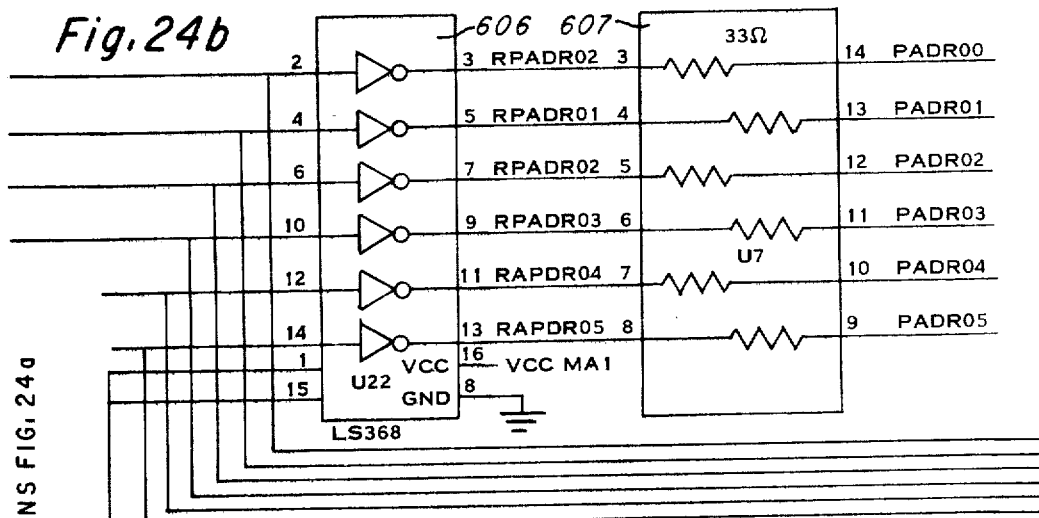
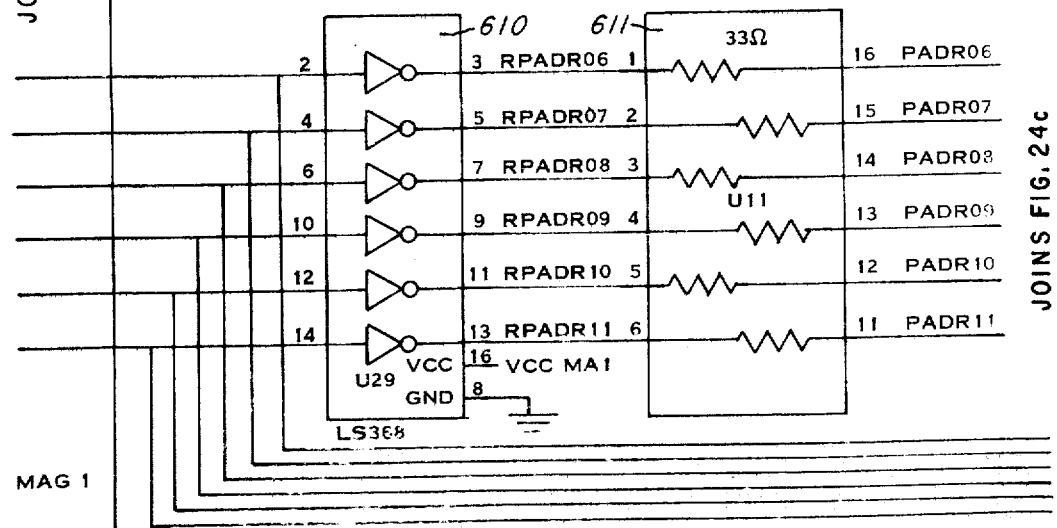
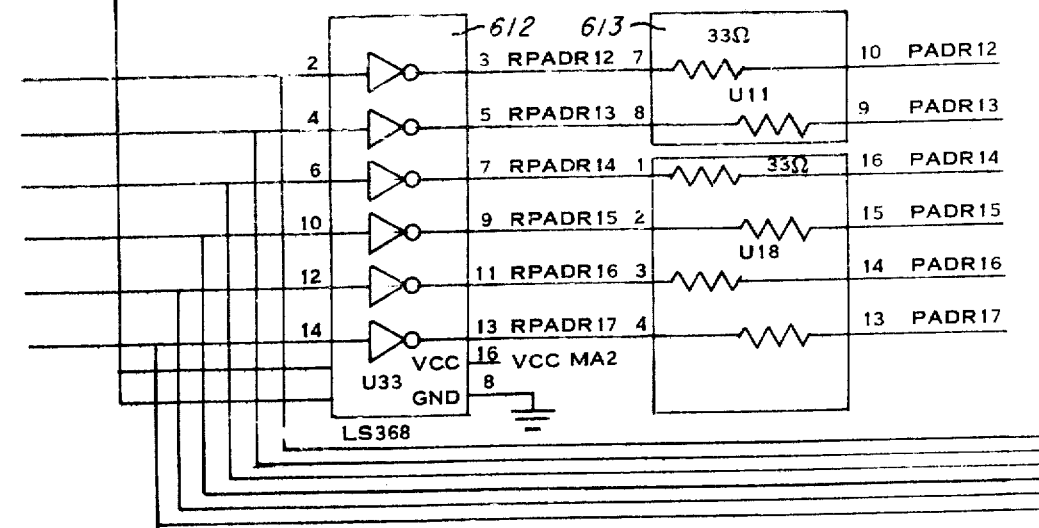

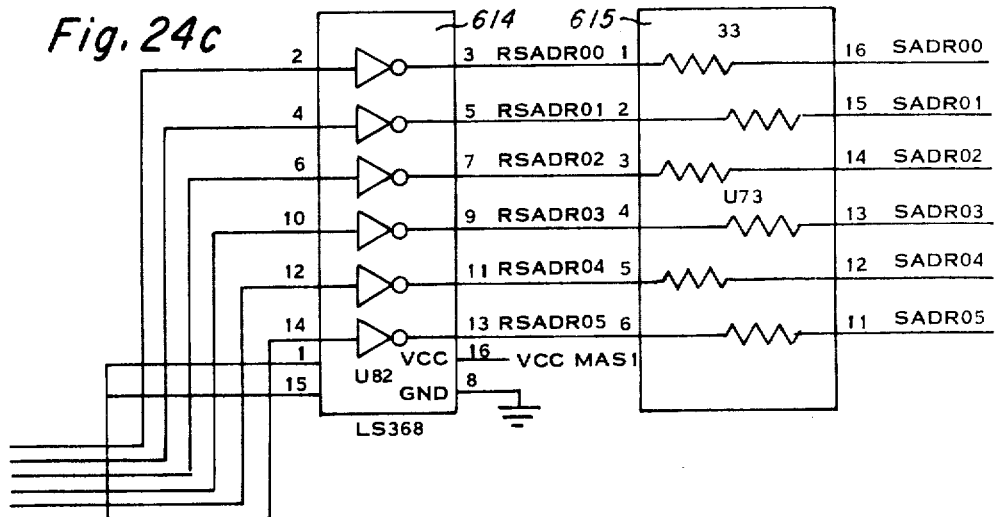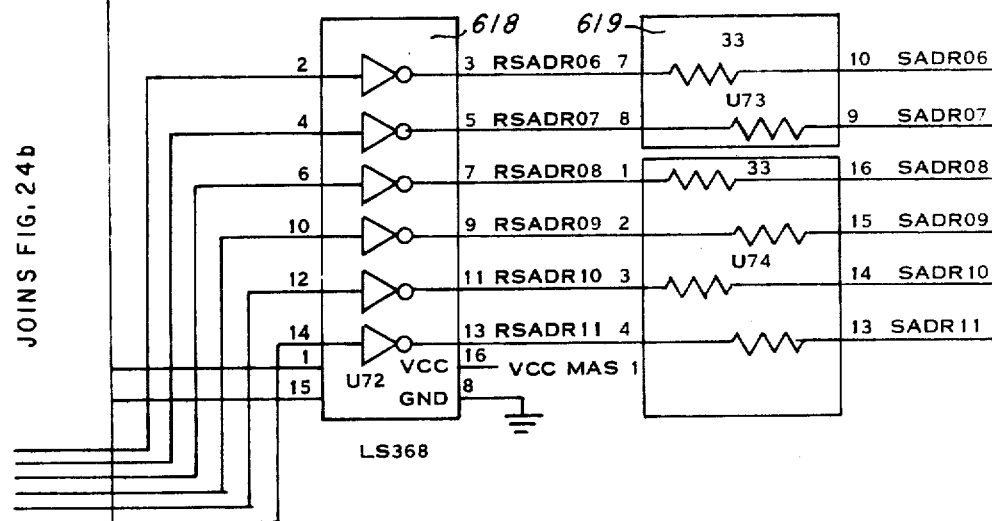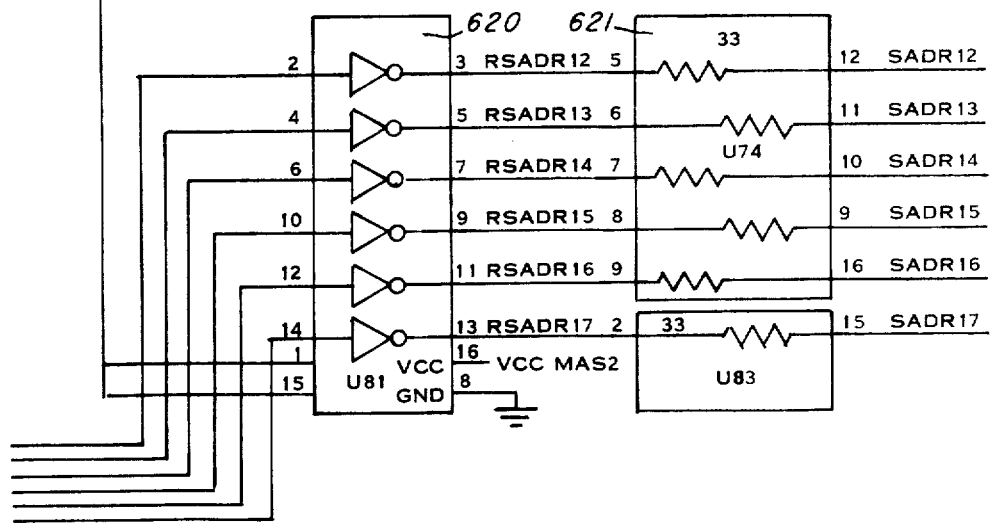
Fig. 24c

```
FILE ACCESS NAME:     PD. T
RECORD:    000000
0000    0200 0078 0080 FFFD 2890 2020 2020 2020            .  .     (.
0010    204D 4147 2020 2020 2020 2030 352F 3331       M AG          0 5/ 31
0020    2F37 3920 2031 353A 3532 3A32 3420 2020      /7 9   1 5: 52 :2 4
0030    2020 5655 5254 4C20 0000 0000 0000 0000          VU RT L
  SAME
004E    0000
RECORD:    000001
0000    8000 D60D B600 0002 2A00 0038 22A0 8A00                   *  . 8 ".
0010    8400 080D D57D 0002 2B00 0068 22A0 8A00                   +.    ".
0020    A000 208D 7000 0002 0080 0078 22A0 8A00                          "
0030    A000 250D 111D 0002 2880 0004 82D2 0B00        %           (.
0040    A000 208D 901D 0002 2880 0004 84D2 1300                    (.
RECORD:    000002
0000    A000 0C8D B510 0002 2E00 232E 907A 4200                        #    P
0010    D082 6A8D 3430 0085 0670 801E 8DBA 3700              4O              7
0020    A000 090D 7310 0002 2880 0004 82D2 0B00                    (
0030    5400 126B 1800 0002 2880 0004 82D2 0B00      T.            (
0040    E483 650D 111D 0075 9890 DC80 0830 0800      .. .. .. .. .. .. .. ..
RECORD:    000003
0000    A000 250D 535B 0074 2899 2B01 70C5 C100        %  S[    (   +.
0010    A000 250D 111D 0074 2B61 2BBA 4129 0700        %            +  +.  A)
0020    3881 520D 181D 0074 2A2B 2BBA 84EA 1000      B  R          *(  +.
0030    A000 120D 185B 0002 2880 0004 90D2 4300                  [  (        C
0040    2400 120D 1800 0002 2880 0004 81D2 0700      $.            (.
RECORD:    000004
0000    185B 0001 1440 0000 4909 4909 0009 0000        [       @       I. I.
0010    4831 1800 0001 1440 0000 4819 4819 86C6      H1          @       H. H.
0020    355E 888C 8618 6872 218F 7431 111D FFFF      5^               '   1
0030    15A4 846A 0000 0000 864A 864B 0019 85BA                        .J .H
0040    003B 001A 0000 0000 0000 0001 0008 0005      .;
```

```
FILE ACCESS NAME    D501.PD.TWR1
RECORD:  000000
0000   0000 0260 0080 FFEB 8C8E 2020 2020 2020
0010   2046 464D 2020 2020 2020 2031 312F 3137          F  FM              1 1/ 17
0020   2F37 3820 2031 343A 3432 3A33 3520 0000         /7 8     1 4: 42 :3 5
       SAME
004E   0000                                                            FIGURE 28B-1
RECORD:  000001
0000   6000 2D5B EF00 0002 2880 0004 82D2 0B00          . `  -[   .  .  (  .  .
0010   A000 120D 18E0 0802 2880 0004 82D2 0B00          .  .  .  .  (  .  .
0020   A000 120C 1E00 0002 2880 0004 82D2 0B00          .  .  .  .  (  .  .
0030   A000 120D 185A 0002 2880 0004 82D2 0B00          .  .  .Z.  (  .  .
0040   0400 0807 F600 4002 2880 0004 82D2 0B00          .  .  .  @  (  .  .
RECORD:  000002
0000   C400 1255 185C 0002 2880 0004 82D2 0B00          .U.\  .  (  .  .
0010   C400 1419 F710 0002 2880 0004 80D2 0B00          .  .  .  .  (  .  .
0020   C400 1469 F710 0002 2880 0005 4292 0B00          .  .  .  .  (  .B.
0030   F104 088D D610 0002 2880 0004 82D2 0B00          .  .  .  .  (  .  .
0040   4002 140D F710 0002 2880 0004 82D2 0B00       @  .  .  .  (  .  .
RECORD:  000003
0000   5400 126B 1800 0002 2880 0004 82D2 0B00      T.  .  .  .  (  .  .
0010   A000 150D F600 0002 2880 0005 4292 0B00          .  .  .  .  (  .B.
0020   A000 0A0D AD00 0002 2880 0004 82D2 0B00          .  .  .  .  (  .  .
0030   A000 120D 185A 0002 2880 0004 82D2 0B00          .  .  .Z.  (  .  .
0040   E412 D48D F710 0002 2880 0004 81D2 0B00          .  .  .  .  (  .  .
RECORD:  000004
0000   E412 CA0D D310 0002 2880 0004 82D2 0B00          .  .  .  .  (  .  .
0010   5000 08CB 3110 0002 2880 0004 82D2 0B00      P.  1.  .  (  .  .
0020   D004 D70D AD00 0002 2880 0004 82D2 0B00          .  .  .  .  (  .  .
0030   3805 160D 6D00 0002 2880 0004 82D2 0B00      8.  .  .  .  (  .  .
0040   A000 160D 6D00 0002 2880 0004 A2D2 8B00          .  .  .  .  (  .  .
RECORD:  000005
0000   8C00 160D 6B00 0002 2880 0004 82D2 0B00          .  .  .  .  (  .  .
0010   CC00 2FC5 EBA0 0002 2880 0004 82D2 0B00          .  /  .  .  (  .  .
0020   5C00 0A1B 737D 0002 2880 0004 82D2 0B00      \.  .  .  .  (  .  .
0030   A000 0E0D 737D 0002 0080 0004 82D2 0B00          .  .  .  .     .  .
0040   A000 080D 0810 0002 8080 0004 82D2 0B00          .  .  .  .  .  .  .
RECORD:  000006
0000   380B 480D 4810 0002 2880 0004 82D2 0B00      8. H. H.  .  (  .  .
0010   A000 120D 181D 0002 2880 0004 82D2 0B00          .  .  .  .  (  .  .
0020   A000 240D 0B0D 0094 28BA 2AA0 0C00 B200          .  $.  .  .  (  . *.
0030   A000 240D 4D4B 0075 00B2 8B10 C203 8A00          .  $. MK .  .  .  .
0040   A000 240D 4F4B 0094 28BB 8AA0 E583 1400          .  $. OK .  (  .  .
RECORD:  000007
0000   A000 240D 0D0D 0094 28A0 0304 89D2 2500          .  $.  .  .  (  .  . %.
0010   A000 240D 0F0D 0094 28A9 B8E0 1C00 F200          .  $.  .  .  (  .  .
0020   A000 240D 4D4B 0095 80A1 1950 C203 8A00          .  $. MK .  .  P .
0030   3811 240D 4B4B 0094 28A8 18E0 F583 5400      8. $. KK .  (  .  . %.
0040   A000 120D 185C 0002 2880 0304 89D2 2500          .  .  .\  .  (  .  . %.
RECORD:  000008
0000   A000 090D 8C00 0094 28A0 0004 80D2 0B00          .  .  .  .  (  .  .
0010   A000 250D 4E80 0094 28A9 0084 8252 0B00          . %. N. .  (  . R
0020   A000 080D 0A00 0094 28A1 0104 8252 0B00          .  .  .  .  (  . R
0030   A000 120D 1800 0094 2828 2880 22D2 0900          .  .  .  . (( ( . "
0040   A000 120D 1800 0094 28A2 0104 82D2 0900          .  .  .  .  (  .
RECORD:  000009
0000   A000 120D 1800 0094 296B 28B4 8240 0B00          .  .  .  . ). ( . @
0010   A000 120D 1800 0094 28A3 0104 8252 0B00          .  .  .  .  (  . R
0020   A000 120D 1800 0094 2A2A 2880 22D2 0900          .  .  .  . ** ( . "
0030   A000 120D 1800 0002 2880 0104 82D2 0900          .  .  .  .  (  .
0040   A000 120D 1800 0002 2B40 2804 82C0 0B00          .  .  .  . +@ (.
```

Fig. 28B-2

```
RECORD:    00000A
0000    A000 240D 0D0D 0002 2880 0004 82D2 0B00      . $.        (.
0010    A000 240D 0F0D 0002 2880 0004 8CD2 3300      . $.        (.          3
0020    A000 120D 1800 0003 0080 0004 82D2 0B00      . $.        (.
0030    A000 120D 1800 0094 28A0 0004 82D2 0B00                  (.
0040    A000 240D 0D0D 0094 28A9 0084 8252 0B00      . $.        (.          R
RECORD:    00000B
0000    A000 240D 0F0D 0094 28A1 0104 9C52 7300      . $.        (.       . R .
0010    A000 120D 1800 0095 80A8 0084 82D2 0900
0020    5800 247B 0D0D 0094 28B2 0104 82D2 0900    X. $.        (.
0030    A000 240D 0F0D 0094 28BB 2AA0 3000 4200      . $.        (. *. 0. B
0040    A000 240D 4D4B 0095 00B3 6B10 C203 0A00      . $. MK
RECORD:    00000C
0000    A000 240D 4F4B 0094 28BA 6AA0 E583 9400      . $. OK      (.
0010    A000 240D 0D0D 0094 28A1 0304 89D2 2500      . $.        (.          %.
0020    A000 240D 0B0D 0094 28A8 B8E0 2000 0200      . $.        (.
0030    A000 240D 4D4B 0095 80A0 F950 C203 0A00      . $. MK              P
0040    9000 240D 4F4B 0094 28A9 F8E0 F583 D400      . $. OK      (.
RECORD:    00000D
0000    E006 E40D 0D0D 0094 28B3 0104 99D2 6500                  (.
0010    A000 240D 0F0D 0094 28BA 2AA0 0C00 B200      . $.        (. *
0020    A000 240D 4D4B 0095 00B2 8B10 E203 0A00      . $. MK
0030    A000 240D 4F4B 0094 28BB 8AA0 C583 9400      . $. OK
0040    A000 240D 0D0D 0094 28A0 0304 89D2 2500      . $.        (.          %.
RECORD:    00000E
0000    A000 240D 0F0D 0094 28A9 B8E0 1C00 F200      . $.        (.
0010    A000 240D 4D4B 0095 80A1 1750 E203 0A00      . $. MK              P
0020    A000 240D 4B4B 0094 28A8 18E0 D583 D400      . $. KK      (.
0030    D800 640D 0D0D 0094 28BB 0104 99D2 6500                  (.
0040    A000 120D 18DD 0002 2880 0004 80D2 0300                  (.
RECORD:    00000F
0000    DC08 D20D 185C 0003 0080 0004 82D2 0B00              \
0010    A000 150D 3110 0002 2880 0004 80D2 0B00          . 1. (.
0020    A000 120D 185A 0002 2880 000F 0292 0B00          . Z. (.
0030    5000 094B D610 0002 2880 0004 81D2 0B00    P. K        (.
0040    D404 560D F710 0002 2880 0004 82D2 0B00      . V.        (.
RECORD:    000010
0000    2400 120D 1800 0002 2880 0004 C2D3 0B00    $.           (.
0010    0000 0000 0000 0000 0000 0000 0000 0000
   SAME
004E    0000
```

*Fig. 28C*

```
FILE ACCESS NAME:   D501 PD.TWR1
RECORD:  000000
0000    0000 00C0 0080 FFF4 D521 2020 2020 2020      . . . . . . . . . . . .'
0010    2042 524D 2020 2020 2020 2031 312F 3137      B RM             1 1/17
0020    2F37 3820 2031 343A 3330 3A30 3120 0000      /7 8   1 4: 30 :0 1 . .
  SAME
004E    0000                                         . .
RECORD:  000001
0000    5800 144B 4E00 0002 2880 0004 82D2 0B00      X. .K N. . . . (. . . . .
0010    A000 140D AA00 0002 2880 0004 82D2 0B00      . . . . . . . . (. . . . .
0020    A000 120C 1D00 0002 2880 0004 82D2 0B00      . . . . . . . . (. . . . .
0030    A000 080D 8800 0002 2880 0004 82D2 0B00      . . . . . . . . (. . . . .
0040    A000 080D D110 0002 2880 0004 82D2 0B00      . . . . . . . . (. . . . .
RECORD:  000002
0000    D801 D20D 1800 0002 2880 0004 82D2 0B00      . . . . . . . . (. . . . .
0010    3802 080D E810 0002 2880 0004 C2D3 0R00      8. . . . . . . (. . . . .
0020    A000 080D E810 0002 2880 0004 A2D2 8B00      . . . . . . . . (. . . . .
0030    5400 0857 AF00 0002 2880 0004 82D2 0B00      T. .W . . . . (. . . . .
0040    6800 00DB 6B60 0002 2880 0004 82D2 0B00      . . . . . . . . (. . . . .
RECORD:  000003
0000    A000 260D AEAD 0002 2880 0004 82D2 0R00      . . &. . . . . (. . . . .
0010    A000 248D AAAD 0002 2880 0004 84D2 1300      . . $. . . . . (. . . . #
0020    A000 260D AEAD 0002 2880 0004 88D2 2300      . . &. . . . . (. . . . #
0030    A000 120D 18AD 0002 2880 2850 CCB3 3200      . . . . . . . . (. (P . . 2.
0040    9800 260D 6B80 0002 2880 2860 F083 C200      . . &. . . . . (. (. . . .
RECORD:  000004
0000    D805 D20C 1800 0002 2900 7070 E2C3 0A00      . . . . . . . . ). . . . .
0010    A000 260D A8E0 0084 2848 7070 C2B3 8B00      . . &. . . . . (H . . . .
0020    A000 090D D6DB 0002 1880 BC10 C083 0800      . . . . . . . . (. . . . .
0030    A000 090D D6DB 0002 2880 C020 C583 9600      . . . . . . . . (. . . . .
0040    A000 090D D6DB 0002 2880 BC30 E983 A600      . . . . . . . . (. O . . .
RECORD:  000005
0000    A000 090D D6DB 0002 2880 C040 ED83 3600      . . . . . . . . (. @. . 6
0010    D402 E60D AEAD 0002 2880 0004 91D2 4700      . . . . . . . . (. . . . 8.
0020    2400 120D 1800 0002 2880 0004 90D2 4300      $. . . . . . . (. . . . C.
0030    3804 660D A8E0 00A4 2848 8C70 C283 8B00      8. . . . . . . (H . . . .
0040    0000 0000 0000 0000 0000 0000 0000 0000      . . . . . . . . . . . . .
```

Fig. 28D

```
FILE ACCESS NAME:    DB01.FD.TWR1
RECORD:  000000
0000   0000 011B 0080 FFEF A2B0 2020 2020 2020    . . . . . . . . . . . . . . . .
0010   204F 4553 2020 2020 2020 2031 312F 3137     O ES           1 1/ 17
0020   2F37 3820 2031 343A 3537 3A34 3420 0000    /7 8  1 4: 57 :4 4 . .
 SAME
004E   0000                                       . .
RECORD:  000001
0000   A000 080D 695C 0002 2880 0004 82D2 0B00    . . . . \ . . . ( . . . . . .
0010   A000 088D 081C 0003 8880 0004 82D2 0B00    . . . . . . . . . . . . . . . .
0020   A000 088D 080C 0003 C880 0004 82D2 0B00    . . . . . . . . . . . . . . . .
0030   A000 000D F6C0 0095 C8BE 0004 82D2 0B00    . . . . . . . . . . . . . . . .
0040   A000 000D 48F0 0094 28BE 0084 8252 0B00    . . . . H . . . ( . . . . R . .
RECORD:  000002
0000   A000 000D 89F0 0002 2880 2534 8240 8A00    . . . . . . . . ( . %4 . @ . .
0010   8400 090D 6B6B 0002 2880 2830 0292 0B00    . . . . . . . . ( . (0 . . . .
0020   C400 1469 F600 0002 2880 0004 8DD2 3700    . . . . . . . . ( . . . . . 7.
0030   A000 140D F710 0002 2880 0004 82D2 0B00    . . . . . . . . ( . . . . . . .
0040   F104 088D D610 0002 2880 0004 82D2 0B00    . . . . . . . . ( . . . . . . .
RECORD:  000003
0000   4002 540D F710 0002 2880 0004 82D2 0B00    @. T . . . . . ( . . . . . . .
0010   A000 000D D6D0 0002 2880 0004 82D2 0B00    . . . . . . . . ( . . . . . . .
0020   A000 000D ABD0 0002 2880 0004 82D2 0B00    . . . . . . . . ( . . . . . . .
0030   A000 0D0D 8C8B 0002 2880 2830 2292 0B00    . . . . . . . . ( . (0 " . . .
0040   A000 0C8D 4AAD 0002 2880 0004 8DD2 3700    . . . . J . . . ( . . . . . . 7
RECORD:  000004
0000   A000 140D EEAD 0002 0080 0004 82D2 0B00    . . . . . . . . . . . . . . . .
0010   A000 088D 080C 0002 8080 0004 82D2 0B00    . . . . . . . . . . . . . . . .
0020   A000 088D 080C 0085 C880 0004 82D2 0B00    . . . . . . . . . . . . . . . .
0030   5400 0CF7 4A4C 0095 C8BE 0384 8252 0B00    T . . . JL . . . . . . . R . .
0040   D405 0C8D 4A4C 0095 C8BE 0084 8252 0B00    . . . . JL . . . . . . . R . .
RECORD:  000005
0000   A000 120D 1800 0095 C83E E082 02D2 0900    . . . . . . . . . . . . . ) . .
0010   A000 120D 1800 0094 28BE 0104 82D2 0900    . . . . . . . . ( . . . . . . .
0020   A000 120D 1800 0094 2890 6D30 2200 8A00    . . . . . . . . ( . O " . . . .
0030   A000 120D 1800 0094 2C59 2B00 8202 0B00    . . . . . . . . , Y + . . . . .
0040   A000 120D 1800 0094 2D20 2B80 A242 8A00    . . . . . . . . - + . . B . . .
RECORD:  000006
0000   A000 120D 1800 0094 28A1 60C0 0200 8A00    . . . . . . . . ( . . . . . . .
0010   A000 088D 080C 0094 28A8 DCF0 2292 0900    . . . . . . . . ( . . . " . . .
0020   A000 088D 080C 0095 08A7 0530 0280 0B00    . . . . . . . . . . . 0 . . . .
0030   A000 0C8D 4A4C 0095 4891 8540 2200 0A00    . . . . JL . . . H . . @ " . . .
0040   A000 090D 6B6B 0095 C898 6B30 0280 8B00    . . . . . . . . . . . . . . . .
RECORD:  000007
0000   A000 0D0D 8CBB 0094 28A6 BBC0 2D80 B400    . . . . . . . . ( . . . . . . .
0010   D405 0C8D 4A4C 0094 296E DC84 9140 4700    . . . . JL . . . ) . . . . @ G
0020   A000 120D 1800 0002 2880 0084 90D2 0900    . . . . . . . . ( . . . . . . .
0030   A000 120D 186B 0002 2880 2014 82FE 0A00    . . . . . . . . ( . . . . . . .
0040   2400 120D 1800 0002 2880 0004 85D2 1700    $ . . . . . . . ( . . . . . . .
RECORD:  000008
0000   0014 3231 4A4C 004A 14A5 DB90 4911 0119    . . 21 JL . J . . . . I . . . .
0010   0028 0000 4831 1800 0001 1440 0010 4909    . ( . . H1 . . . . . . @ . . I .
0020   4821 0028 0000 4831 186B 0001 1440 0401    H! . ( . . H1 . . . . . @ . . .
0030   4829 F828 0009 0000 4831 1800 0001 1440    H) . ( . . . . H1 . . . . . @
0040   0000 4859 4859 0000 0000 0000 0001 0006    . . HY HY . . . . . . . . . . .
```

MICRO-VECTOR PROCESSOR

BACKGROUND OF THE INVENTION

1. Field of the Invention

This invention relates to signal processors and more specifically to a micro-vector, multi-processor.

2. Description of the Prior Art

In the past, to efficiently perform vector arithmetic such as fast fourier transform, correlation and convolution, digital filtering (transversal and recursive), quadrature translation, digital beam forming and integration and smoothing, large scale pipeline computers such as the Texas Instruments Incorporated Advanced Scientific Computer (ASC) were commonly employed.

Later, signal processing systems such as the Texas Instruments Incorporated Multiple Application Processor (TIMAP) system based upon a commercial minicomputer system (TI-980) and the Texas Instruments Incorporated Advanced Array Transform Processor (AATP), described in U.S. Pat. No. 4,107,773. The AATP is a programmable peripheral processing unit designed and programmed to efficiently implement signal processing algorithms. However, such a system does not provide autonomous operation of a vector processor which shares memory with a minicomputer.

This invention provides fast and economical vector arithmetic and signal processing in general.

SUMMARY OF THE INVENTION

In essence, a signal processor (vector unit) is introduced into a general purpose computer system much like a peripheral device, to autonomously perform signal processing algorithms on command from the general purpose computer.

The micro-vector processor is an integrated circuit implementation of a digital signal processor In this preferred embodiment, it is based, in part, upon the high density, low power semiconductor technology of integrated, injection-current logic ($I^2L$). Shottky output devices replace resistors to further lower the power requirements.

An input controller receives input signals and provides them, in digital form, for storage in a data memory unit. A programmable supervisor unit, whose function is dictated by a microprocessor has access to the data memory unit. The supervisor stores Command Parameter Lists (CPL's) in data memory for use by a vector unit. The supervisor also controls the sequencing of the vector unit and controls the input and output controllers.

The vector unit functions under control by a microcontroller whose programming is by way of a ROM. Algorithms for performing vector computations are stored in the ROM associated with the micro-controller. The vector unit is formed of a vector control unit (VCU) and a complex arithmetic logic unit (CALU). The VCU has the micro-controller and one half of the ROM and additionally has an arithmetic logic unit for updating addresses in the data memory.

The CALU, in addition to having the other half of the ROM, has a fast multiplier and a pair of arithmetic logic units for performing the necessary arithmetic to implement the vector arithmetic algorithms contained in the ROM. As the various computations are completed, the results are sent to the data memory unit. When the overall vector computation is completed, the VCU notifies the supervisor of this fact and a new computation is initiated after the supervisor causes the data memory unit to read out the calculated data to the output controller.

The input controller receives incoming data which, in this preferred embodiment, is 1024 points of digital data converted from an analog input. The input controller has the capability of addressing the data memory so that the incoming data may be properly stored.

The output controller, in this preferred embodiment, is identical to the input controller, having the ability to address the memory to read data from the memory and to output it.

The data memory itself has a static, random access memory (RAM) which is controlled by a memory controller. It also has a word swap multiplexer which enables the interchange of the higher order bits of a double length word for the lower order bits in either the reading or writing mode. The memory control performs an incrementing function for the RAM for purposes of supplying a double length word and also determines which of the units, the supervisor, the vector unit, the input controller or the output controller, has priority in the event of simultaneous requests for use of the data memory.

As mentioned earlier, the in part implementation of this preferred embodiment with respect to the micro controller, register files, arithmetic logic units, and multiplier is in $I^2L$. The $I^2L$ technology of this preferred embodiment is an improved technology, utilizing Shottky devices as the communication link outside of the $I^2L$ logic arrays. The Schottky circuitry further lowers the power consummed by the $I^2L$ circuitry. However, in this preferred embodiment, to even further reduce the power consumed, a power up—power down circuit is employed to cause units and components to be disconnected from the power source when not in operation.

The object of this invention is to provide a micro-vector multiple processor having a vector unit capable of performing complex vector manipulations upon initiation by a general purpose microprocessor which does not have to intervene once the vector unit has been started and which may proceed on its own processing chores.

Another object of the invention is to provide a micro-vector multiple processor having a single general purpose microprocessor controlling a plurality of vector units, each capable of performing complex vector computations independently of the microprocessor and each other, once having been invoked by the supervisor.

These and other objects will be made evident in the detailed description that follows.

BRIEF DESCRIPTION OF THE DRAWINGS

FIGS. 16a-16c form a schematic diagram of the prioritizing circuitry and other control circuitry of the memory control.

FIGS. 17a-17d form a schematic diagram of the circuitry of the memory control for receiving and incrementing the input address to the data memory.

FIGS. 18a-18c form a schematic diagram of the word swap multiplexer (write).

FIGS. 20a-20d form a schematic diagram of the status register of the VCU, illustrating input error signals.

FIGS. 24a-24c form a schematic diagram of the primary and secondary data memory address and control interface.

FIGS. 28A, 28B-1, 28B-2, 28C and 28D are maps of the vector unit ROM.

DETAILED DESCRIPTION OF THE INVENTION

To indicate the negation of a term, a "/" will be used.

Figure 1:
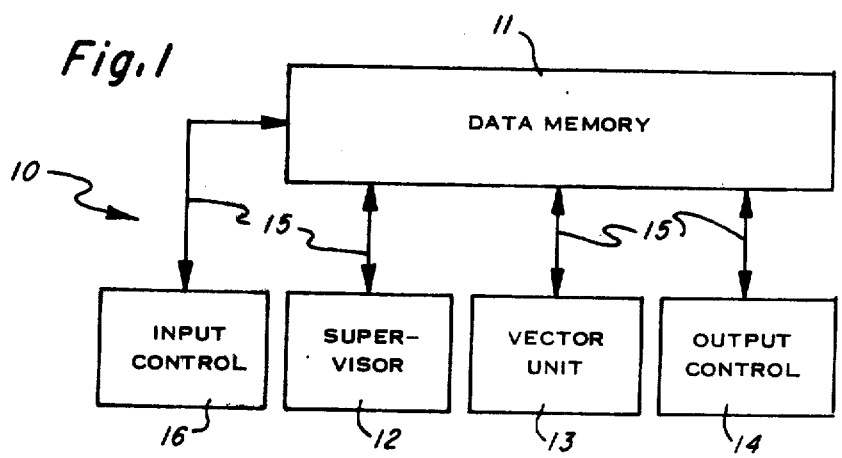
FIG. 1 is a block diagram of the micro-vector processor of this invention.

FIG. 1 illustrates a data memory 11 connected by bus 15 to supervisor 12, vector unit 13, input controller 16 and output controller 14.

Figure 2:
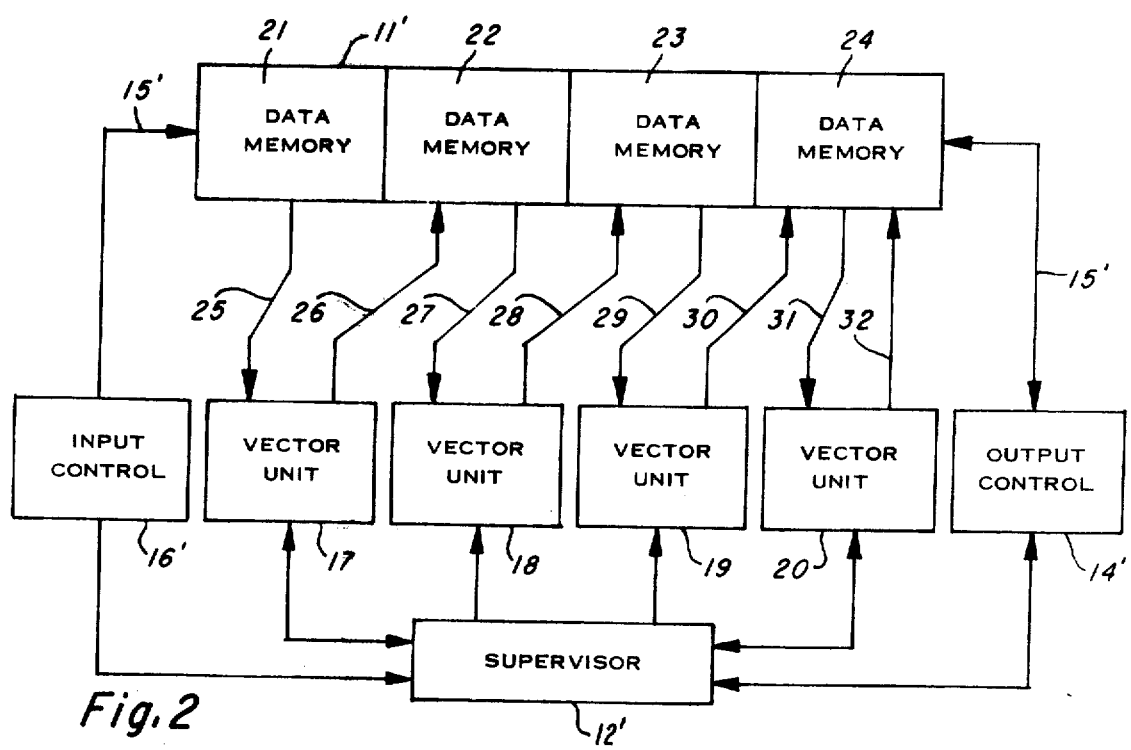
FIG. 2 is a block diagram of the micro-vector processor of this invention wherein there are four vector units and one supervisor unit.

FIG. 2 illustrates data memory 11$^1$ having sections 21, 22, 23 and 24. Vector unit 17 is connected via bus 25 to data memory section 21 and to data memory section 22 via bus 26. Data memory section 22 is connected via bus 27 to vector unit 18 which is in turn connected to data memory section 23 through bus 28. Bus 39 connects vector unit 19 to data memory section 23 and bus 30 connects vector unit 19 to data memory 24. Data memory 24 is connected via bus 31 to vector unit 20. Supervisor 12' is connected via bus 15' to data memory 11 and to input controller 16' and output controller 14'. Vector unit 17-20 are each connected to supervisor 12'. FIG. 2 illustrates vector units 17-20 connected to a sectionalized data memory 11' or to separate data memories (equivalent to sections 21-24) for separate execution of different tasks in a series of algorithms to be performed.

Figure 3:
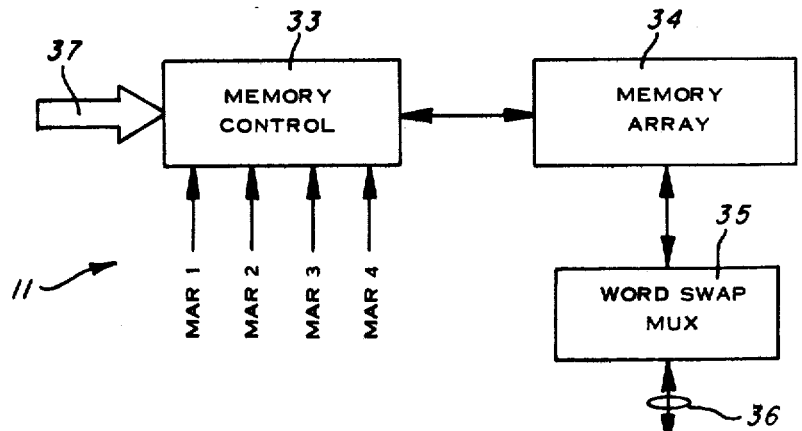
FIG. 3 is a block diagram of the data memory of FIG. 1.

FIG. 3 shows memory control 33 having memory access request MAR1-MAR4 input lines and being connected to memory array 34. Memory control 33 also has address and control lines input 37. Memory array 34 is connected to word swap multiplexer 35 which has data lines 36 as input/output lines.

Figure 4:
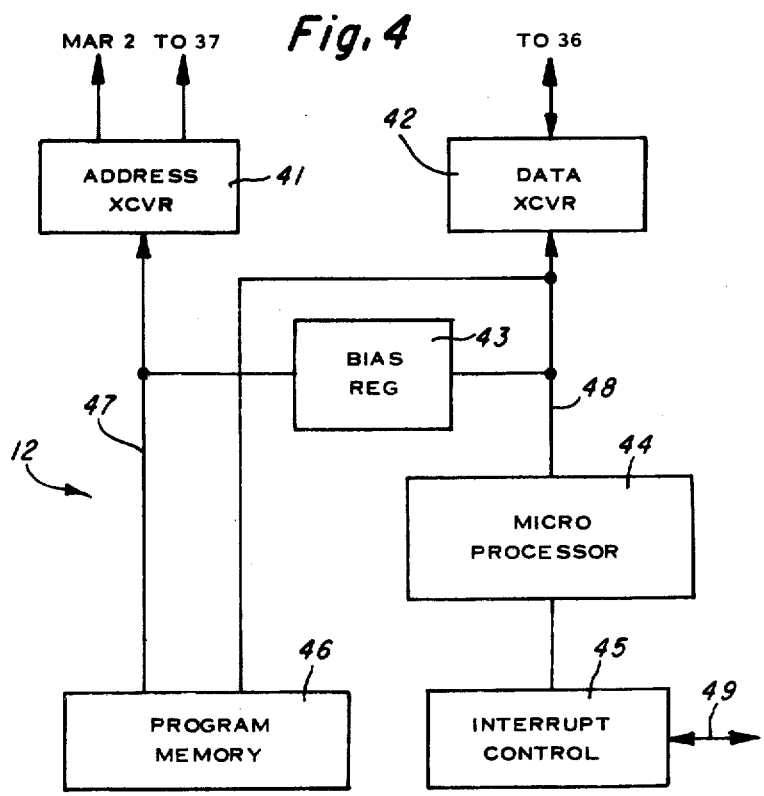
FIG. 4 is a block diagram of the supervisor of FIG. 1.

FIG. 4 illustrates supervisor 12 having address transceiver 41 connected to program memory 46 and bias register 43 via bus 47. Data transceiver 42 is shown connected via bus 48 to program memory 46 and to microprocessor 44. Microprocessor 44 is connected to interrupt control 45 which has a bidirectional bus 49. Memory Access Request signal MAR2 is shown as an output of address transceiver 41. Another output is shown going to address bus 37 of FIG. 3.

Figure 16B:
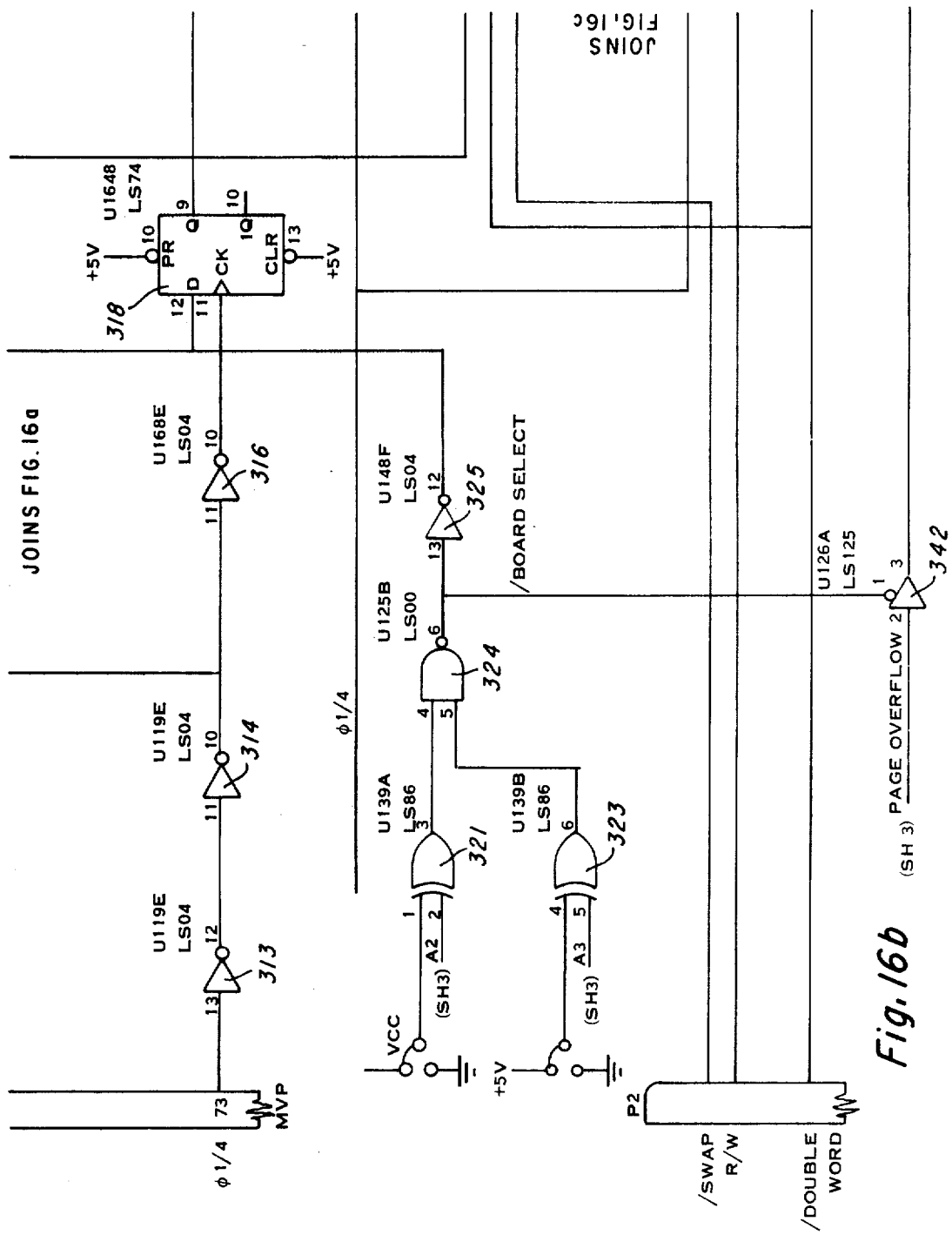
Figure 16C:
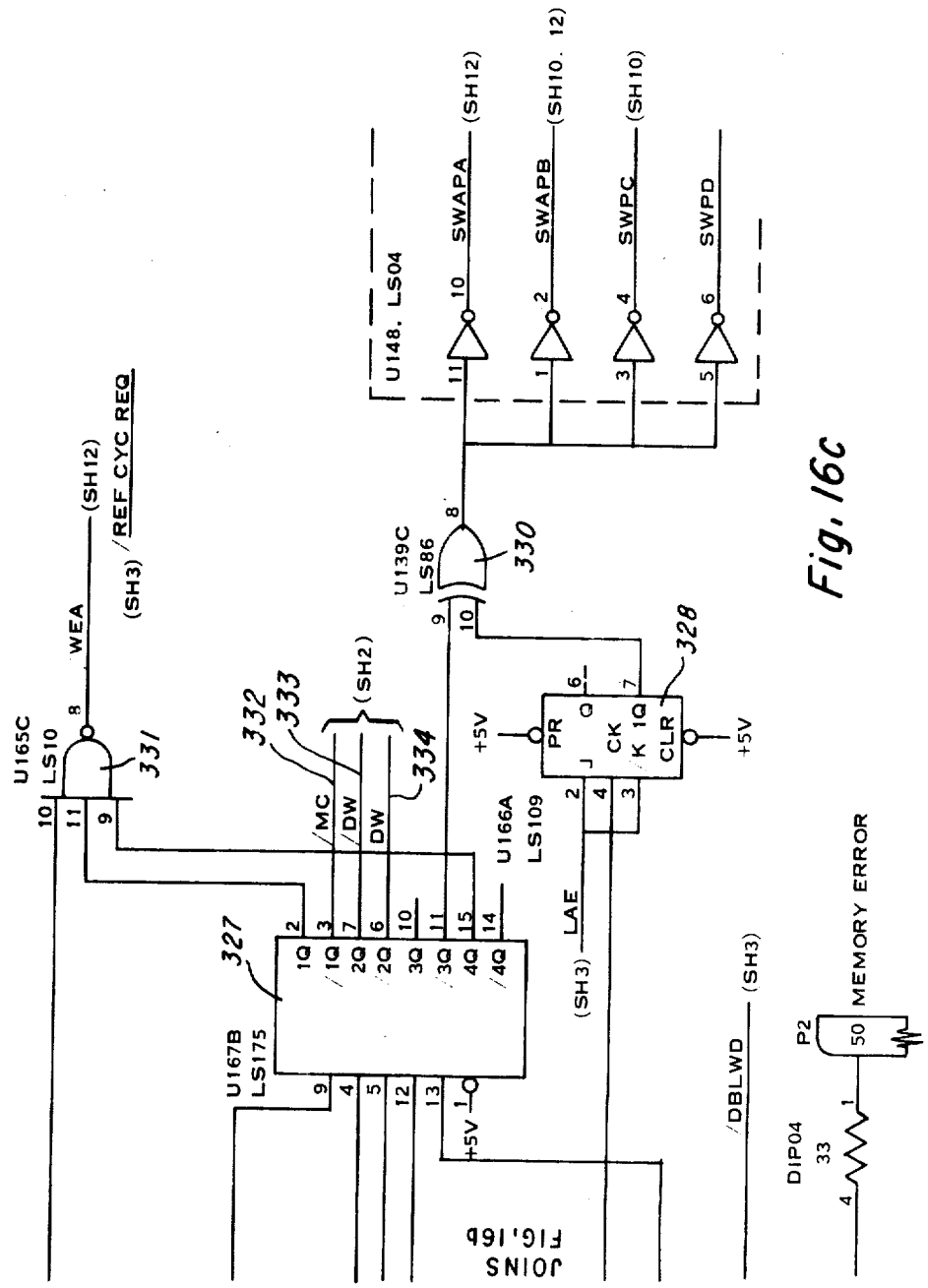

Turning now to FIG. 16, part of the memory control 33 is shown in detail. Clock input Phase 1 (of 4) is shown applied to the input of inverter 313. The system clock (not shown) is physically located on the supervisor unit and, in this preferred embodiment, is originated by a 24 MHz crystal from the Vectron Company, whose output is appropriately divided to provide a 4 MHz clock for the microprocessor of the supervisor unit and a 2 MHz clock for use in other components of the system. The 2 MHz frequency is decoded from a ring counter to form a 3-phase, 4-phase, and 5-phase clock. Having these multi-phase clocks available provides a facility of an available pulse when needed without having to wait a period of time until the next pulse is available. The clock system, as described, is well known in the prior art and need not be described in more detail here. Signals /MAR1, /MAR2, /MAR3, and /MAR4, from the input controller 16, the supervisor 12, the output controller 14 and the vector unit 4, respectively, are applied to inverters 301, 304, 307, and 310, respectively. They are also applied to AND gates 302, 305, and 308, respectively. AND gates 302-308 do not perform a logic function but are in the circuit to provide a delay equal to that of inverters 301-307. The output of inverter 301 provides an input to NAND gate 303 whose output, through resistor R1 is /MAG1.

The output of AND gate 302 provides one input to NAND gate 315 which has another input provided by the output of inverter 304. NAND gate 306 has an input from each of AND gates 302 and 305 and also has an input from inverter 307.

NAND gate 309 has an input from each of AND gates 302, 305, and 308 and also has an input from the output of inverter 310.

The clock output from inverter 313 is inverted again through inverter 314 as output serves as an input to each of NAND gates 303, 315, 306, and 309. NAND gate 309 also has three of its inputs tied to VCC simply to accommodate the available NAND gate component type. The output of NAND gates 315, 306 and 309 are passed through resistors R2, R3 and R4, providing the memory access granted signals MAG2, MAG3, and MAG4. It can be seen that signal /MAG1 is provided upon the appearance of signal MAR1 without other conditions necessary except clocking. On the other hand, signal /MAG2 requires the presence of signal /MAR2 and not signal /MAR1. Signal /MAG3 is present when signal /MAR3 exists and signals /MAR1 and /MAR2 do not exist. Signal /MAR4 is present in the presence of signal /MAR4 and in the absence of signals /MAR1, /MAR2, and /MAR3. In this manner, signal /MAR1 obviously takes priority over the other, signal /MAR2 taking next priority, and so on.

NAND gate 311 has inputs from the outputs of each of AND gates 302, 305 and 308 and also is provided with input signal /MAR4 as an input. The output of NAND gate 311 provides one input to AND gate 312 whose output is an input to latch 327.

Exclusive OR gate 321 has one input from jumper circuit 319 and another input input A2 from the address word INPUT to memory control 33. Exclusive OR gate 323 has an input from jumper circuit 320 and another input A3 from the address input to memory control 33. Inputs A2 and A3 are provided to select other memory boards. That is, in this preferred embodiment, the static memory selected has a capacity of 32, 768 bits, and other memory boards may be added. The memory array is a static memory, purchased from the Hitachi Company, type HS6147LP. When added, they are selected by signals A2 and A3. Jumper circuit 319, when connected as shown to VCC, causes a high output from exclusive OR circuit 321 when signal A2 is low. Conversely, when jumper circuit 319 is connected to ground, the output of exclusive OR circuit 321 is high when signal A2 is high.

In the same manner, when jumper circuit 320 is connected to VCC, the output of exclusive OR circuit 323 is high when signal A3 is low. When jumper circuit 320 is connected to ground, the output of exclusive OR circuit 323 is high when input signal A3 is high. The outputs of exclusive OR circuit 321 and 323 are connected as inputs to NAND circuit 324 whose output is inverted through inverter 325 and applied as an input to AND circuit 312.

The output of NAND gate 324 also serves as a gate to tri-state inverter 324 whose input is the "PAGE OVERFLOW" signal and whose output is a memory error signal which is transmitted to the supervisor unit 12.

The second input to latch 327 is provided by the /SWAP signal, a third input is provided by an R/W signal and a fourth input is provided from a /DOUBLE WORD input.

The output of inverter 313 has phase 1 of 4 clock and is applied to the clock input of latch 327. The output of inverter 314 is inverted again through inverter 316 and applied to the clock input of flip-flop 318. The D input of flip-flop 318 is supplied by the output of inverter 325. The Q output of flip-flop 326 provides an input to NAND gate 331. Another input to NAND gate 331 is the 1Q output of latch 327 and the last input to NAND gate 331 is the 4Q output from latch 327. The output of NAND gate 331 is the control signal /WEA.

The /1Q output of latch 327 provides the /MC (memory cycle); the 2Q output provides the /DW (double word) signal and the /2Q output provides the DW (double word) signal. The /3Q output of latch 327 provides one input to exclusive OR circuit 330 whose other input is provided by the /Q output of flip-flop 328.

Flip-flop 328 has a clocked input from inverter 313 and is provided with a J and /K input from signal LAE provided from the incrementing logic, to be discussed later.

The output of exclusive OR circuit 330 is inverted through parallel inverters 336, 337, 338 and 339, providing SWAP A, SWAP B, SWAP C and SWAP D outputs, respectively.

Figure 17B:
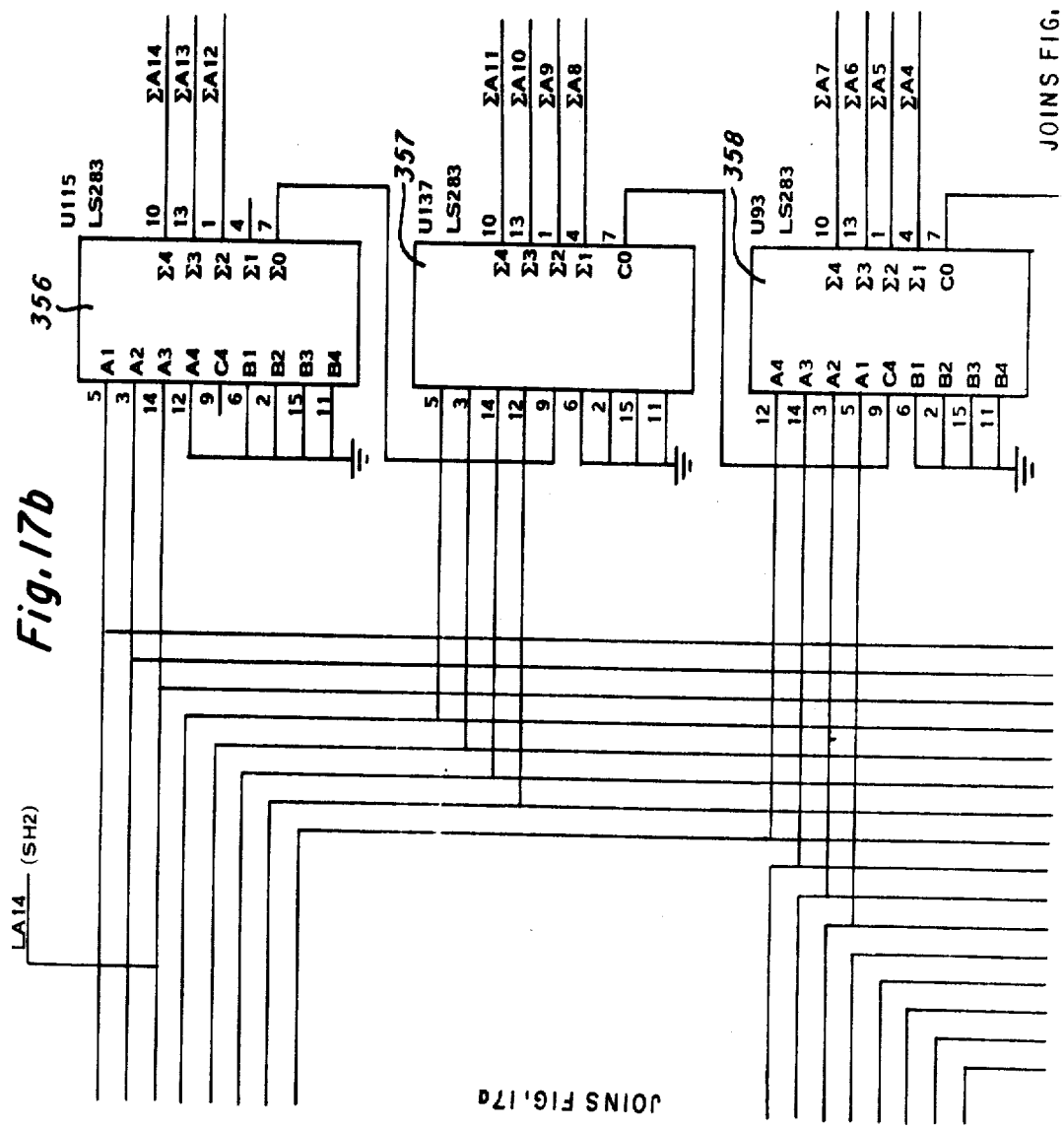
Figure 17C:
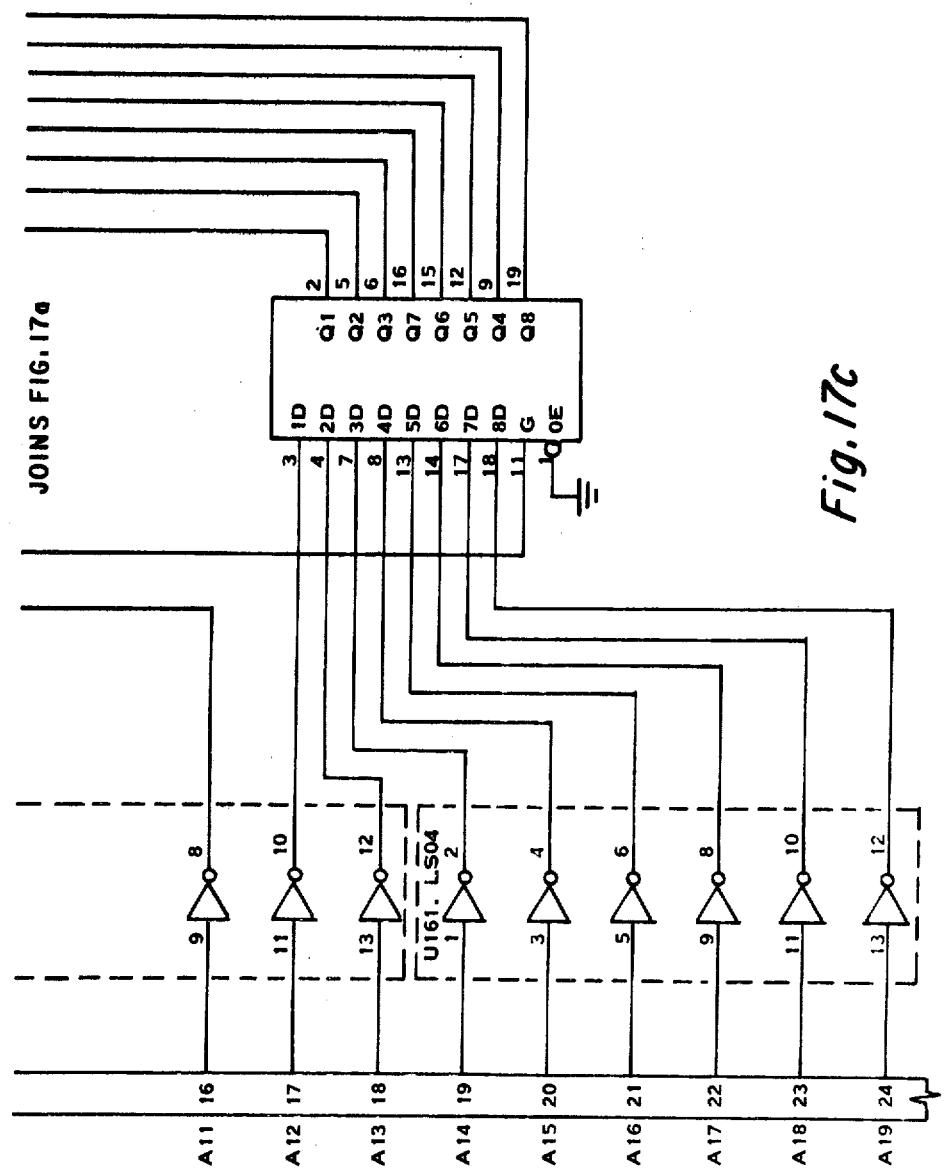
Figure 17D:
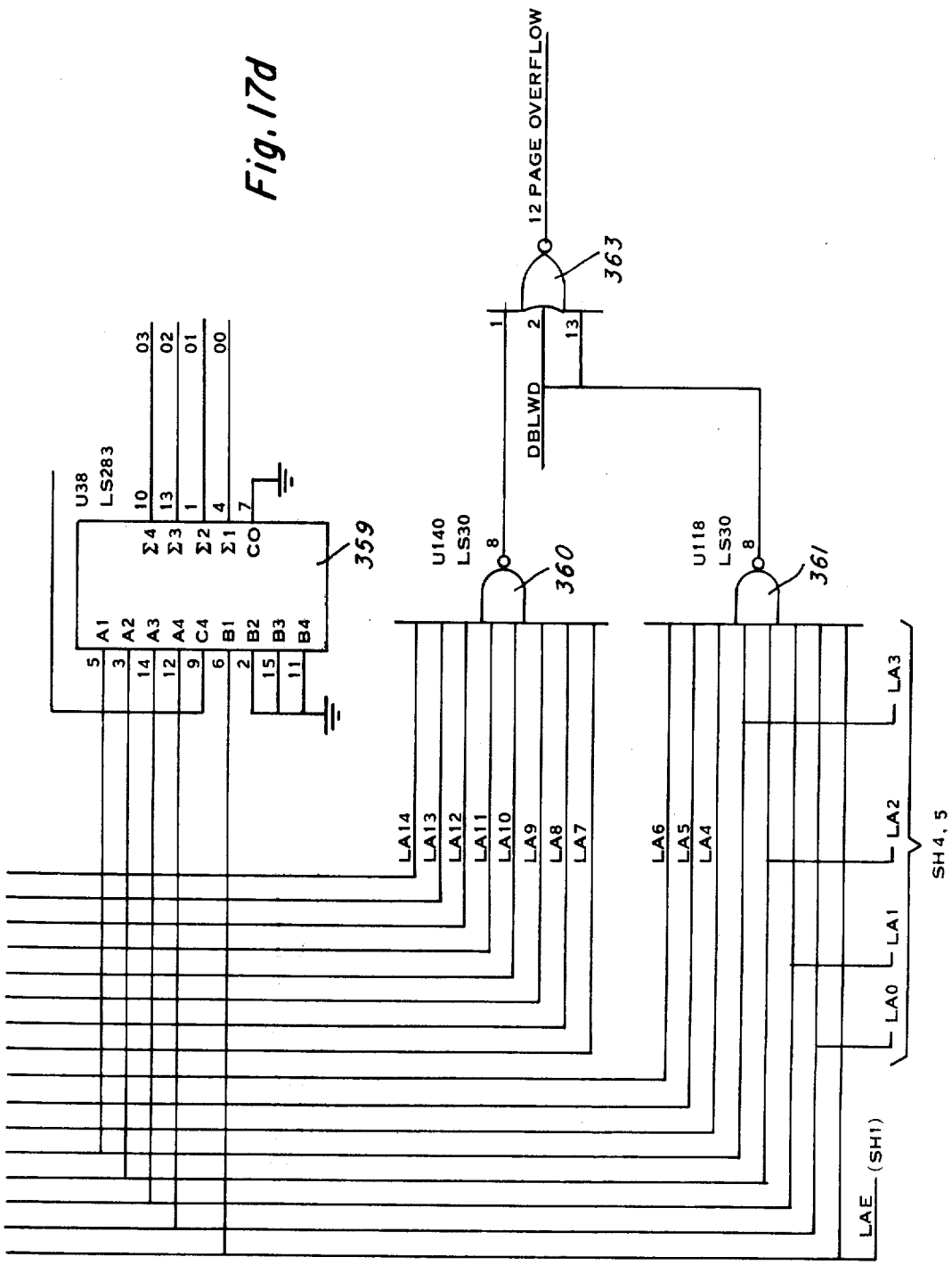

FIG. 17 continues with the description of the memory control 33. Shown are inputs /A2-/A19. Also input is Phase 3 of 4 clock to inverter 351 whose output is the enable input to latch 353. Signal /A2 is inverted through inverter 352 and is provided into the selection circuitry described above. Signal /A3 is also inverted and provided to the selection circuitry. Signals /A4 through /A19 are all inverted with the outputs from the respective inverters providing inputs to the latches 353 and 354. That is, signals /A4-/A11 are inverted and applied as inputs to terminals 1D-8D of latch 353. Signals /A12-/A19 are inverted through their respective inverters and applied as inputs to terminals 1D-8D of latch 354. Latches 353 and 354 may be Texas Instruments Incorporated, SN 74LS 373 octal D-type transparent latches and edge-triggered flip-flops, a description of which begins on page 7-471 of the Texas Instruments Incorporated TTL Data Book for Design Engineers, Second Edition, Copyright 1976.

Address bit A6, on the Q3 output of latch 353 is applied to the A1 input of adder 356. Adder 356 is Texas Instruments type 74LS 283 and is fully described in the TTL Data Book, beginning on page 741-5. Address bit A5, from output Q2 of latch 353 is applied to input 82 of adder 356 and also to the input of NAND circuit 360. Address bit A6 also is applied to the input of NAND circuit 360. Address bit A4, from Q1 of latch 353 is applied to terminal A3 of adder 356 and also as an input of NAND circuit 360.

In like manner, address bits A10, A9, A8, A7 and A11 from latch 353 outputs Q7, Q6, Q5, Q4 and Q8, respectively, are applied as inputs to terminals A1 through A4 of adder 357 and terminal A4 of adder 358, respectively. They are also applied as inputs to NAND circuit 360. Adder 357 is identical to adder 356.

Address bits A12, A13 and A14, present outputs on terminals Q1, Q2 and Q3, respectively, of latch 354 and are provided as inputs A3, A2 and A1 of adder 358, which is identical to adder 356. Bits A12-A14 are also input to NAND circuit 361. Address bits A18, A17, A16, A15 and A19 are output on terminals Q7, Q6, Q5, Q4 and Q8 of latch 354 and are inputs on terminals A1-A4 and B1, respectively, of adder 359 which is identical to adder 356. Bits A15-A19 are also connected as inputs to NAND circuit 361.

The carry generated by the addition of B1 to A1-A4 in adder 359 (caused by increment address bit A19) is generated and sent out on terminal C4 to the carry input terminal C0 of adder 358. In like fashion, terminal C4 of 358 is connected to terminal C0 of adder 357 to provide a carry, if any, to that adder. Similarly, terminal C4 of adder 357 is connected to terminal C0 of adder 356 to provide a carry, if any, to adder 356.

The resultant sum from these adders is the original input to the adders incremented by one and designated summation A0-summation in reverse order. That is, summation 14 is present at summation 4 output of adder 356, while A0 is present at summation 1 of adder 359.

The output of NAND circuit 360 serves as an input to NOR circuit 362 which has another input from the output from NAND circuit 361. Still another input is provided by the /DBLWD signal described earlier. The output of NOR circuit 362 is the PAGE OVERFLOW signal, also mentioned earlier.

Figure 18A:
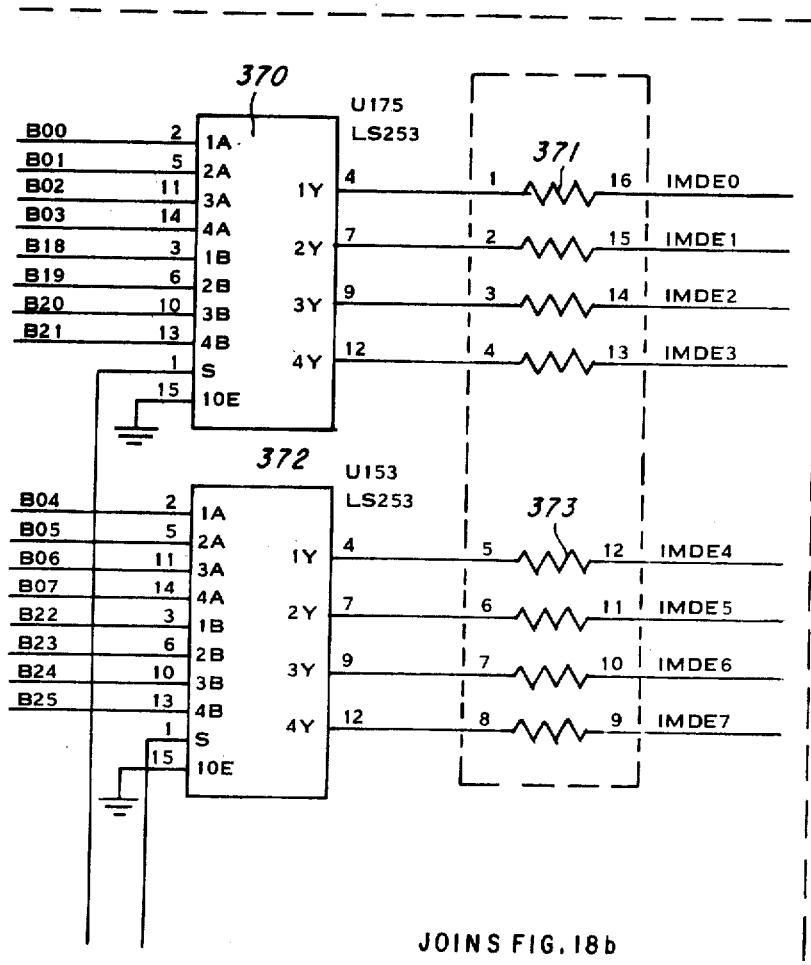
Figure 18B:
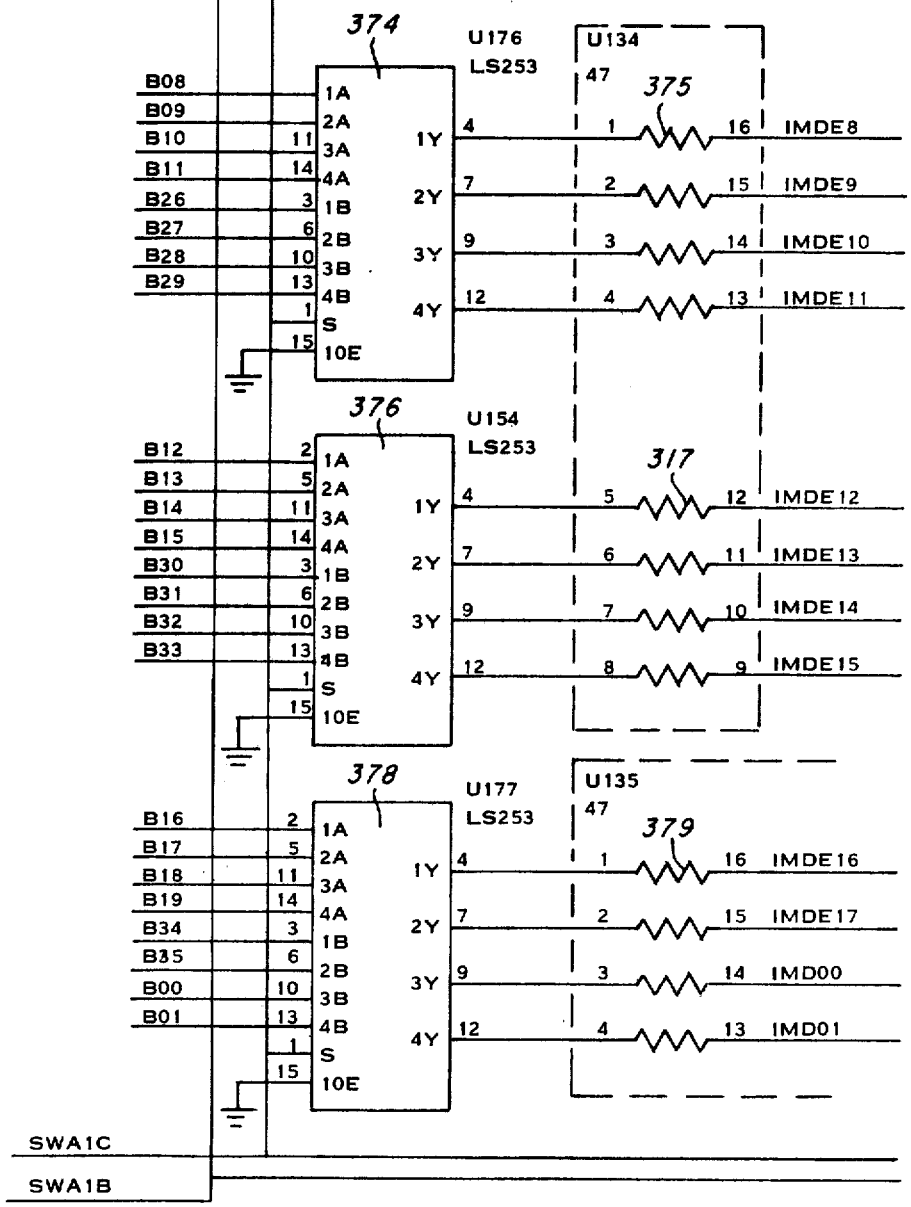
Figure 19A:
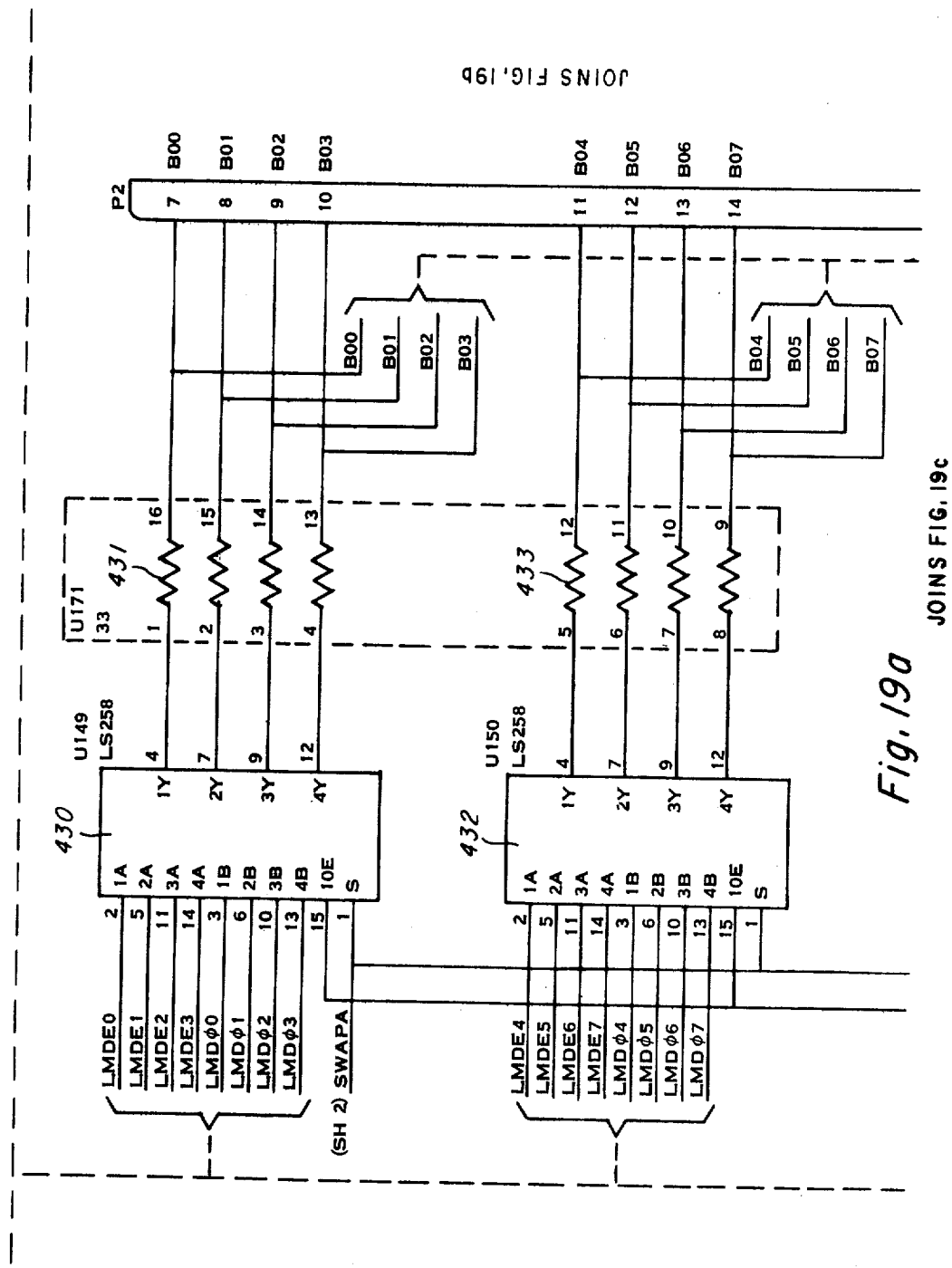
FIGS. 19a-19e form a schematic diagram of the word swap multiplexer (read).
Figure 19B:
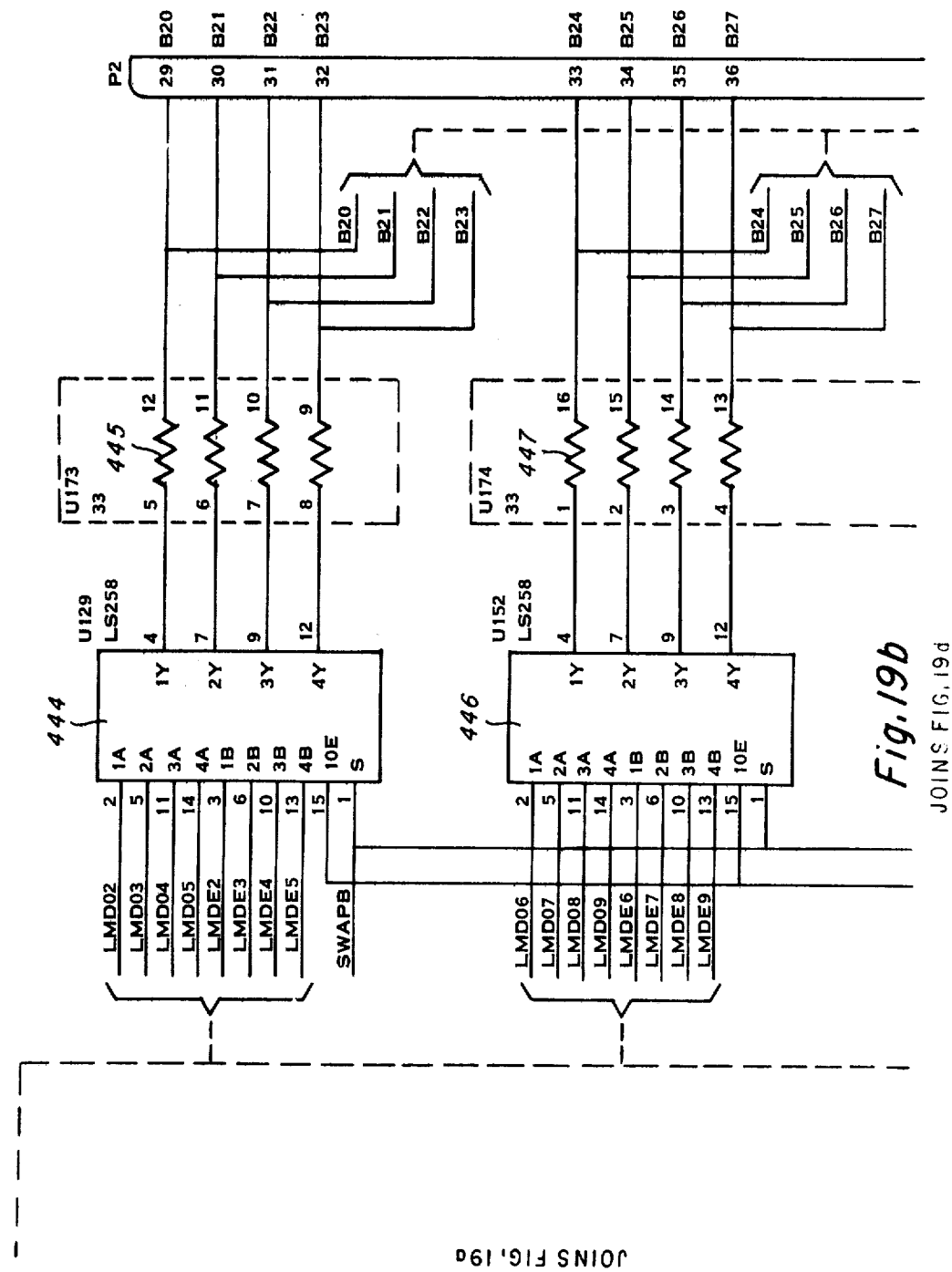
Figure 19C:
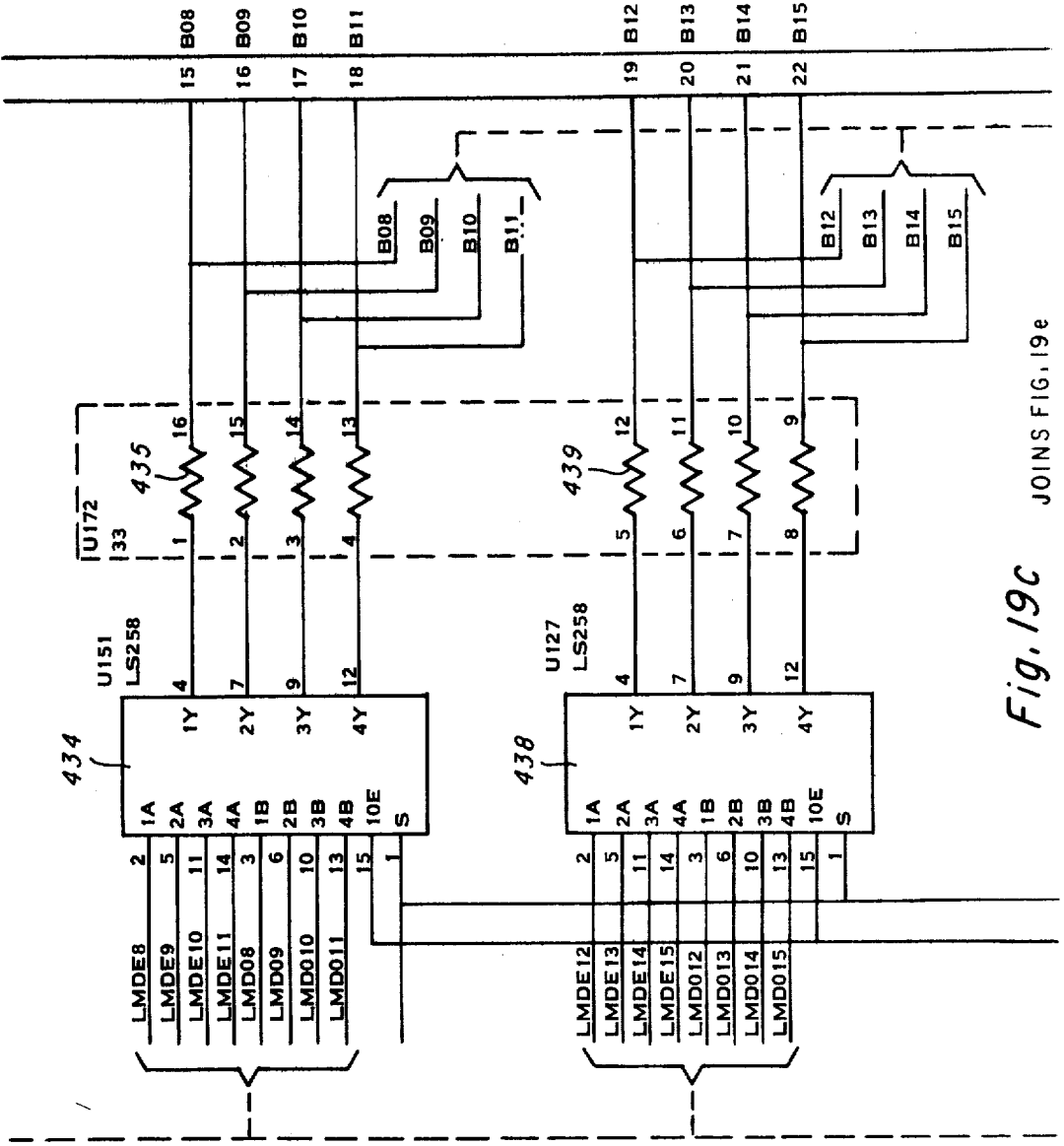
Figure 19D:
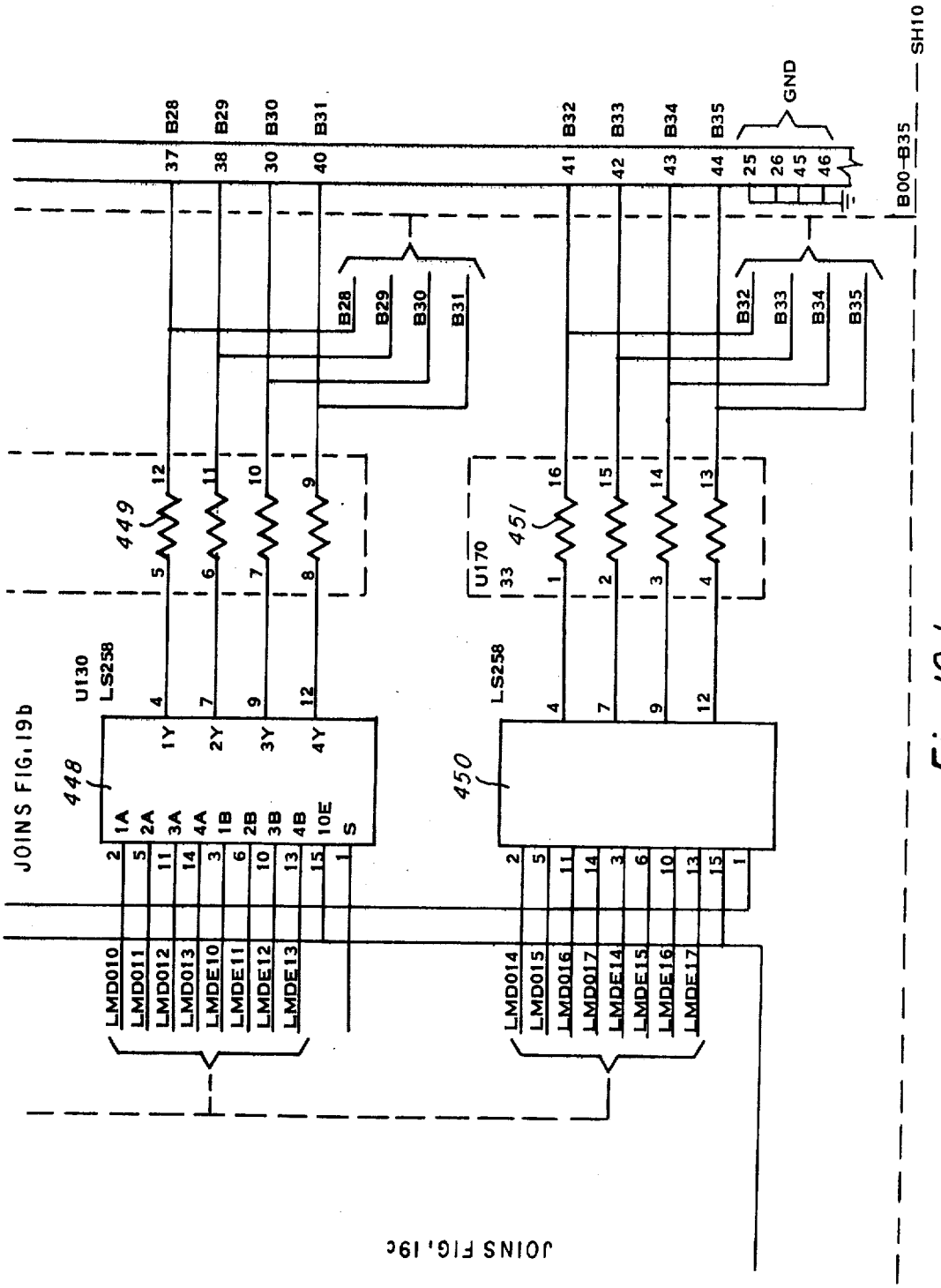
Figure 19E:
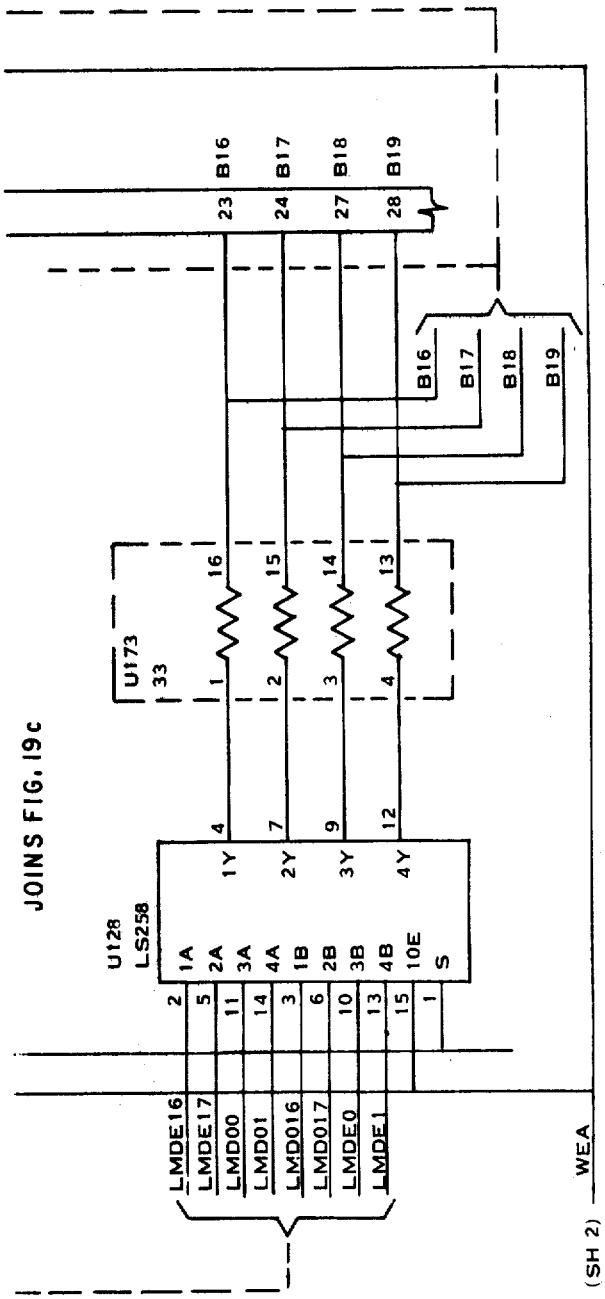

FIG. 18 illustrates the word SWAP multiplexer 35 with respect to the circuitry required to swap words being written into the memory array 34. Buffered data words from a selected one of the input or output controllers, the supervisor, or the vector unit are presented to quadruple II-line-to-one-line data selectors/multiplexers with 3-state outputs, Texas Instruments Incorporated-type SN 74LS 258 described at page 7-372 of the TTL Data Book. Bits B00-B03 are connected to input terminals 1A-4A of multiplexer 370 and bits B18-B21 are connected to input terminals 1B-4B of multiplexer 370. Data bits B04-B07 are connected to input terminals 1A-4A and data bits B22-B25 are connected to input terminals 1B-4B of multiplexer 372. Data bits B08-B11 are connected to input terminals 1A-4A and data bits B26-B29 are connected to input terminals 1B-4B of multiplexer 374. Data bits B12-B15 are connected to input terminals 1A-4A and data bits B30-B33 are connected to input terminals 1B-4B of multiplexer 376. Data bits B16-B19 are connected to input terminals 1A-4A and data bits B34, B35, B00 and B01 are connected to input terminals 1B-4B of multiplexer 378.

Data bits B20-B23 are connected to input terminals 1A-4A and data bits B02-B05 are connected to input terminals 1B-4B of multiplexer 382. Data bits B24-B27 are connected to input terminals 1A-4A and data bits B06-B09 are connected to input terminals 1B-4B of multiplexer 384. Data bits B28-B31 are connected to input terminals 1A-4A and data bits B10-B13 are connected to input terminals 1B-4B of multiplexer 386. Data bits B32-B35 are connected to input terminals 1A-4A and data bits B14-B17 are connected to input terminals 1B-4B of multiplexer 388.

Output terminal 1Y of multiplexer 370 presents either data bit B00 or data bit B18 depending upon the input to the S terminal which is the SWAP B input described earlier. That is, if SWAP B equals 1, then input terminal 1B is selected presenting data bit B18 as signal 1MDE0 through pull-up resistor 371. The memory array is split into an even and odd designation with the "E" in the last mentioned signal designating even memory. If SWAP B equals 0, then there is no swap and data bit B00 appears at terminal 1Y. SWAP C input is applied to the S input terminals of multiplexers 372, 374, 376, 378, 382, and 384. SWAP B signal is also applied to the S terminal of multiplexer 388.

Signal IMDE 1 is formed from either of data bits B01 or B19; signal IMDE 2 is formed from either data bit B02 or data bit B20; signal IMDE 3 is formed from either data bit B03 or data bit B21. In like fashion, from the output of multiplexer 372 either data bits B04-B07 or B22-B25 are present on outputs 1Y-4Y as signals 1MDE 4-1MDE 7. Multiplexer 374 provides either data bit B08-B11 or data bits B26-B29 as signals IMDE 8-IMDE 11. Multiplexer 376 provides either data bits B12-B15 or data bits B30-B33 as output signals 1MDE 12-1MDE 15. Multiplexer 378 presents either B16-B19 or B34, B35, B00 and B01 as output signals 1MDE 16, 1MDE 17, 1MDE 00 and 1MDE 01. The 0 designator in these last two signals indicates the odd memory.

With respect to multiplexers 382-388 the odd memory signals IMD 002-IMD 017 are formed in exactly the same manner as earlier described. That is, the ultimate word formed from these four multiplexers is either B20-B35 or B02-B17. Therefore, it is obvious that when SWAP C and SWAP B signals are present, the lower order bits are exchanged or swapped for the higher order bits.

FIG. 19 also describes the word swap multiplexer 35 with respect to words taken from the memory for presentation to the unit selected. Multiplexers 430, 432, 434, 438, 440, 444, 446, 448, and 450 are all Texas Instruments type 74 LS 258 multiplexers as described above. Memory data bits LMDE0-LMDE3, LMDE4, LMDE7, LMDE8-LMDE11, LMDE12-LMDE15 are applied, respectively, to input terminals 1A-4A of multiplexers 430, 432, 434 and 438. Memory data bits LMD 16, LMDE 17, LMD00, LMD01 are applied to inputs 1A-4A of multiplexer 440. Memory data bits LMD00-03, LMD04-07, LMD08-011, LMD012-LMD015, LMD016, LMD017, LMDE0, and LMDE1 are applied, respectively, to input terminals 1B-4B of each of multiplexers 444, 446, 448, and 450. As described for the other direction of word swap, the 1Y terminal of multiplexer 430 will be provided with either the signal present on input terminal 1A or 1B depending upon whether signal /WEA, mentioned earlier, is present to initiate a swap. That is, if /WEA is high, then the output on terminal 1Y of multiplexer 430 will be a signal present on input terminal 1B, which is memory data LMD00. If /WEA is low, then LMDE0 on input terminal 1A will be present on output terminal 1Y. Output terminal 1Y is connected through a pull-up resistor 431 and output as signal B00. In the same manner as described earlier, outputs B00-B35 are provided from output terminals 1Y-4Y of the multiplexers 430-450. The swap signal /WEA is applied to the 0E terminal of each of the multiplexers, so that if it is high, the words will be swapped. That is to say, the memory data bits between the odd and even portion of the memory will be interchanged. The SWAP A signal mentioned above is applied to the S terminal of multiplexers 430, 432, 434, 438, and 440. SWAP B signal is applied to the S terminal of multiplexers 444, 446, 448, and 450. When the SWAP A and SWAP B signals are high, then the B input terminal signals are output on the Y output terminals, providing a swap of the even bits for the odd bits or the upper half of the word for the lower half of the word.

Figure 5A:
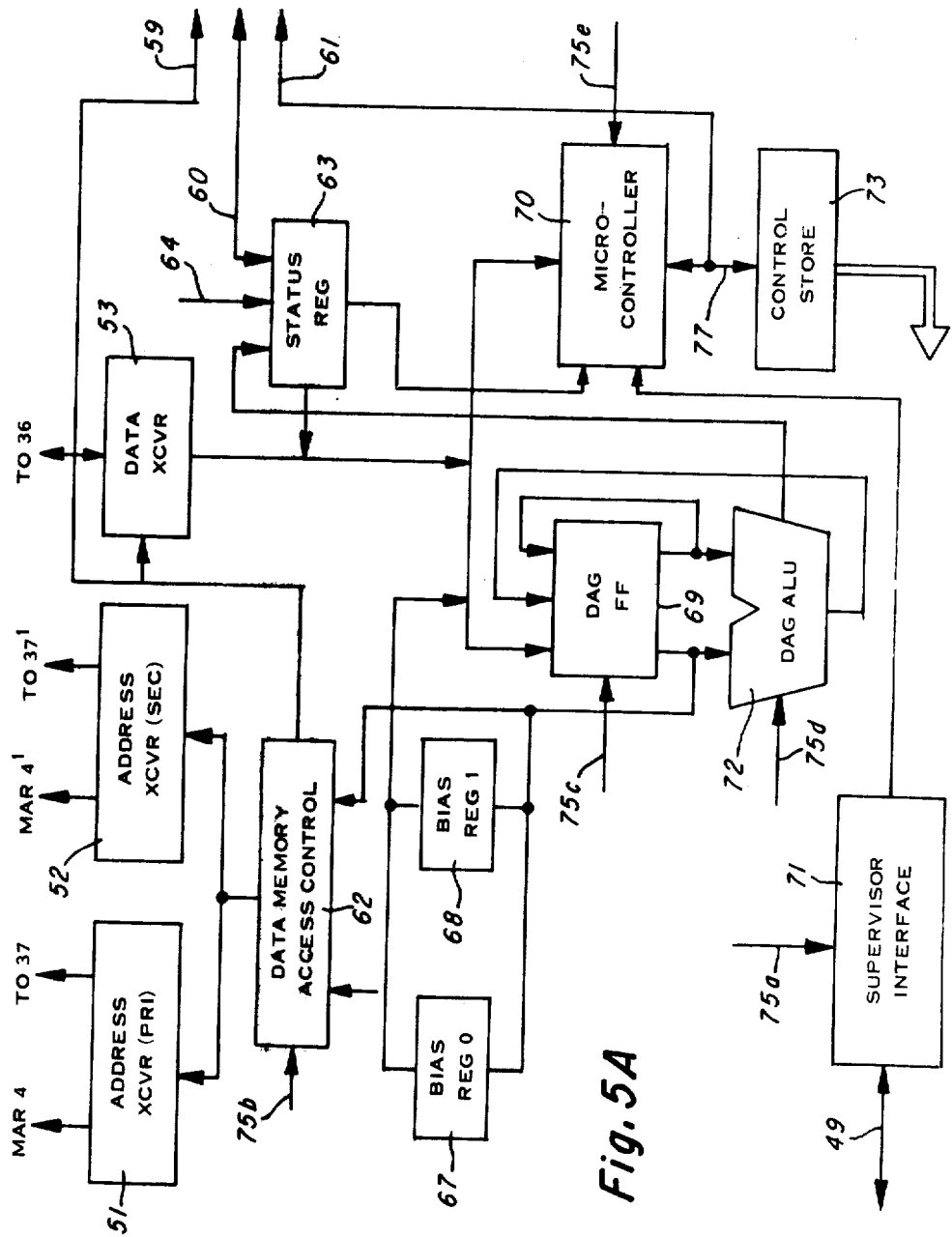
FIG. 5a is a block diagram of the VCU of the vector unit.

FIG. 5A is a block diagram of the VCU having primary address interface 51 connected to secondary address interface 52 each of which are connected to data memory access control 62. It should be noted that the supervisor also has access to secondary memory but the transceiver is not shown. Data memory access control 62 is connected to bias register 67 and to bias register 68, which are connected in parallel to bias register 67. Data transceiver 53 is connected to data address generator 69 and to status register 63. Data address generator 69 is also connected to the bias registers 67 and 68 and to data memory access control 62. An output of data address generator 69 is connected to arithmetic logic unit 72, to bias registers 67 and 68 and to data memory access control 62. Still another output from data address generator 69 is connected to the input of DAG 69. The output of ALU 72 is connected to the input of DAG 69 and to status register 63. Status register 63 has a status line input 60 and a parity line input 64. Parity checking is well known and may or may not be employed in a computing system. In the present invention, a rudimentary parity checking system is employed, but is not necessary, and is therefore not illustrated.

Supervisor interface 71 is shown connected to the bus 49 which connects in turn to interrupt control 45 of FIG. 4.

Figure 7:
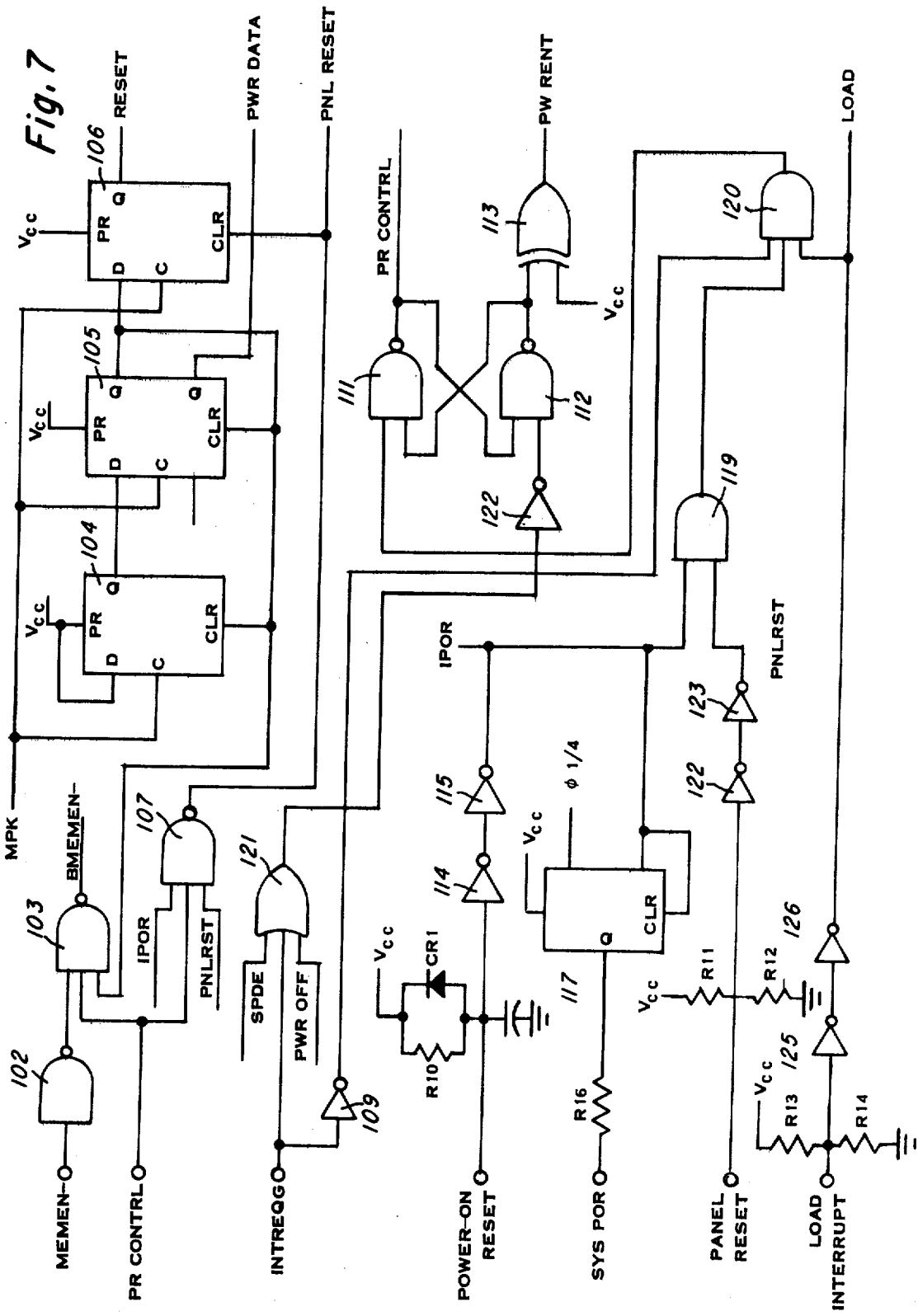
FIG. 7 is a schematic diagram illustrating interrupt controls for the power up—power down control.

FIG. 7 illustrates a portion of interrupt control 45 of FIG. 4. The memory enable signal /MEMEN from microprocessor 44 enters as a single input to NAND circuit 102 whose output is connected as an input to NAND circuit 103. Another input to NAND circuit 103 is /PR CONTRL. The output of NAND circuit 103 is signal /B MEMEN. The /PR CONTRL signal also is applied as an input to AND circuit 107 whose other inputs are signals /IPOR and /PNLRST. The output from AND gate 107 is the PNL RESET signal and is applied to the clear inputs of flip-flops 104, 105 and 106. The clock input to flip-flops 104, 105 and 106 comes from the microprocessor clock. The preset terminal of flip-flops 104–106 is tied to VCC and to the D input of flip-flop 104. The Q output of flip-flop 104 is connected to the D input of flip-flop 104 and the Q output of flip-flop 105 is connected to the D input of flip-flop 106 and as an input to NAND gate 103. The /Q output of flip-flop 105 is the PWR DATA output while the Q output of flip-flop 106 is the RESET for the microprocessor 44.

The /INTREQ signal, mentioned earlier, is an input to inverter 109 and to NAND gate 120. The /INTREQ signal serves as one input to NOR gate 121 whose other inputs are signals SPDE (Supervisor Power Down Enable) and PWR OFF (POWER-OFF). The output of NOR gate 121 is inverted through inverter 122 and is an input to the PR CONTRL latch, specifically, to NAND gate 112 whose output is an input to NAND gate 111 whose output, in turn, is the other input to NAND 112. The other input to NAND gate 111 is the output of AND gate 120 which has the output of inverter 109 as one input. The /POWER-ON RESET which may be applied by a button control on a panel or by a host computer is applied to inverter 114. Resistor R10 is tied to the input of inverter 114 at one end and into a voltage VCC at the other. Voltage VCC is connected to the cathode of diode CR 1 whose anode is connected to inverter 114. One plate of capacitor C1 is connected to the input of 114, and the other plate is connected to ground. The output of inverter 114 is inverted again through inverter 115 providing signal /IPOR for inputting to AND gate 107 and also as the clear and D input to flip-flop 117. The Q output of flip-flop 117, through resistor R16, is the /SYS POR (System Power-On signal) applied to the other units of the MVP. The output of inverter 115, signal /IPOR, also is one input to AND gate 119. The PANEL RESET input from the panel or from the host computer is applied to the input of inverter 122. Resistor R11 is connected between the input to inverter 122 and voltage VCC and resistor R12 in connected between that input and ground. The output of inverter 122 is again inverted through a inverter 123 providing the PNL RST signal for application to AND gate 107 and also to AND gate 119. The other output from AND gate 119 serves as another input to AND gate 120.

The load interrupt signal from a panel or from a host computer is applied to the input of inverter 125. Resistor R13 is connected between VCC and that input and resistor R14 is connected between that input and ground. The output of inverter 125 is again inverted through inverter 126 which is applied as the third input to AND gate 120.

Figure 8:
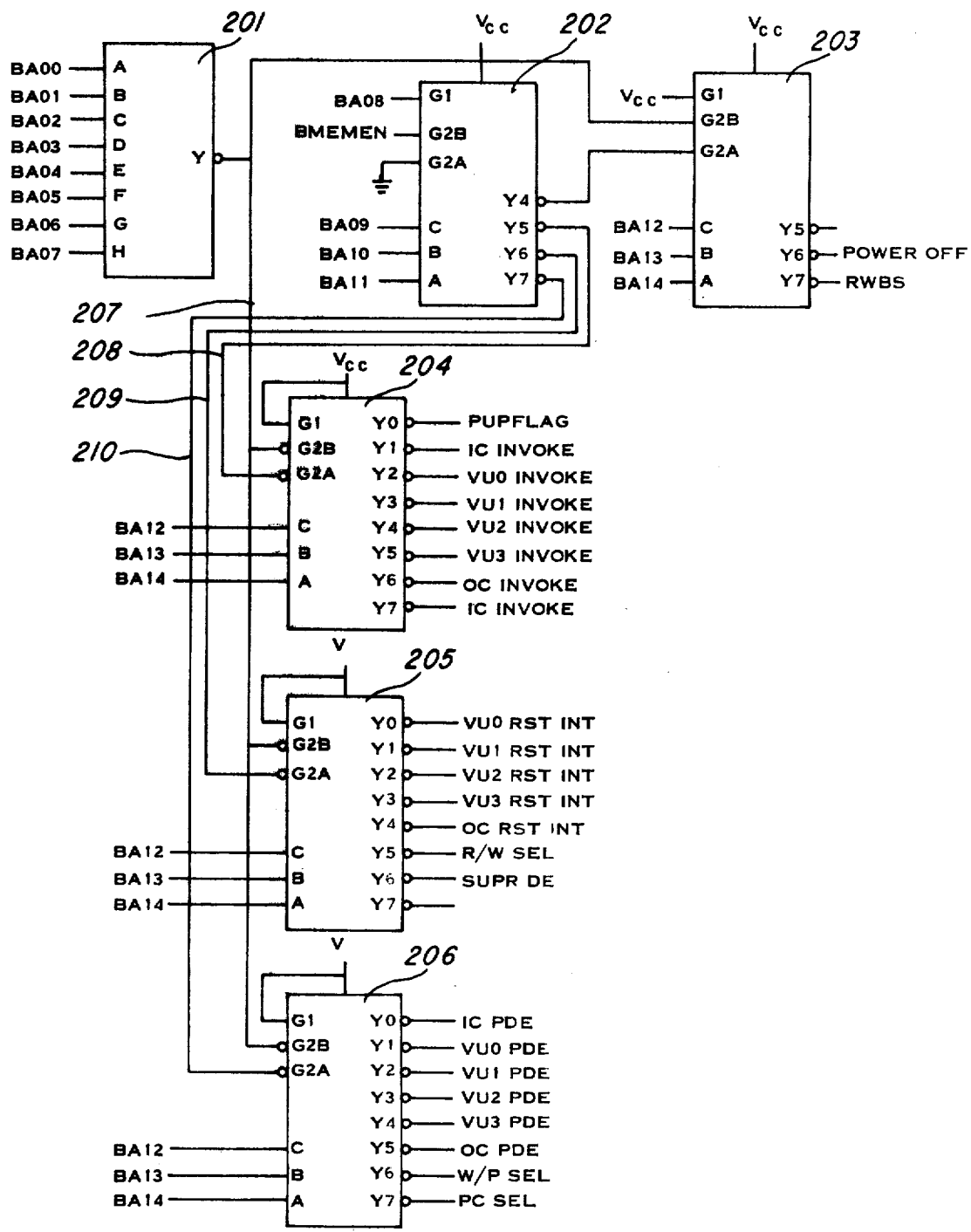
FIG. 8 is a schematic diagram illustrating interrupt control generated from the address register of the microprocessor.

FIG. 8 illustrates another part of the interrupt control 45. In this case, address lines are employed to generate interrupt signals. The address lines BA00–BA07 are applied as inputs to input terminals A-H of an 8-input positive-NAND gate circuit 201. Address line BA08 is applied to input terminal G1, and a signal /B MEMEN, mentioned above, is applied to input terminal G2B of circuit 202 which is a Texas Instruments type SN 74LS 138 3-to-8-Line decoder described beginning on page 7-134 of the TTL Data Book. Input G2A is grounded. Inputs G1, G2A and G2B are enabling inputs. Address lines BA09, BA10, and BA11 are connected to the select inputs C, B and A, respectively. Voltage VCC is applied to the G1 input of circuit 203 which is a Texas Instruments type 74 LS138 circuit. Enable input G2B is connected to the Y output of circuit 201 and G2A of circuit 203 is connected to output Y4 of circuit 202. The select inputs C, B and A of circuit 203 have applied to them, respectively, address lines BA12, BA13, and BA14. A POWER OFF signal is provided on output terminal Y6, and signal /RWBS is provided on output terminal Y7 of circuit 203.

Enable circuit G1 of decoder 204 (type 74 S138) has voltage VCC applied thereto. Enable input G2B of decoder 204 is connected to the Y output of circuit 201. The G2A enable input of decoder 204 is supplied by the Y5 output from decoder 202. A select for input terminals C, B and A have applied to them address lines BA12, BA13 and BA14 to provide from encoder 204 the signals: /PUP FLAG (Power-Up Flag), /IC INVOKE, /VU0 INVOKE, /VU1 INVOKE, /VU2 INVOKE, /VU3 INVOKE, /OC INVOKE (Input Controller, Vector Units 0-3 and Output Controller Invoke), and /IC RST INT (Input Controller Reset Interrupt).

Decoder 205 is a Texas Instruments type 74 LS 138 decoder whose G1 enable input is connected to voltage VCC, whose G2B input enable is connected to the Y output from circuit 201 and whose G2A input enable is connected to the Y6 output of decoder 202. Its select inputs C, B and A have applied to them the signals from address lines BA12, BA13 and BA14, respectively. Decoder 205 has output terminals Y0–Y17 providing output signals /VU0 RST INT (vector unit zero reset interrupt); /VU1 RST INT (vector unit one); /VU2 RST INT (vector unit two); /VU3 RST INT (vector unit three); /OC RST INT (output controller reset interrupt); /R/W SEL (read-write select for bias register); /SUPR PDE (supervisor power down enable), respectively.

Decoder 206 is also a 74 LS 138 whose G1 enable input is connected to VCC, whose G2B enable is connected to the Y output from circuit 201 and whose G2A enable is connected to the Y7 output from decoder 202. Signals from address lines BA12, BA13 and BA14 are applied to the select inputs C, B and A, respectively, of decoder 206. The Y0–Y7 outputs from decoder 206 provide signals /IC PDE (input controller power down enable); /VU0 PDE-VU3 /PDE (vector unit 0-3 power down enable); /OC PDE (output controller power down enable); /W/P SEL (work space pointer select); /PC SEL (program counter select).

The interrupts set out above include signals for a total of four vector units, VU0–VU3. These four units are handled by a single supervisor and are exemplary of the capability of the supervisor. However, more or less than four vector units may be handled.

Figure 9:
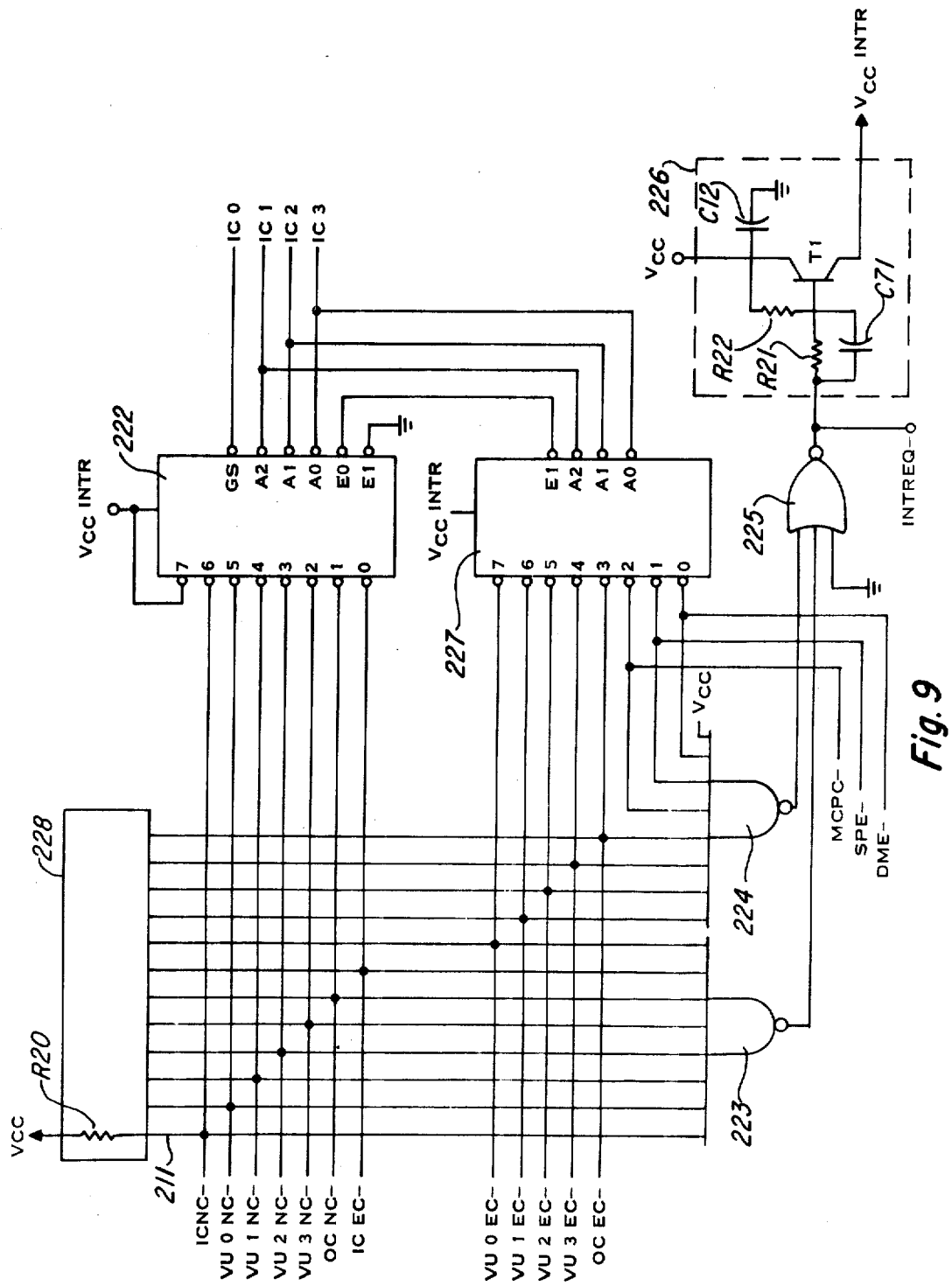
FIG. 9 is a schematic diagram of the supervisor interrupt logic.

FIG. 9 illustrates more circuitry for the supervisor interrupt control 45. The signals shown are /IC NC (input controller normal completion); /VU0 NC (vector unit 0 normal completion); /VU3 NC (vector unit 3 normal completion); /IC EC (input controller error completion). These inputs are connected to input pins 6, 5, 4, 3, 2, 1 and 0 of encoder 222. Encoder 222 is a Texas Instruments type SN 74LS 348-8-line-to-three-line priority encoder with 3-state output, fully described beginning at page 7-448 of the TTL Data Book. Encoder 222 encodes the highest-order data line, providing on GS, A2, A1 and A0 output lines signals IC 0, IC 1, IC 2 and IC 3, respectively. The enable output to encoder 222 is connected to input E1 of encoder 227 which is identical to encoder 222.

Input signals /VU0-3 EC (vector units 0-3 error completion); /OC EC (output controller error completion) are connected to input pins 7-3, respectively, of encoder 227. The pull-up pack 228 is simply a plurality of resistors connected in parallel to VCC. Each resistor such as resistor R20 is connected to line 211 which also connects to the line carrying signal /IC NC and is further connected as an input to NAND gate 223. Seven identical resistor line combinations are connected to the lines bearing signals /VU0 NC-VU3 NC, /OC NC, /IC EC and /VU0 EC, and finally connected as inputs to NAND gate 223. Four other resistor line combinations are connected to the lines bearing signals /VU1 EC-/VU3 EC and /OC EC, and also as inputs to NAND gate 224. Signal /MCPC which is a signal provided by a host computer (optional) is connected to another input of NAND 224 and also to input pin 2 of encoder 227. Signal /SPE which is a supervisor parity error (optional) is applied as another input to NAND gate 224 and also as an input to input pin 1 of encoder 227. Signal /DME which is a D to memory error signal is applied to still another input of NAND gate 224 and is also applied to input pin 0 of encoder 227. Outputs A2, A1 and A0 of encoder 227 are connected to outputs A2, A1 and A0 of encoder 222, respectively.

The outputs of NAND gates 223 and 224 provide inputs to NOR gate 225 whose output is interrupt request which is further connected to the power-up circuit 226.

Power-up circuit 226 is comprised of resistor R21 across which is tied capacitor C11. One end of resistor R21 is tied to the output from NOR circuit 225 and the other end is tied to one end of resistor R22 and to the base of transistor T1. The collector of transistor T1 is connected to VCC and to the other end of resistor R22. Also connected to the collector of transistor T1 is capacitor C12 whose other plate is connected to ground. The emitter of transistor T1 is connected as an output VCC INTR which is applied to decoders 222 and 227 under VCC inputs. The circuit shuts off the power on the encoders 222 and 227 upon a signal from NOR circuit 225 shutting off transistor TI. Power is again applied upon change in the signal from NOR circuit 225.

Figure 10:
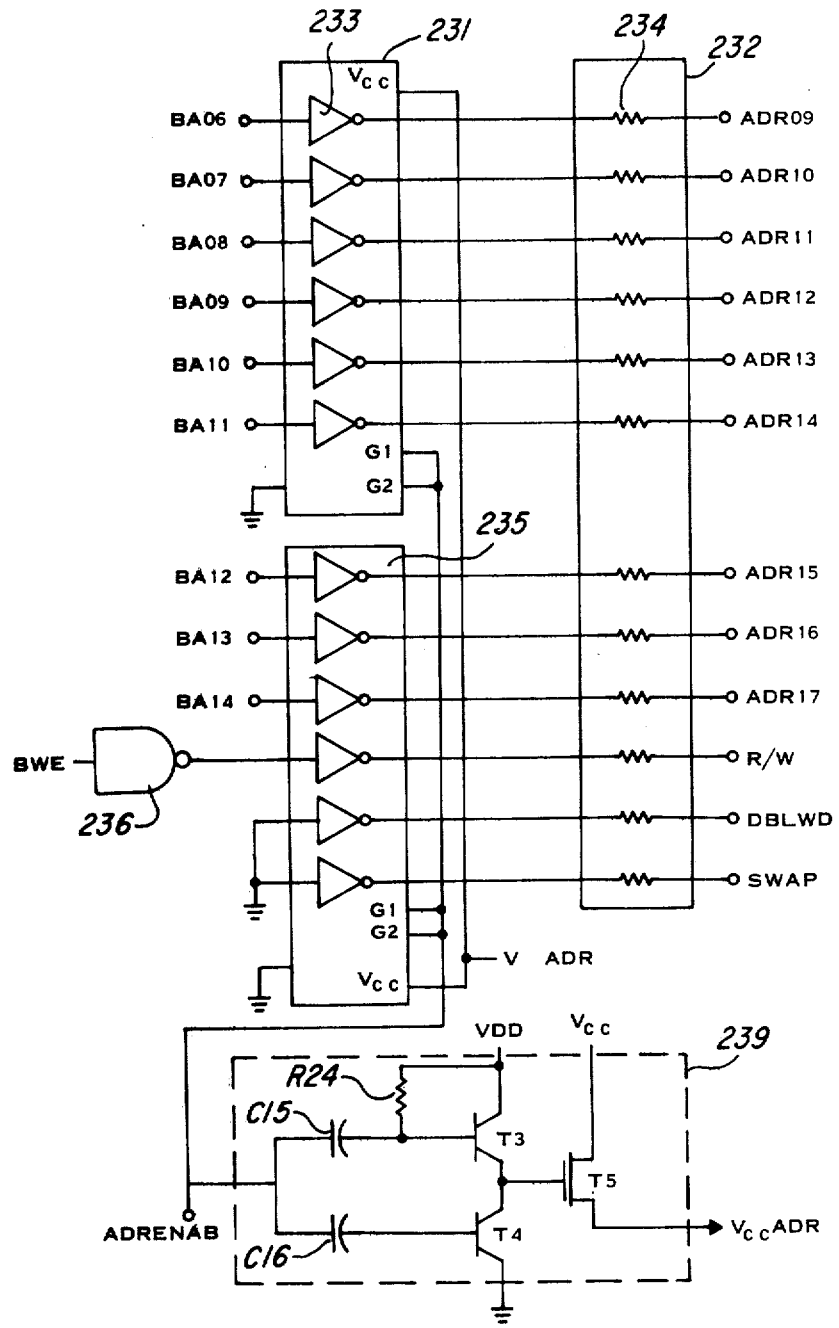
FIG. 10 is a schematic diagram of the address transceiver between the lower order address lines from the supervisor to the data memory.

FIG. 10 illustrates a portion of the address transceiver 41 of the supervisor shown in FIG. 4. These addresses are the so-called lower order addresses and are shown as signals BA06-BA11 and BA12-14. BA06 is an input to bus driver inverter 233 whose output, through pull-up resistor 234, is designated as /ADR09. The bus driver inverter 233 is one of six contained in Texas Instruments type 74 SL 368-hex bus drivers with 3-state outputs fully described beginning at page 636 of the TTL Data Book. The remaining inputs to bus drivers circuit 231 are BA07 and BA11 which in identical fashion with BA06 are inverted and through resistors result in signals designated /ADR10-/ADR14.

Hex bus drivers 235 is a circuit identical to hex bus driver 231 with input signals BA12-BA14 resulting in output signals /ADR15-/ADR17.

Signal /BWE is an input to AND NAND gate 236 resulting in an output signal BWE which is applied to one of the hex inverters of circuit 235, again passed through a pull-up resistor resulting in the signal /R/W, a control signal. The remaining two driver inverters have grounded inputs, and their outputs are connected through resistors resulting in output signals /D BLWD and /SWAP. Terminals G1 and G2 of both circuits 231 and 235 are tied together to receive a signal /ADRENAB (address enable). The signal /ADRENAB is applied to power-up circuit 239, specifically to the plates of capacitors C15 and C16, respectively, and to the bases of transistors T3 and T4, respectively. The emitter of transistor T3 is tied to voltage VDD and the emitter of transistor T4 is tied to ground. The collectors are tied together to the gate of field effect transistor T5 whose source is connected to voltage VCC and whose drain provides signal VCCADR, which signal is applied to the VCC input pin from each of circuits 231 and 235. Circuit 239, in response to signal /ADRENAB, turns off FET T5 when address transceiver 41 is not in use, causing disconnection of VCC from circuits 231 and 235.

Figure 11:
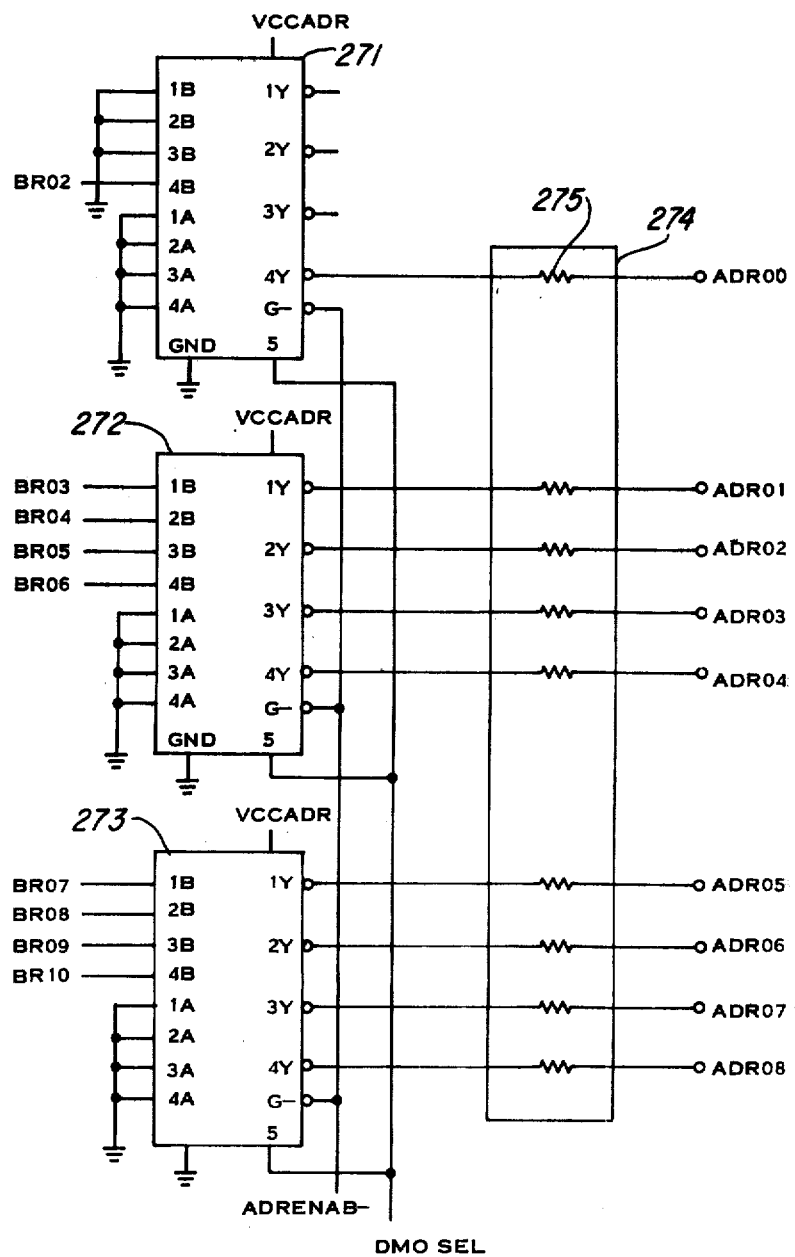
FIG. 11 is a schematic diagram of the address transceiver for the higher order address lines from the supervisor to the data memory.

FIG. 11 illustrates the higher order address portion of the address transceiver 41. Three Texas Instruments type 74 LS 258A quadruple two-line-to-1-line data multiplexers 271, 272 and 273 are employed and controlled by the signal VCCADR so that when not in use are shut down. Circuit 271 has all inputs grounded except signal BR02 (from the bias register to be described later) to input pin 4B. The only output is from pin 4Y connected to pull-up resistor 275 from which signal /ADR00 is developed. Circuit 272 has input signals BR03-BR06 applied to input pins 1B-4B. Input pins 1A-4A are grounded. Outputs 1Y-4Y are each applied through pull-up resistors resulting in signals designated /ADR01-/ADR04. In similar fashion, the inputs to circuit 273 are signals BR07-BR10 applied to input pins 1B-4B with input pins 1A-4A grounded. Outputs 1Y-4Y pass through pull-up resistors resulting in signals designated /ADR05-ADR08. The select input pin of each of circuits 271-273 is activated by signal /DM0 SEL.

Figure 12:
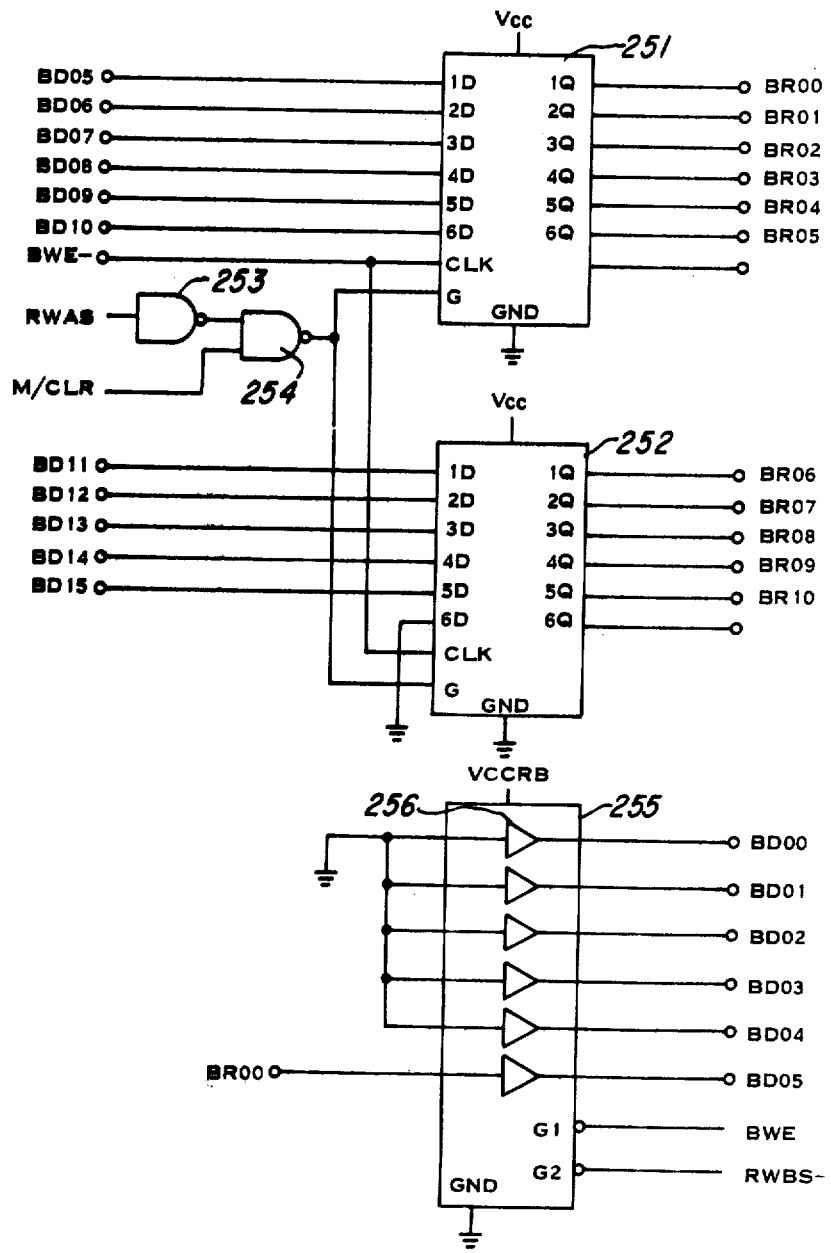
FIG. 12 is a schematic diagram of the read/write (R/W) bias register for biasing, by a predetermined amount, the address from the microprocessor of the supervisor.

FIG. 12 illustrates the bias register 43 of the supervisor. Supervisor data lines BD05-BD10 are input to the bias register section 251 whose corresponding outputs from the D type flip-flops designated signals BR00-BR05. In the same manner, supervisor data line signals BD11-BD15 are input to the bias register section 252 at inputs 1D-5D, and output on terminals 1Q-5Q as signals BR06-BR10. The control signal /BWE is applied to the clock inputs of each of sections 251 and 252 of the bias register. Control signals /RWBS and M/CLK are applied to NAND gates 253 and 254, respectively, with the output of NAND gate 253 being an input to NAND gate 254. The output of NAND gate 254 serves as the enable input to sections 251 and 252.

Circuit 255 is a hex bus driver, Texas Instruments type 74 LS 365 mentioned earlier. All of the inputs but one are grounded, and those grounded inputs are inverted and shown as output signals BD00-BD04. Input BR00 is inverted and becomes signal BD05. These are the upper order bits, thus locking out the possibility of writing an address to the bias register greater than a predetermined number. The enable inputs /G1 and /G2 of circuit 255 are applied by control signals /RWBS and BWE, respectively. Note that circuit 255 is supplied with the voltage VCCRB which, as will be indicated below, is supplied only when the circuit is active.

The bias register 43 functions in the supervisor 12 to provide a block of 1024 addresses generated by loading desired address numbers into the bias register. As shown in FIG. 4, the output of the bias register goes to the address transceiver 41 along with the lower order address bits shown in FIG. 10. This essentially adds the lower order address bits to the bits from the bias register which are the higher order bits thereby providing a window of 1024 words of data memory that can be scanned.

Figure 13:
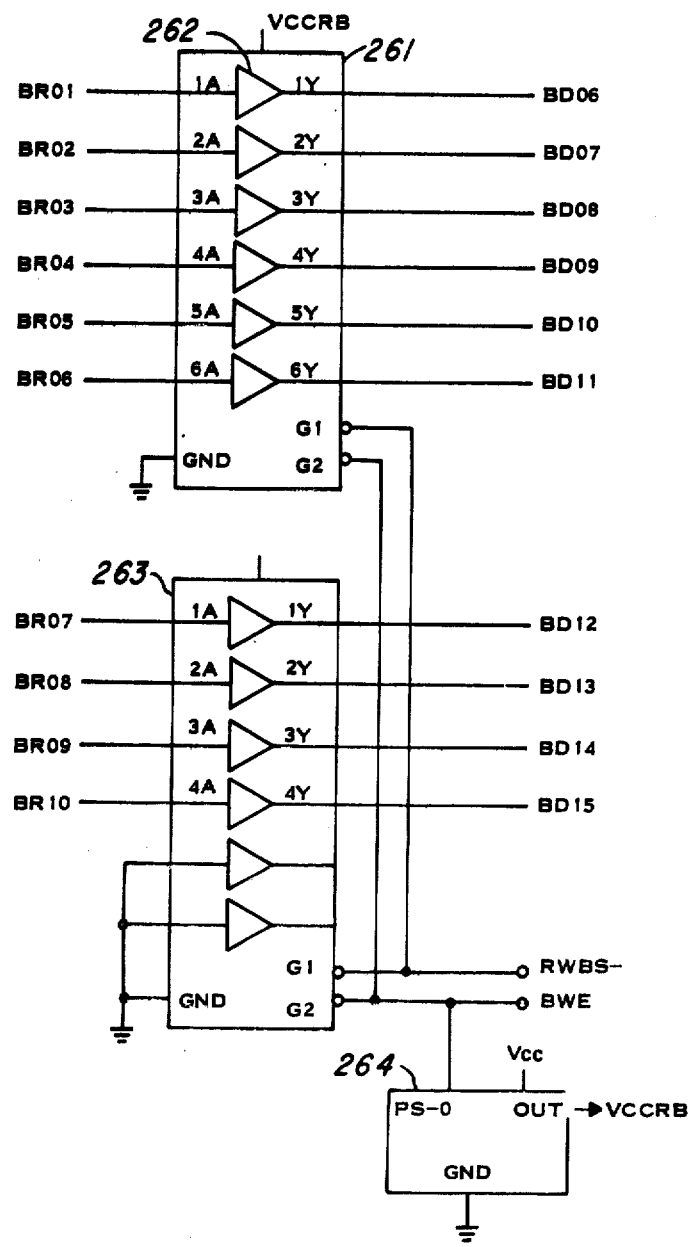
FIG. 13 is a schematic diagram showing the address transceiver for the bias register to connect to the data memory.

FIG. 13 has buffer driver circuits 261 and 263 which are Texas Instruments type 74 LS 365 hex bus drivers described in detail beginning at page 636 of the TTL Data Book. Inputs from the bias register BR01-BR06 are applied to inputs 1A-6A of circuit 261 whose outputs 1Y-6Y are signals BD06-BD11. Bias register signals BR07-BR10 are applied to inputs 1A-4A of circuit 263 whose corresponding outputs 1Y-4Y then carry signals BD12-BD15. Enable inputs /G1 and /G2 of both circuits 261 and 263 are supplied by the control signals /RWBS and BWE.

The power-up circuit 264, which has as an input control signal /RWBS, is identical to circuit 226 shown in FIG. 9 and supplies output voltage VCCRB which is used as a supply voltage to circuits 261 and 263 and also to circuit 255 of FIG. 12, so that when not in use, power is not applied.

Figure 14:
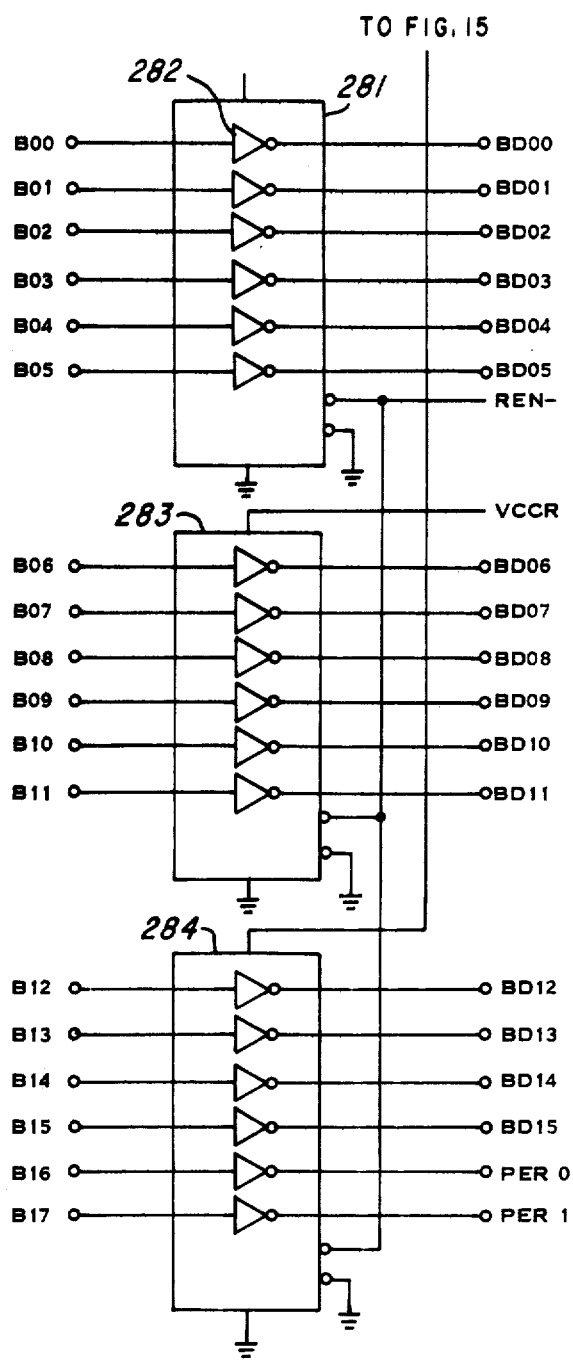
FIG. 14 is a schematic diagram of the data transceiver (read data) of the supervisor to the data memory.

FIG. 14 illustrates the data transceiver 42 of the supervisor 12 for reading data. Three hex bus drivers, Texas Instruments type 74 LS 366 described at page 6-36 of the TTL Data Book are employed. Data inputs /B00-/B05 are inverted through the drivers of circuit 281 and presented on the output pins as signals BD00-BD05. In like manner, data bits /B06-/B11 are input to circuit 283 whose output pins then carry signals BD06-BD11. Finally, input data bits /B12-/B15 are presented on the input pins of circuit 284 to provide on the output pins signals BD12-BD15. Signals /B16 and /B17 are also presented on the input pins of circuit 284 to provide on the output pins the signals PER 0 and PER 1 (Parity Error 0 and Parity Error 1), respectively. Note that the enable signal is control signal /REN (Read Enable), and the voltage applied is VCCR only when the circuits 281, 283 and 284 require power.

Figure 15:
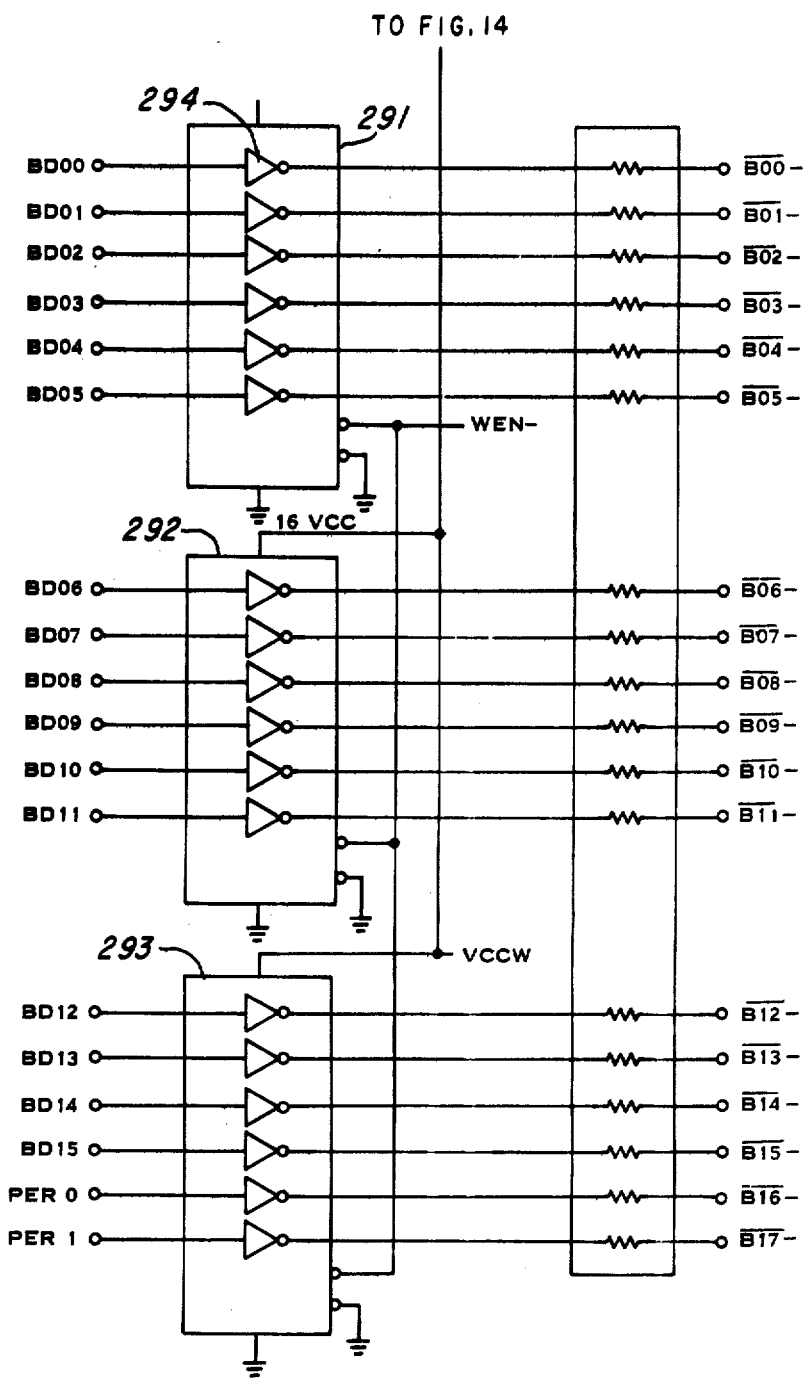
FIG. 15 is the data transceiver (write data) of the supervisor to the data memory.

FIG. 15 is supervisor data transceiver 42 illustrating the circuitry for the write data mode. Again, there are three inverting data driver circuits 74 LS 366. These circuits are numbered 291, 292 and 293. The buffer data signals supplied to the circuit 291 are BD00-BD05 and presented through pull-up resistors as signals /B00-/B05. Similarly, input signals BD06-BD11 are presented on the input pins of circuit 292, the outputs being applied to pull-up resistors resulting in output signals /B06-/B11. Finally, input signals BD12-BD15, PER 0 and PER 1 are applied to the input pins of circuit 293 resulting in output signals /B12-/B17. The enable signal is provided by control signal /WEN (Write Enable) and the voltage applied is signal VCCW, so that when the circuits are not in use, the power is turned off as described with respect to earlier Figures.

The microprocessor 44 of supervisor 12 is an extremely important component of the entire system and is implemented, in this preferred embodiment, in I²L technology as mentioned earlier. It is a Texas Instruments type SBP9900 microprocessor and is described in a Texas Instruments publication entitled 9900 FAMILY SYSTEMS DESIGN AND DATA BOOK—MICROPROCESSOR SERIES, First Edition, Copyright 1978, Library of Congress Catalog No. 78-058005.

The program memory 46 of supervisor 12 is generally comprised of a read-only memory for the instruction list and a random access memory (RAM) for the data. The size of these memories is arbitrary, and the selection may be made from the above-referenced FAMILY SYSTEMS DESIGN AND DATA BOOK. However, in this preferred embodiment, the ROM is a Signetics type 82S191 and the RAM is a Hitachi type HM6147LP. The memories are made up by interconnecting chips to the desired size.

Microcontroller 70 of FIG. 5A controls the operation of the vector unit and is an extremely important component of the vector unit. Microcontroller 70 is fully described in Texas Instruments internal specification attached hereto as Appendix B, comprising numbered pages 4-35 dated Nov. 21, 1978, three pages of "Signetics Bipolar Field-Programmable Logic Array—16×48×8FPLA Program Table; and 9 sheets of drawing No. 2054725 FSCM No. 96214; and 15 pages of program table dated Jan. 18, 1979.

The control store 73 for the vector unit is the Signetics ROM mentioned above, interconnected to form a 72-bit half word. The other half of the word is formed in control store 84 of FIG. 5B, the CALU. Control store 84 is also made up of the Signetics ROMs.

The output of bus 75 of control store 73 has control bits which are shown applied to the supervisor interface 71 via bus 75a, to the data memory access control 62 via bus 75b, to the DAG register 69 via bus 75c, to the DAG arithmetic logic unit 72 via bus 75d, and to the microcontroller 70 via bus 75e.

The data address generator register 69 is implemented in I²L circuits. It is described in detail in a Texas Instruments internal specification identified as Appendix D and attached hereto. Appendix D is comprised of numbered pages 4 through 18 and 10 sheets of drawing No. 2054713, FSCM No. 96214.

Figure 5B:
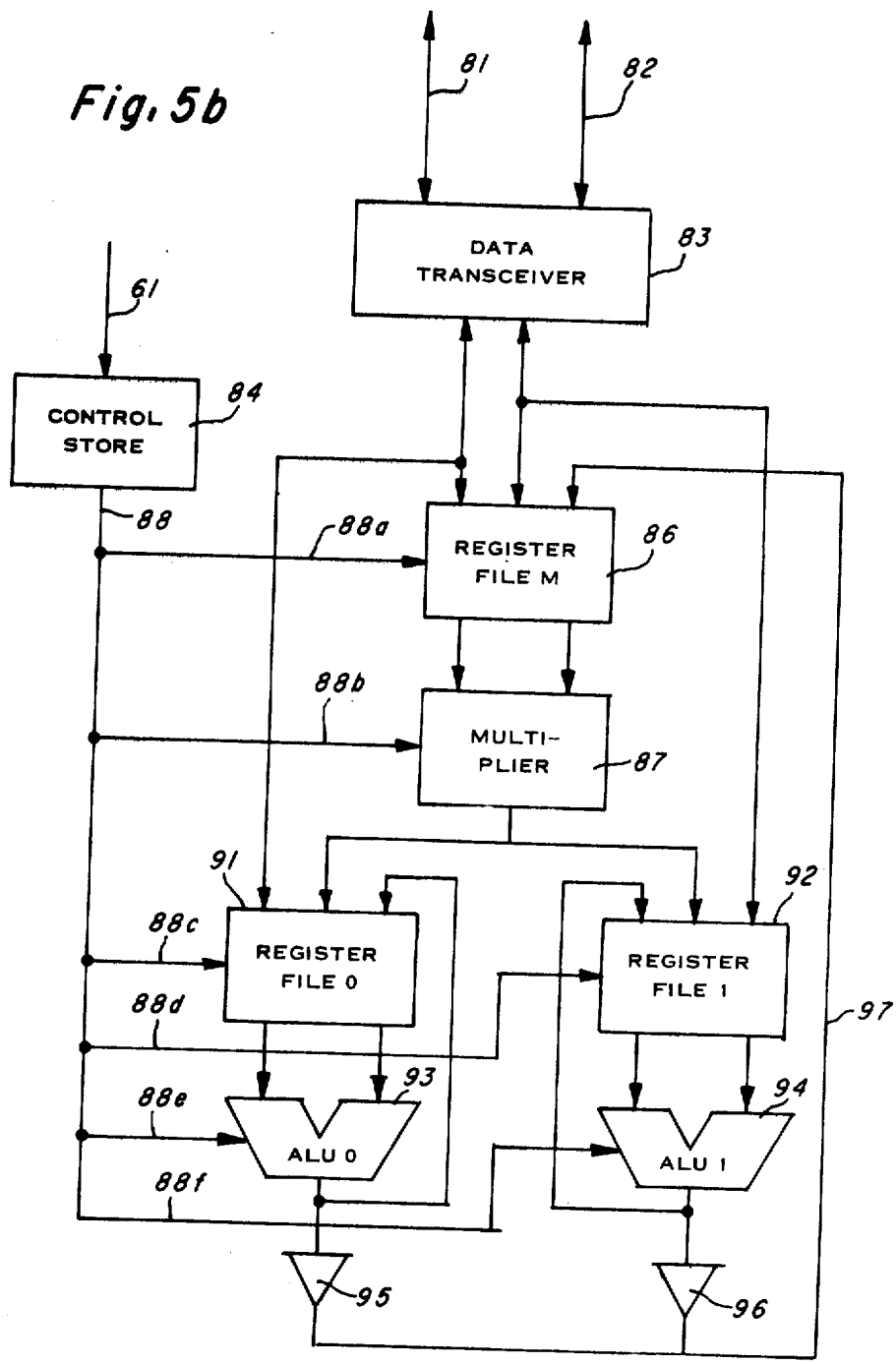
FIG. 5b is a block diagram of the CALU of the vector unit.

The data address generator arithmetic logic unit 72 is implemented in I²L circuitry and is fully described in a Texas Instruments internal specification attached hereto as Appendix A. Appendix A consists of numbered pages 3-79, dated Sept. 25, 1978; 35 pages of maps for the ALU PROMs (Programmable Read-Only Memory); 9 sheets of drawings No. 2054722, FSCM No. 96214. It should be noted that ALU93 and ALU94 of FIG. 5B are identical to ALU72 of FIG. 5A.

The data address generator arithmetic logic unit 72 provides a desired increment (or decrement) to the data address generator register 69 which in turn has outputs for the addressing of the data memory through the data memory access control 62 and address transceivers 51 or 52.

FIG. 20 illustrates the status register 63 of the VCU. Circuits 504-509 are dual-type flip-flops, Texas Instruments type 74LS74A described at page 6-56 of the TTL Data Book. Each unit has two flip-flops. The VCU parity error signal, /VCUPER, is applied to terminal 1CK, the clock input of the first flip-flop. Interrupt reset signal, INTRE, is applied to terminal 2CK which is the clock input of the second flip-flop. The D input of both flip-flops is connected to VCC. The 1PR and 2PR preset terminals for a pair of flip-flops in all of units 504–509 are tied together as are the 1CLR and 2CLR (clear inputs) of all flip-flops of each pair of flip-flops in each of the units 504–509. Unit 505 has a primary memory error input, PRIDMER, signal applied to terminal 1CK and a secondary memory error input, SECDMER signal applied to input 2CK. Circuit 506 has a data memory signal DMC6 applied to terminal 1CK and from the microcontroller a STACKER signal applied to terminal 2CK. Output/1Q of circuit 504 provides signal /MVCUPER; output /2Q of circuit 504 provides output signal /INT RE; output /1Q of circuit 505 provides /MPRDMER; output /2Q of circuit 505 provides output signal /MSECDMED; output /1Q of circuit 506 provides output signal /MDMC6; and output /2Q of circuit 506 provides output signal /MSTACKER. These 6 signals are abortive type signals and are sent to an OR gate (not shown) which provides any of these signals to the microcontroller which will then stop the operation.

The D inputs of all of the units 504–509 are connected to VCC.

The 1Q and 2Q outputs of circuit 504 are applied to terminals 2A and 3A of hex bus driver circuit 501. Outputs 1Q and 2Q of circuit 505 are applied as inputs to terminals 4A and 5A of circuit 501. Output 1Q of circuit 506 is applied to terminals 6A of circuit 501. Output 2Q of circuit 506 is applied to terminal 1A of circuit 502, also a hex bus driver. The outputs 1Q and 2Q of circuit 507 are applied to inputs 2A and 3A of circuit 502. Outputs 1Q and 2Q of circuit 508 are applied to input pins 4A and 5A of circuit 502. Output 1Q of circuit 509 is applied as an input to pin 6A of circuit 502. The enable gates /G1 and /G2 of units 501, 502 and 503 are all provided by signal /DMC5. The VCC inputs for units 501–503 are applied by signal VCCSTREG, coming from a power-down circuit identical to circuit 239 of FIG. 10, so that the units are energized only when being used.

Input 1A of circuit 501 is connected to VCC and inputs 1A–4A of circuit 503 are all grounded. Output 1Y–6Y from circuits 501 and 502 and outputs 1Y–4Y from circuit 503 are all sent to an optional display unit as signals D0–D15.

The inputs then to the status register, in the case of those units 504, 505, and 506 are inputs which are sent to the microcontroller for action. The other inputs are simply displayed on a optional display device. Errors could also be sent to the speech synthesizer of the type manufactured by Texas Instruments, for oral output.

Figure 21A:
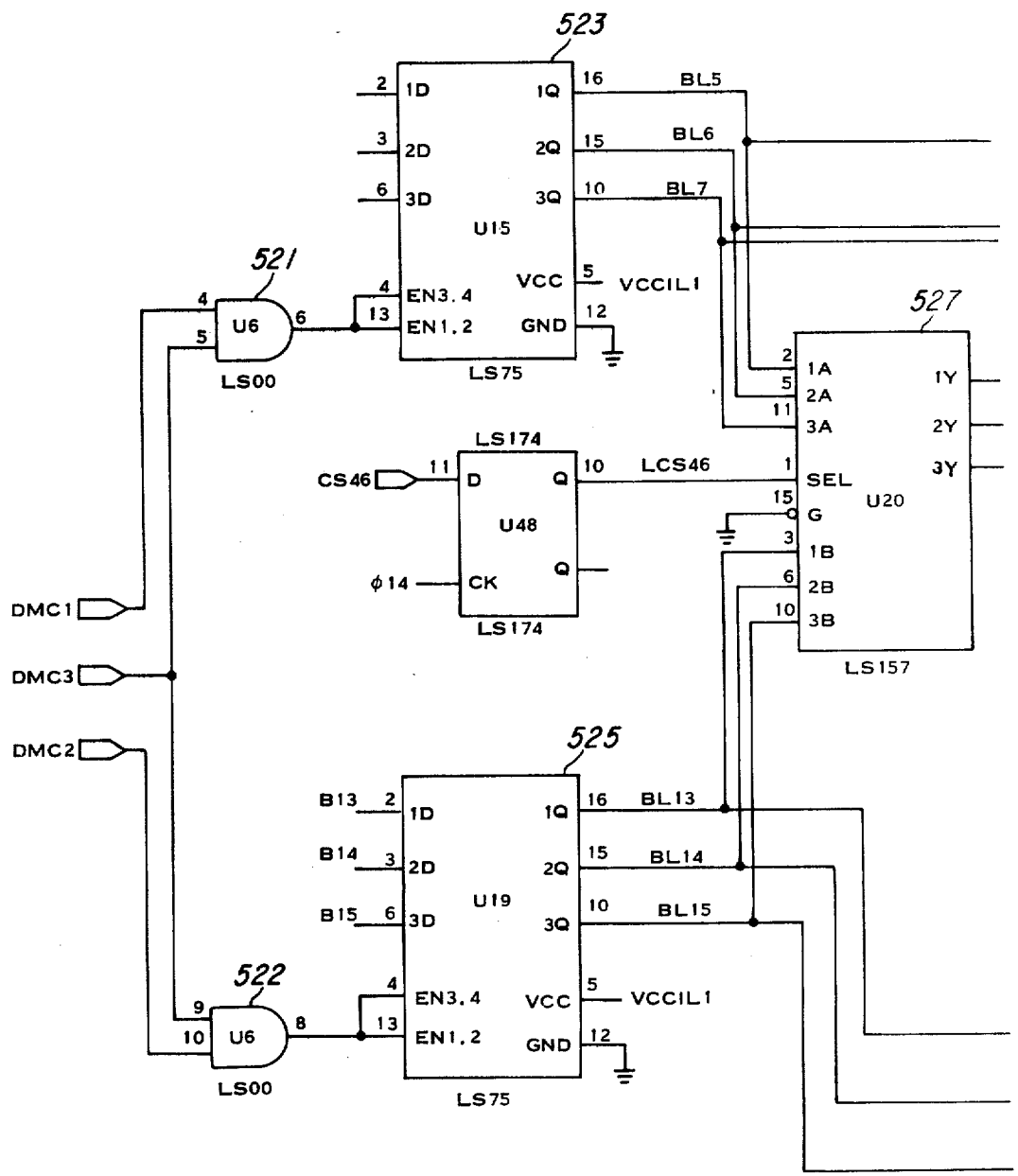
FIGS. 21a-21b form a schematic diagram of the bias register and associated circuitry of the VCU.
Figure 21B:
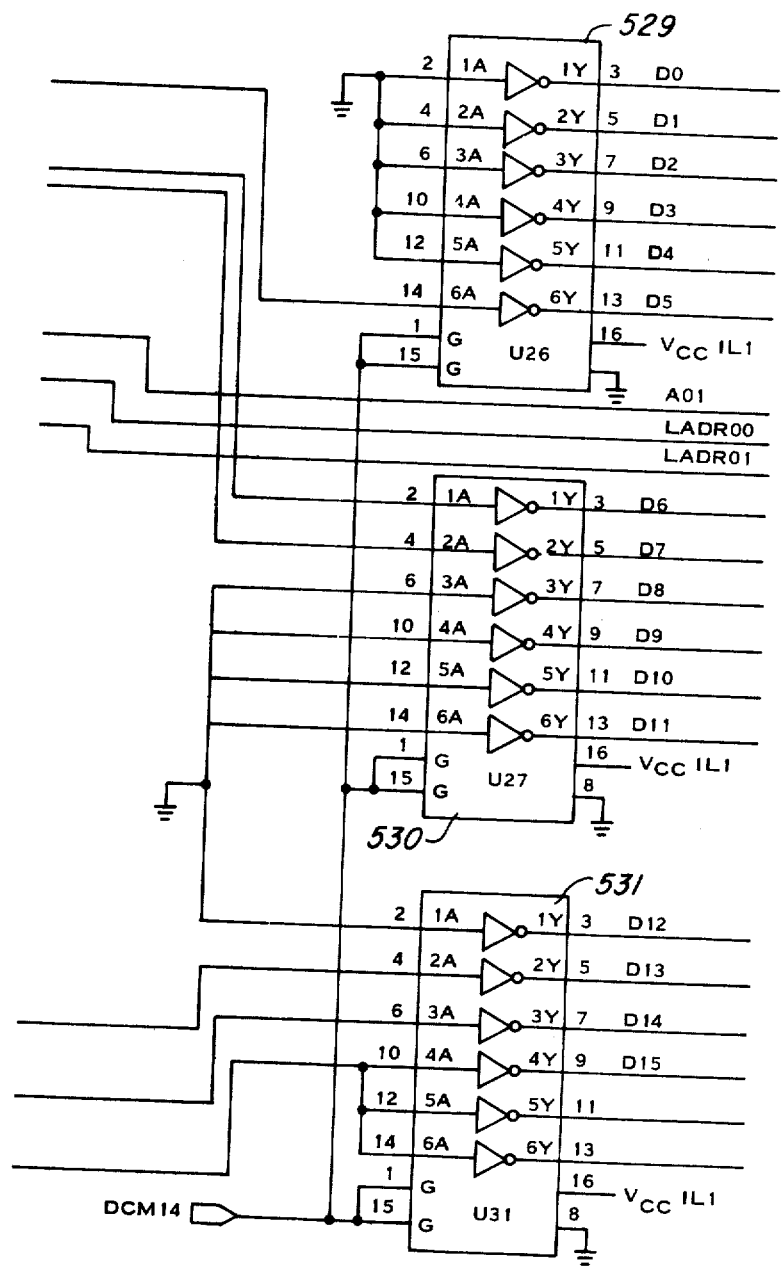

FIG. 21 illustrates the bias registers 67 and 68 in the data memory access control 62 of FIG. 5A. Control signals /DMC1 and /DMC2 are applied as inputs to AND circuits 521 and 522 respectively. Control signal /DMC3 is applied as an input to each of AND circuits 521 and 522. The output of AND circuit 521 and of AND circuit 522 is the enable input, respectively, for four flip flops in each of four bit bistable latch circuits 523 and 525. Input signals B5, B6 and B7 are applied to circuit 523 and latched on outputs 1Q, 2Q and 3Q as signals BL5, BL6 and BL7. In like fashion, input signals B13–B15 applied to the D inputs of the flip flops in circuit 525 appear on the output of the flip flops as BL13, BL14, and BL15. Signals BL5–BL7 are applied to inputs 1A–3A and signals BL13–BL15 are applied to inputs 1B–3B on multiplexer 527. Output 1Y, selecting between signals BL5 and BL13 provides an output signal A01. Output 2Y on circuit 527, selecting between signals BL6 and BL14 provides on output LADR00. Output 3Y of circuit 527, selecting between signal BL7 and signal BL15 provides an output LADR01. Signal CS46 (bit 46 in the control store) is applied to the D input of flip-flop 524 with phase 1 of 4 clock input to the clock input of flip-flop 524. The Q output is applied to the select input of multiplexer 527.

Three hex bus driver circuits 529–531 provide outputs. Inputs 1A–5A of circuit 529 are grounded with circuit 6A receiving signal BL5 as input and providing signal D5 as an output. Circuit 530 receives signals BL6 and BL7 on terminals 1A and 2A providing on output terminals 1Y and 2Y signals D6 and D7. Inputs 3A–6A of circuit 530 are all grounded providing outputs D8–D11. In circuit 529, the outputs corresponding to grounded inputs 1A–5A are D0–D4. Circuit 531 has input 1A grounded and signals BL13–BL15 applied to input terminals 2A-4A with corresponding output signals D12–D15. The enable signal for circuits 529–531 is /DMC14.

The bias registers 67 and 68, as indicated above, are simply for selection of upper half or lower half of the word.

Figure 22:
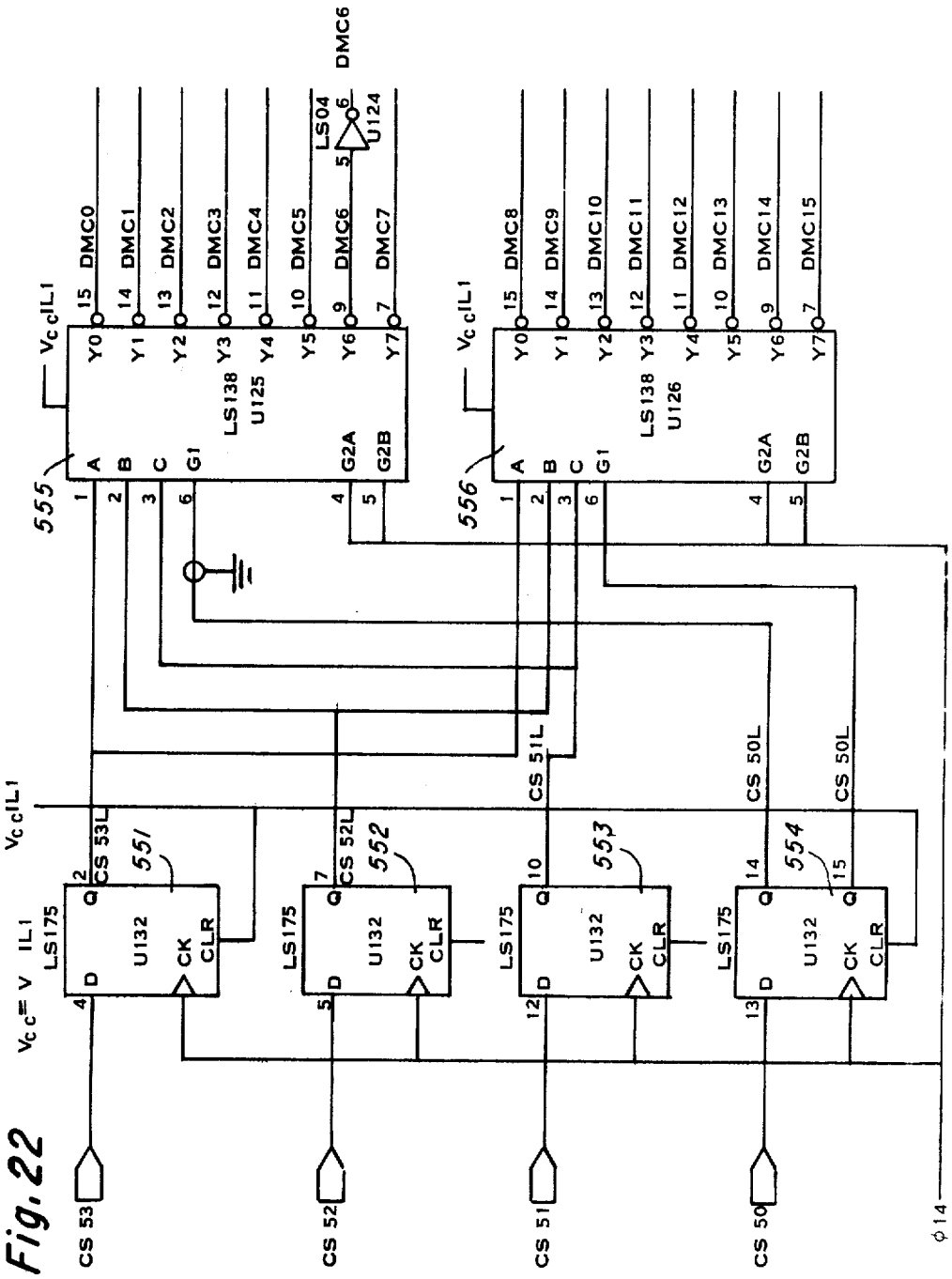
FIG. 22 is a schematic diagram of the circuitry used for decoding the micro instructions from the micro controller of the VCU.

FIG. 22 shows a portion of the control store for the micro-instruction decode. Control store bits CS50-53 are shown as inputs to flip flops 554, 553, 552 and 551, respectively. The Q outputs of flip flops 551–553 are applied to inputs A, B and C, respectively of circuits 555 and 556. These two circuits are 3–8 line decoders, Texas Instruments type 74LS138 described on page 7-134 of the TTL Data Book. The Q output of flip flop 554 is applied to the enable input G1 of circuit 556 and the /Q output of flip flop 554 is applied to the enable input G1 of circuit 555. Phase 1 of 4 clock is applied as the clock input to flip flops 551–554 and as enable inputs G2A and G2B of circuits 555 and 556. The output signals on Y0–Y7 of circuit 555 are /DMC0-/DMC7. The output on terminals Y0–Y7 of circuit 556 are DMC8-DMC15. The signal DMC6 and output Y6 of circuit 555 is inverted through inverter 557 and output is DMC6.

As mentioned earlier, the control store 73 represents ½ of 144 bit word, with the other half being represented in the control store 84 of FIG. 5B.

Figure 23A:
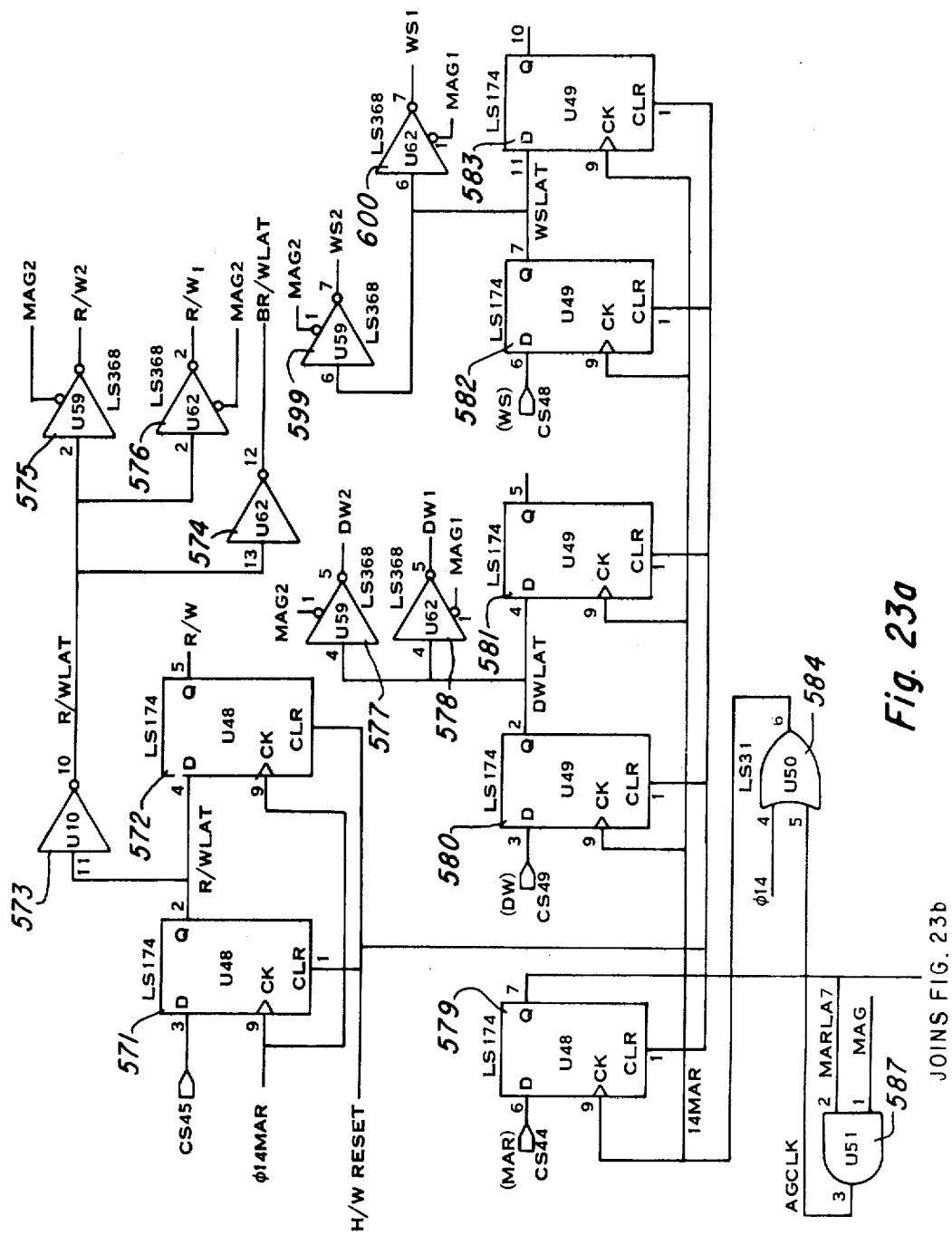
FIGS. 23a-23b form a schematic diagram of data memory control signal circuitry of the VCU.
Figure 23B:
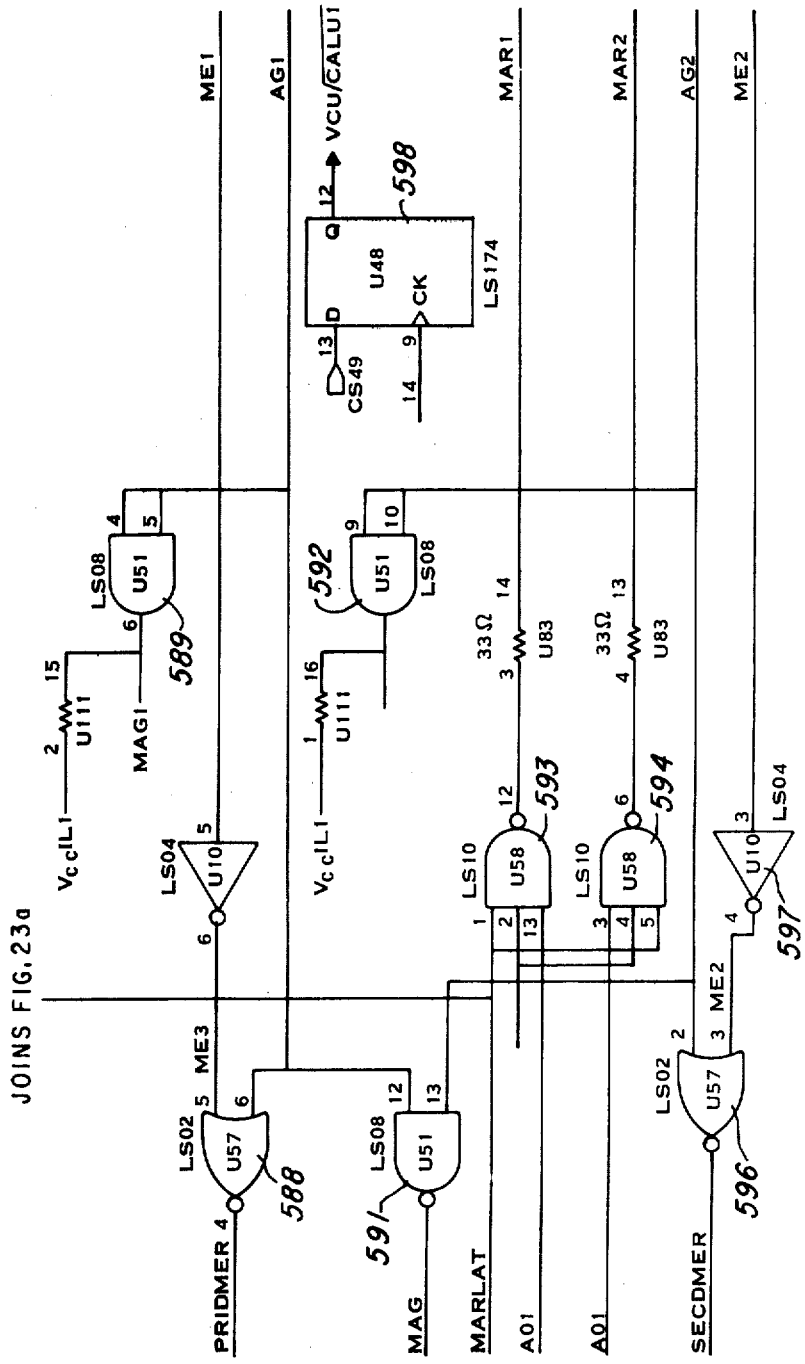

FIG. 23 tells the data memory access control 62 in detail. Control store bit 45 (CS45) is applied to the D input of flip flop 571 which is clocked by phase 1 of 4 MAR which also clocks flip flops 572, 579, 580, 581, 582 and 583. The clear input for the above mentioned flip flops comes from the /R/W reset signal.

The Q output of flip flop 571 is connected to the D input of flip flop 572 the Q output is the R/W signal. The Q output of flip flop 571 is inverted through inverter 573 and inverted again through inverter 575 which is gated by signal /MAG2 to provide output signal R/ /W2. The output of inverter 573 is inverted through inverter 576 gated by signal /MAG1 to provide signal R/ /W1. The output of inverter 573 is also inverted through inverter 574 to provide output signal BR//WLAT. The memory access request bit CS44 is applied as the D input of flip flop 579 whose Q output is an input to AND circuit 593. The DW signal, which is bit 47 of the control store, is applied to the D input of flip flop 580 whose Q output is connected to the D input of flip flop 581 and also to the input of inverter 577 into the input of inverter 578. Input inverter 577 is gated by signal /MAG2 providing output signal /DW2. Inverter 578 is gated by signal /MAG1 providing signal /DW1.

Signal WS, which is bit 48 of the control store, is applied as a D input of 582 whose Q output is a D input for flip flop 583 and also is an input to inverters 599 and 600. Inverter 599 is gated by signal /MAG2 providing output signal /WS2. Inverter 600 is gated by signal /MAG1 providing output signal /WS1. AND circuit 587 is provided with the signal MARLAT which is memory access request latched and /MAG, providing an output signal entitled AGCLK which serves as one input to OR circuit 584 whose other input is provided by phase 1 of 4 clock signal. The output then of circuit 584 is the phase 1 of 4 MAR clock signal for the flip flops mentioned above. Signal ME1 which is a memory error signal from the data memory is applied through inverter 585 to one input of OR circuit 588. The other input of OR circuit 588 is supplied by signal /AG1, an access granted signal which is also applied to AND gate 589 and to AND gate 591. The output of AND gate 581 is signal /MAG1 which is the memory access granted for unit 1 signal. The output of OR circuit 588 is signal PRIDMER which is the primary data memory error signal mentioned above. The other input to AND gate 591 is signal /AG2 which access granted for unit 2 providing an output from AND circuit 591 which is signal /MAG, memory access granted. Signal A01 is applied as another input to NAND circuit 593 with signal /MP providing the third input. The output of NAND circuit 593 is signal /MAR1 memory access request, primary memory. The NAND circuit 594 has as inputs signal MARLAT, signal A01 and signal /MP to provide output signal /MAR2 for the secondary data memory. Signal /AG2 is an input to AND circuit 592 whose output is /MAG2. Signal /AG2 is also one input to NOR circuit 596. Signal ME2 is inverted through 597 and is the other input to NOR circuit 596 whose output is signal SECDMER which is a secondary memory error signal mentioned earlier. Control store bit 49 is applied to the D input of flip flop 598 which is clocked by phase one of 4 clock. The Q output of flip flop 598 is the signal VCU//CALU1.

The above description graphically illustrates the various control signals generated for control of the memory.

Figure 24A:
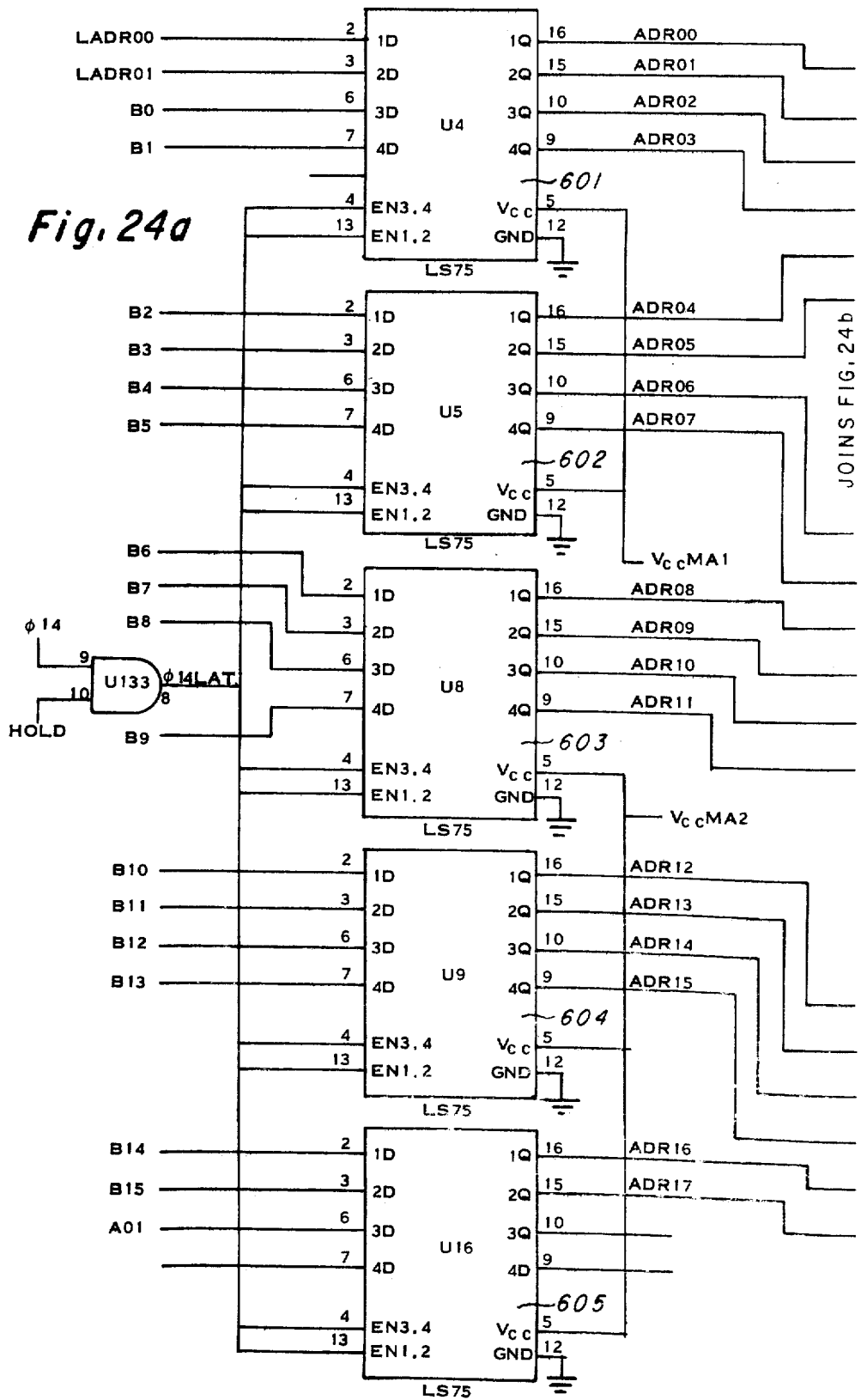

The address transceivers 51 and 52 of FIG. 5a are shown in detail in FIG. 24. Five circuits, 601-605, each containing four flip flops are shown. Page numbers LADR00 and LADR01, signals to select the appropriate memory, are provided to flip flop inputs 1D and 2D respectively. Signals B0 and B1 from data address generator register 69 are connected to inputs 3D and 4D of circuit 601. Signals B2-B5 are connected to inputs 1D-4D of circuit 602; signals B6-B9 are connected to input 1D-4D of circuit 603; signals B10-B13 are connected to inputs 1D-4D of circuit 604; and signals B14, B15 and A01 are connected to inputs 1D-3D of circuit 605. Signal /Phase 1 of 4 clock is applied to AND gate 623 with signal /HOLD from the microcontroller applied as a second input with output signal /Phase 14 LAT connected to the enable inputs of circuits 601-605. The output signals of circuits 601 on outputs 1Q-4Q, on 602 outputs 1Q-4Q, on 603 outputs 1Q-4Q and on 604 outputs 1Q-4Q and 605 outputs 1Q and 2Q are ADR-00-ADR17. Output signals ADR00-ADR05 are applied to the inputs of hex bus driver inverter circuit 606. Address output signals ADR06-ADR11 are applied as inputs to hex bus inverter driver 610. Output address signals ADR12-ARD17 are applied as inputs to hex bus driver inverter circuit 612. Signal ADR00 after having been inverted is designated signal RPADR00 and this passes through pull up resistor 607 and becomes output signal PADR00. In like fashion all of the output address signals are inverted and passed through respective resistors becoming signals PADR01-PADR17. Signal /MAG1 is the enabling signal for circuits 606, 610 and 612. Note that the input voltage to these three circuits is VCC MA1 provided on the VCC input 10. Voltage is provided from a circuit identical to circuit 239 of FIG. 10 so that the drivers are energized only when required.

Hex bus driver inverters 614, 618 and 620 receive inputs ADR00-ADR17 and pass through pull up resistors providing secondary memory address signals SADR00-SADR17. It can be seen that the secondary address transceivers are identical to the primary.

Figure 25A:
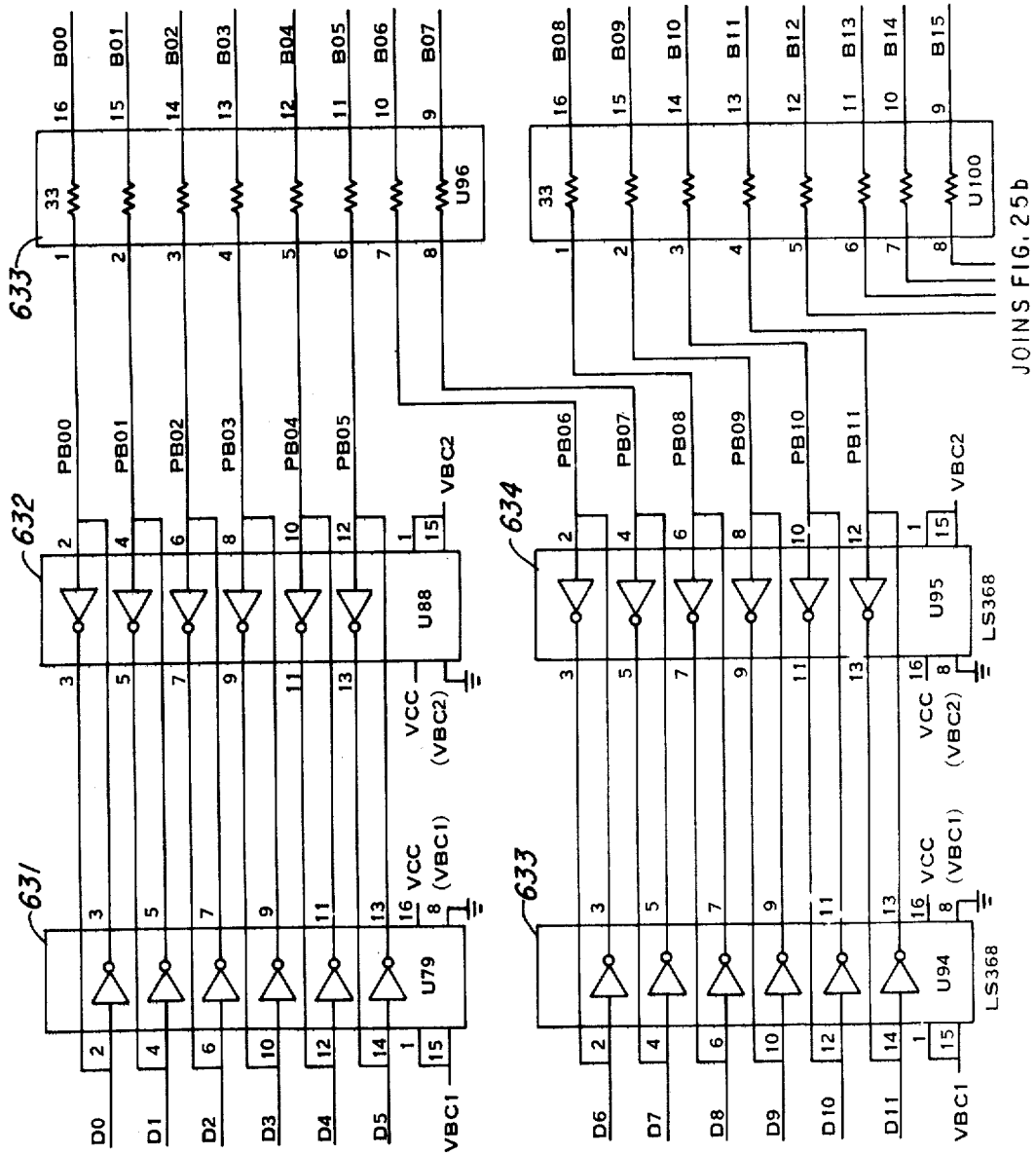
FIGS. 25a-25b form a schematic diagram of the data transceiver of the VCU.
Figure 25B:
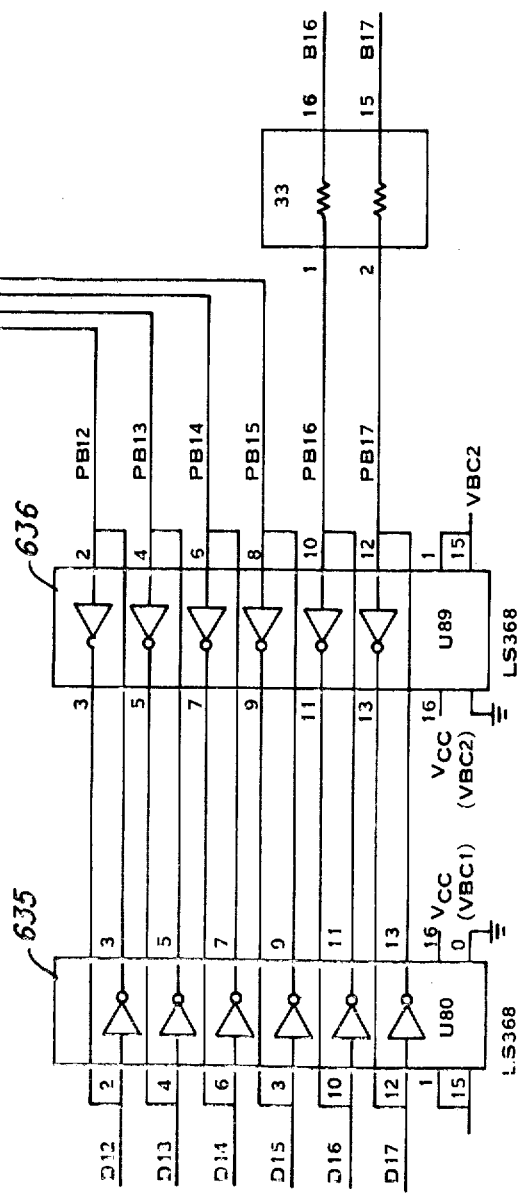

FIG. 25 illustrates the data transceiver 53. Signals D0-D17 from the VC11 are applied as inputs to hex bus driver inverter circuits 631, 633 and 635 providing outputs which pass through resistors, finally resulting in signals /B00-/B17. Likewise, signals /B00-/B17 are applied to hex bus driver inverters 631, 634 and 636 resulting in signals D0-D17.

Turning back to FIG. 5b, the complex arithmetic logic unit is shown in block detail. Control store 84 connected to control store 73 by bus 61 is connected by bus 88a to register file M86, to multiplier 87 by bus 88b, to register file 0-91 by bus 88c, to register file 1-92 by bus 88d, to ALU0-93 by bus 88e, and to register ALU1-94 by bus 88f. Data transceiver 83 is connected to register file 86 which is connected to multiplier 87. Multiplier 87 connects to register file 91 and register file 92 which in turn connect respectively to ALU93 and ALU94. The output of ALU93 is amplified through amplifier 95 and connected to the output of amplifier 96 which amplifies the output of ALU94. The outputs of amplifier 95 and 96 are returned to register file M86. Register files 86, 91 and 92 are identical to address generator file 69. ALU93 and ALU-94 are identical to the data address generator ALU 72 of FIG. 5A.

The multiplier 87 is fully described in a Texas Instruments internal specification which is included herewith as appendix C. Appendix C comprises pages 4-29, sheet 30 and page 31 dated Nov. 22, 1978 with 20 sheets of drawings, drawing number 2054728 FSCM No. 96214. This multiplier is very fast and extremely useful in vector computations, the result of the multiplier being sent into the register files 91 and 92 for further arithmetic operations in ALU93 and ALU94.

Figure 26A:
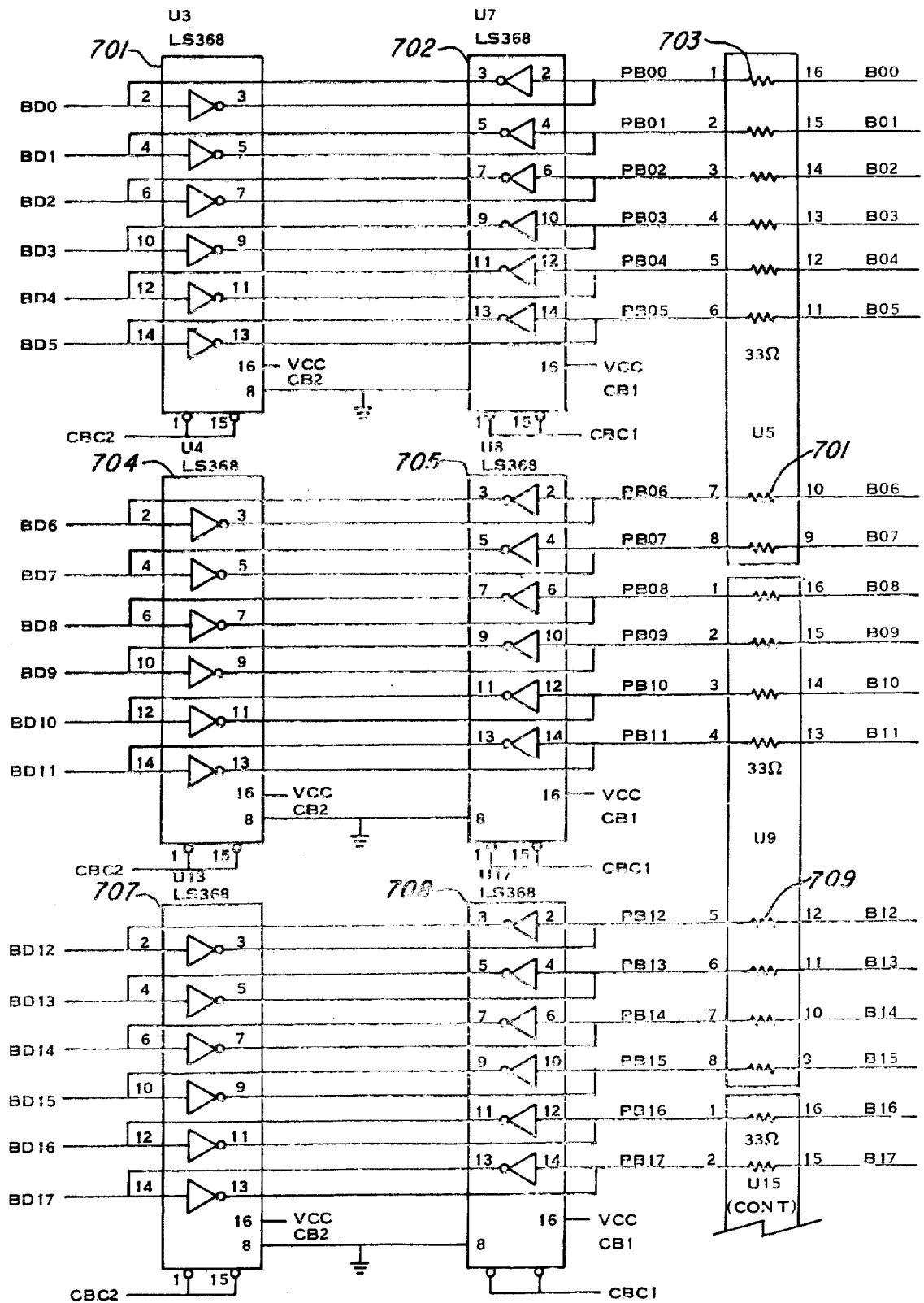
FIGS. 26a-26b form a schematic diagram of the primary data memory transceiver for the CALU.
Figure 26B:
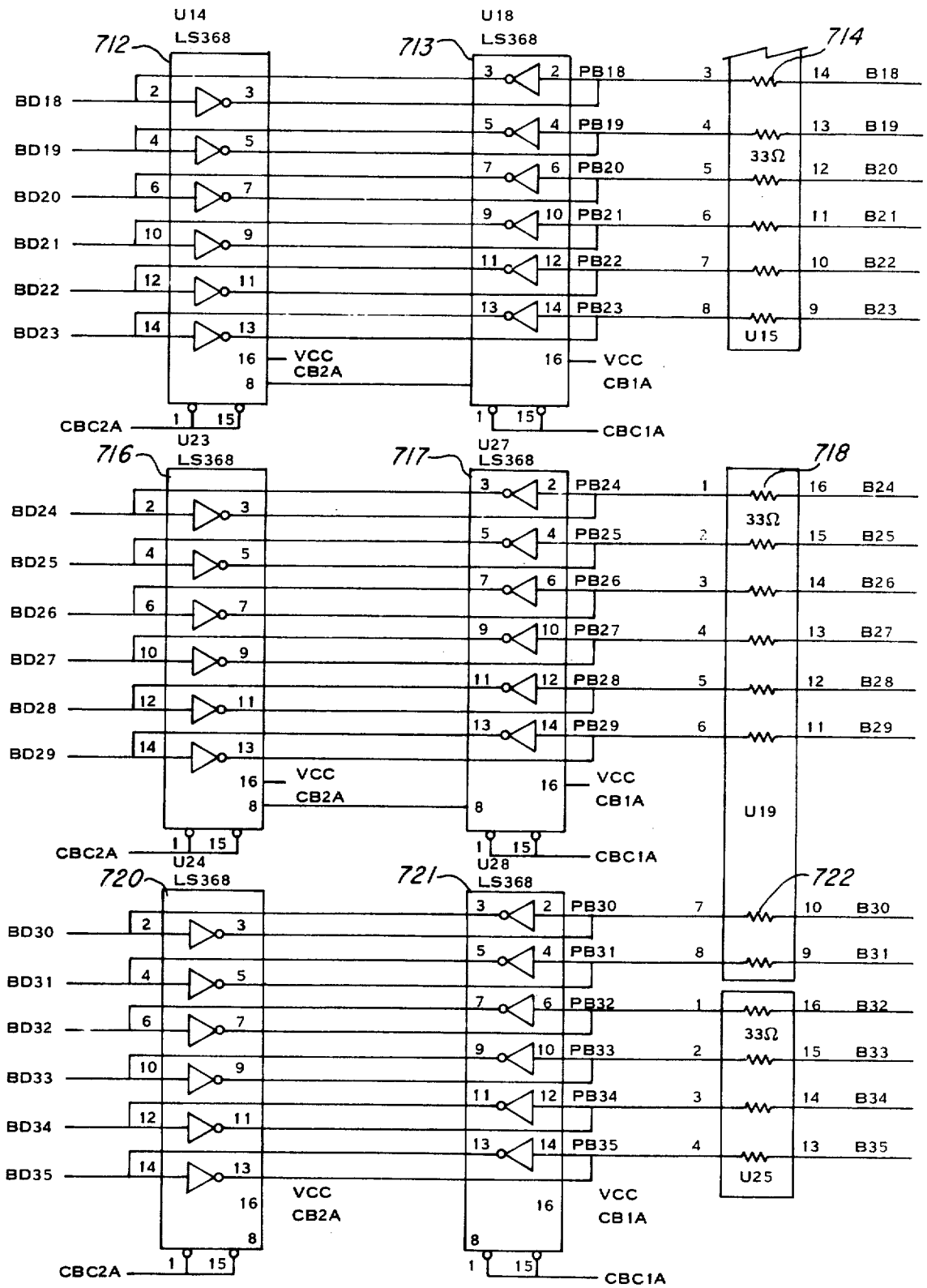

FIG. 26 illustrates the data transceiver 83. It is identical to the data transceiver FIG. 25 except as to its size. That is, hex bus driver inverters 701, 704, 707, 712, 716, and 720 are paired with hex bus driver inverters 702, 705, 708, 713, 717, and 721, respectively. This enables the signals at the CALU namely BD0-BD35 to be inverted and transformed to signals /B00-/B35. Likewise signals /B00-/B35 are inverted through the hex bus driver inverters to reappear at the CALU as signals BD0-BD35.

Figure 27A:
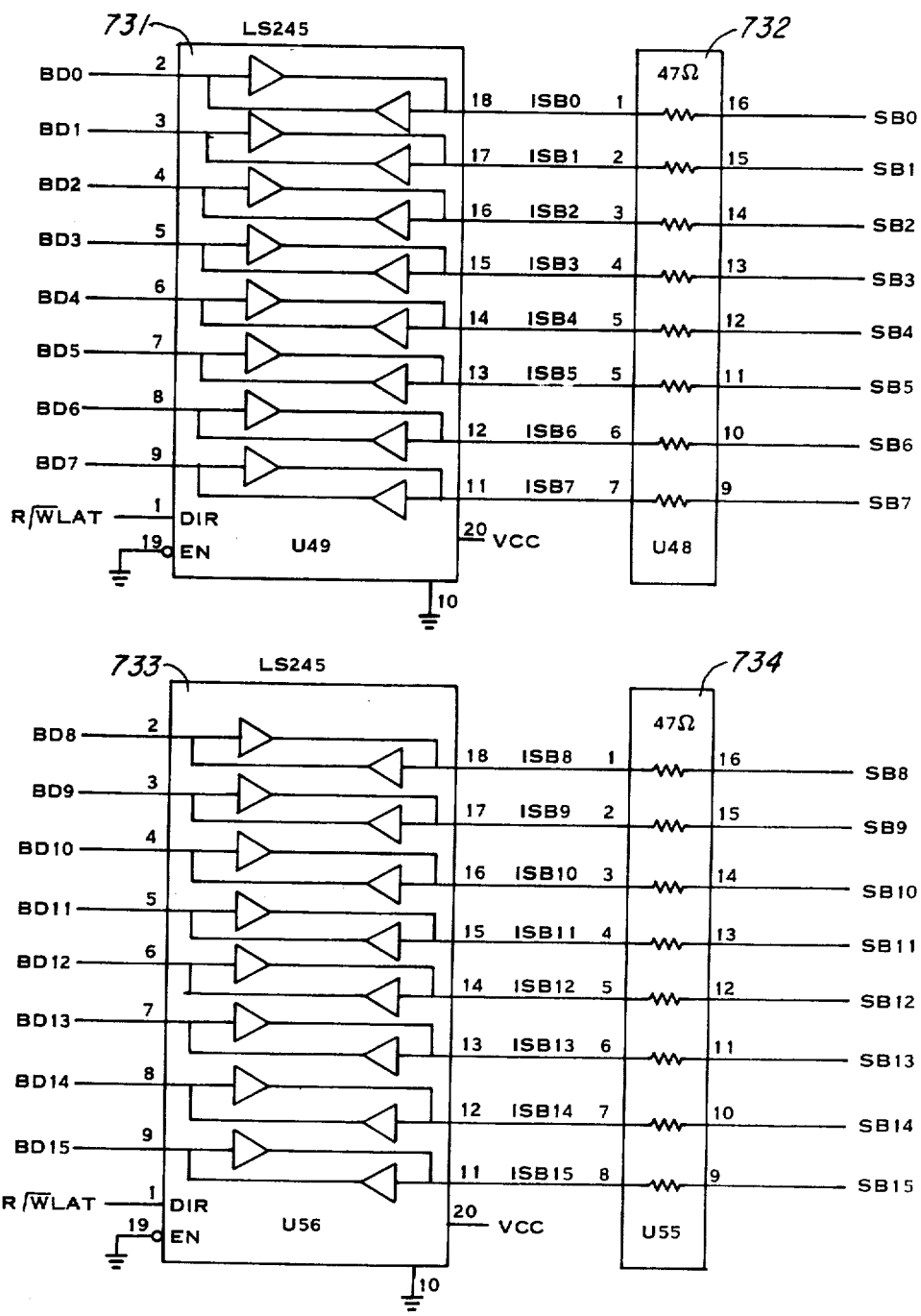
FIGS. 27a-27c form a schematic diagram of the secondary data memory transceiver for the CALU.
Figure 27B:
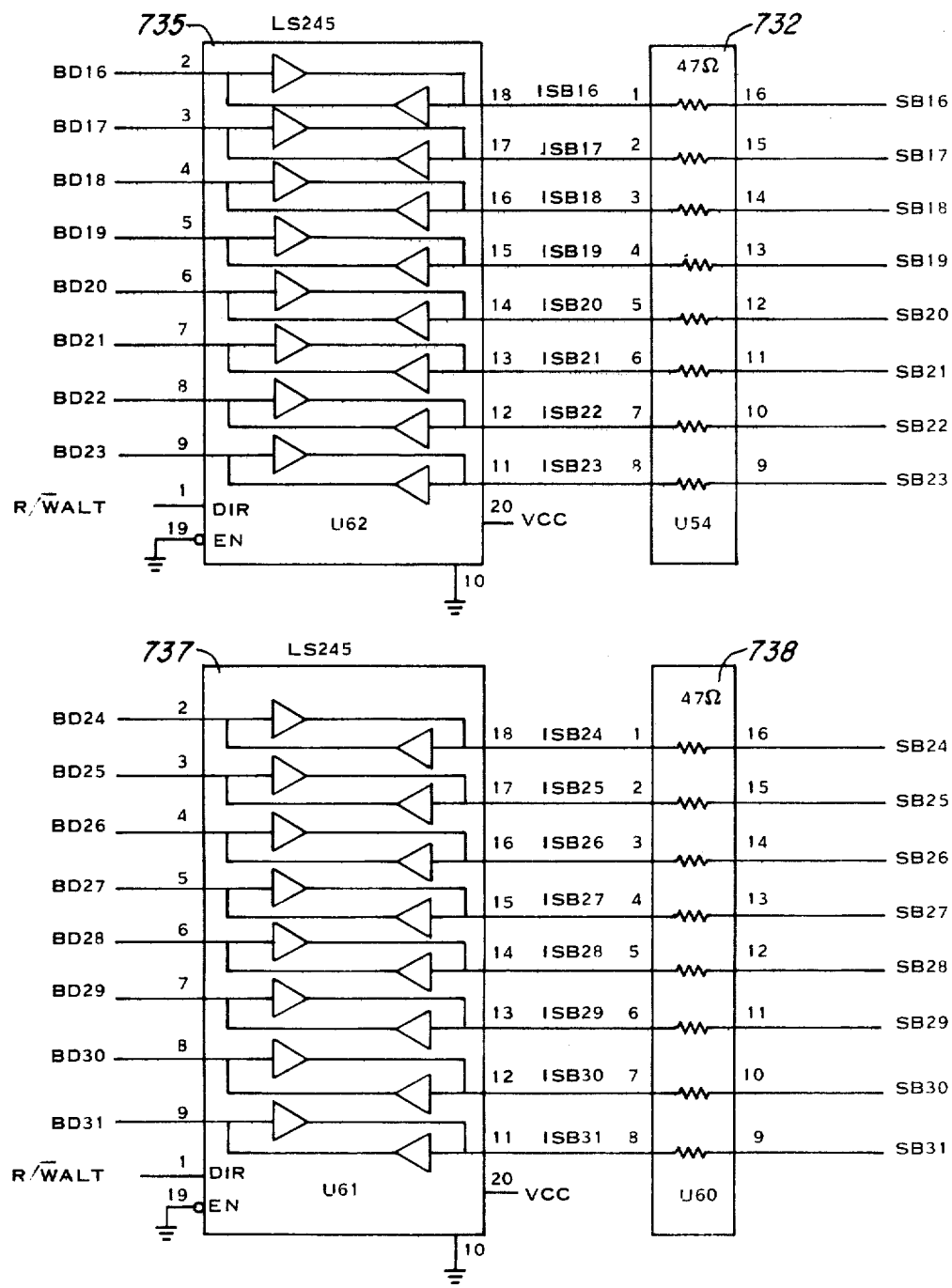
Figure 27C:
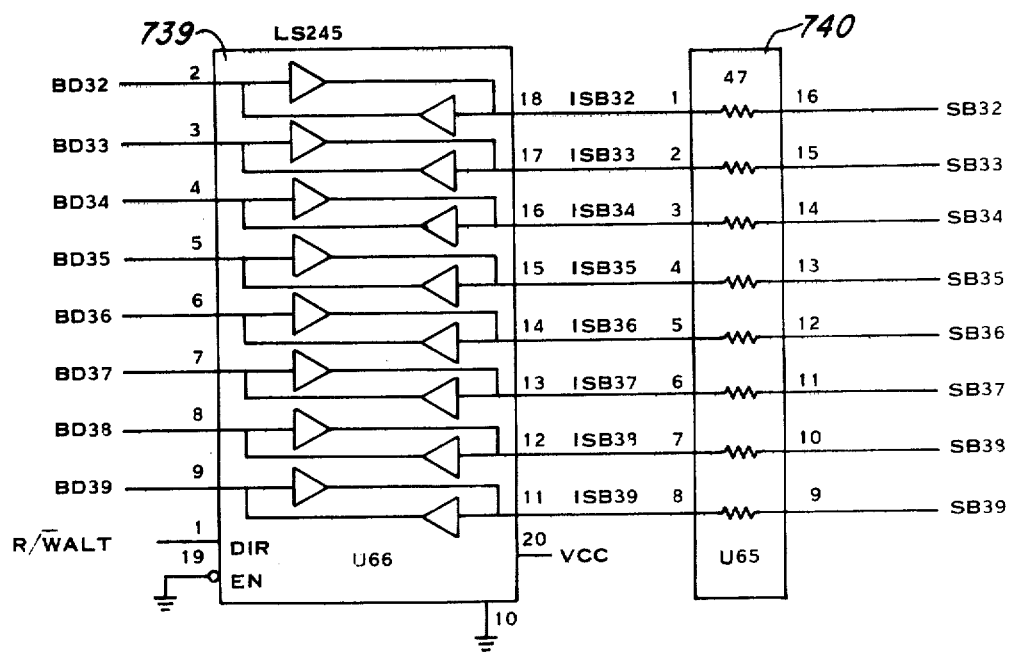

FIG. 27 is a schematic of the secondary data transceiver which is not shown in FIG. 5b. In this configuration, circuits 731, 733,735,737 and 739 are employed. They are Texas Instruments type 74LS 245 octal bidirection 21 bus transceiver, with signals BD0-BD35 at the CALU being inverted and passed through resistors to become signals SB0-SB35. In the reverse, signals SB0-SB35. In the reverse, signals SB0-SB35 are inverted through the bidirectional bus transceivers to become BD0-BD35.

Figure 6:
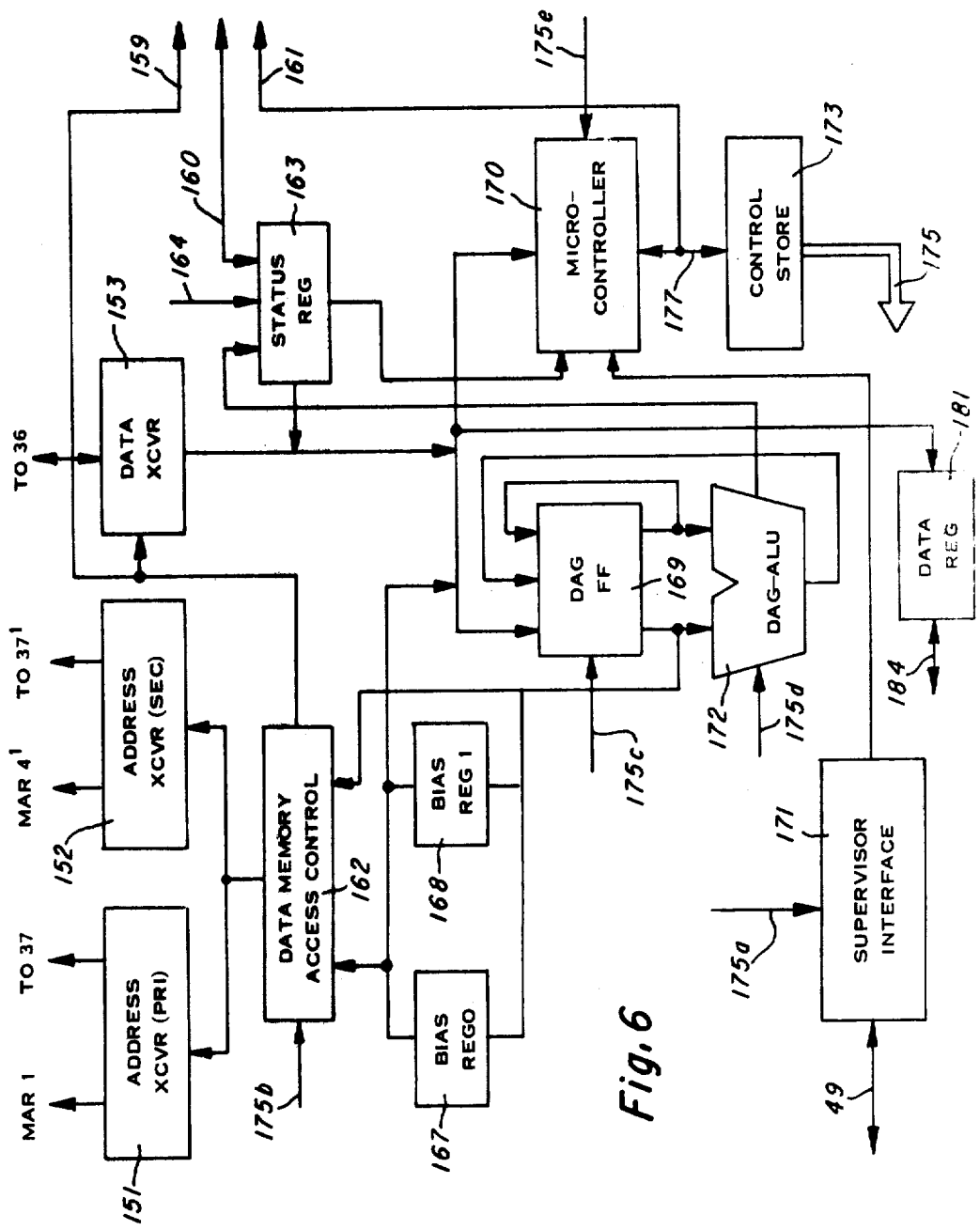
FIG. 6 is a block diagram of the input and output controller of FIG. 1.

Turning now to FIG. 6, a common circuit for the input controller 16 and the output controller 14 of FIG. 1 is shown. It is identical in all aspects to FIG. 5a except for the addition of a data register 181. Data, in the case of the input controller comes in on bus 184 in the data register 181 and from there it is chained to the data address generator 169 to the microcontroller 170 and to data transceiver 153. In the case of the output controller, the data taken from the data memory 11 of FIG. 1 is sent out on bus 184 to the outside world.

PREFERRED MODE OF OPERATION

The appropriate command parameter lists (CPL) are stored in the data memory. The CPL provides the starting addresses for the source operands and for the destination operands, the address increment for all program loops, and lengths of all program loops.

The system may be started from a panel or it may be connected to a host computer. In either event, the first instruction is sent into the instruction register of the microprocessor. Typically, the microprocessor will invoke the input controller shown in FIG. 5B through the supervisor interface 171. When invoked, the input control begins taking data (previously digitized) into its data register 181 and outputting through the data transceiver 153 to the data memory at the address selected by the combination of the data address generator arithmetic logic unit 172 and the data address generator 169. The address there generated is sent through the data memory access control to the appropriate address transceiver 151 which provides the series of addresses for the incoming data.

If the configuration of FIG. 2 is employed, then it may well be that address transceiver 152 is activated to store incoming data in, for example, data memory section 2 which is considered as a secondary memory.

With the data stored in the data memory 11, supervisor 12 next invokes the vector unit 13 through the supervisor interface 71. The micro controller 70 shown in FIG. 5A is the controller for the entire vector unit including the complex arithmetic logic unit shown in FIG. 5B. Once invoked, the micro-controller 70 goes through address transceiver 51 (or 52 if multiple vector units are being used) to get the address of the CPL from a dedicated location in the data memory. The VCU then acquires the command parameters from the communications area of the data memory and initiates the operation defined by the CPL. The CPL provides the starting addresses with the address of each element in the vector then being calculated and the data accessed at the appropriate time. The data address generator register 69 outputs an address and simultaneously calculates the address for the next memory cycle.

Sequences of micro instructions stored in the control store 73 of FIG. 5A and the control store 84 of FIG. 5B direct the operation of the CALU and the vector unit accesses to the data memory. Under direction of the VCU, the CALU begins its computations. A 16 bit word may be used in computation, or a 32 bit word may be used. The 32 bit word is formed by taking a first word from the data memory and then the word at the next address as generated through the mechanism illustrated in FIG. 17. That is, when/A19 equal 1, the next word is also referenced. The two words are then output in parallel through data transceiver 83 to register file 86 and to multiplier 87. The multiplier 87 is a two-stage combinatorial 16×16 signed multiplier. The multiplier forms a 32 bit signed fractional product. In the first stage, a 16-bit signed fractional multiplicand and a 16-bit signed fractional multiplier are read from the register file, a partial product formed and latched. In the second stage, the product is completed, the 16 most significant bits of the product are output to one of the ALU register files 91 or 92 and the 16 less significant bits are latched internally for output on the subsequent clock if desired. Both stages of the multiplier operate in parallel on two independent multiplications. An incoming 32 bit word also may have the upper 16 bits interchanged with the lower 16 bits through the word swap multiplixer shown in FIGS. 19 and 20. Such an interchange is also available when storing results into the data memory.

The loading of register files 91 and 92 is performed simultaneously with multiplier operation. A 32-bit double-word from memory can be loaded into consecutively even-odd locations of the multiplier register file. Simultaneously, the ALU result from ALU 93 or 94 can be written into the multiplier register file 91 or 92. The multiplier also is capable of supporting a 32-bit product, 32-bit multiplicand, and a 16-bit multiplier, signed, fractional multiplication.

The primary function of ALU 93 and 94 is single precision two's complement fractional addition and subtraction. These are two forms of these operations: (1) simple fixed point addition and subtraction, and (2) addition and subtraction with the results shifted right one bit and rounded. The ALU's 91 and 92 also support multiple precision two's complement addition and subtraction.

A micro controller 70, when the micro code in control store 73 and control store 84 has been completed, indicates, over bus 49 to the supervisor 12 by way of the interrupt control 45 of FIG. 4, that the operation has been completed. The operations that are performed, as indicated above, are stored in the control stores 73 and 84. Those operations, in this preferred embodiment, are shown in FIGS. 28A–28D which indicate the "1's" and "0's" in hexidecimal code, the maps of the vector arithmetic algorithms, which in this preferred embodiment, are specifically magnitude approximation—FIG. 28A; Vector Multiply—FIG. 28B; Vector addition—FIG. 28C; Vector subtraction—FIG. 28D. At the conclusion of the arithmetic operation, the vector unit stores the results in data memory and an address is specified by the data address generator combination 69 and 72. The supervisor 12 then invokes the output controller 14 (identical to the input controller shown in FIG. 6) through the supervisor interface 171. The output controller then brings the data out through data register 184 to the outside world.

While this invention has employed the I²L and TTL circuit implementation, it is not to be inferred that the invention is limited to such implementation. Complementary MOS, for example, may be employed. Also, the size of the various memories, the types of multipliers, ALU's, microcontroller and micro-processor are optional and no limitation to those specifications herein is intended. The scope of this invention is defined by the appended claims.

What is claimed is:

1. A micro-vector multi-processor system comprising:
   (a) supervisor means for controlling the operation of the system;
   (b) at least one data memory means connected to the supervisor means for storage and retrieval of digital information;

(c) input/output means connected to the supervisor means and the data memory means adapted to receive input signals to be processed and to store the signals in the data memory means, and to retrieve processed signals from the data memory means and to output the processed signals; and (d) at least one vector computation means connected to the supervisor means and to the data memory means, responsive to the supervisor means for performing vector computations autonomously relative to the supervisor means, adapted to retrieve digital information from the data memory means required for the vector computations.

2. The system of claim 1 wherein the data memory means comprises:

(b) (i) a memory array for storing digital information; and (ii) a memory control connected to the memory array, for receiving addresses and for addressing the memory array.

3. The system of claim 1 wherein the input/output means comprises:

(c) (i) an input controller having means for generating addresses at which incoming data signals will be stored in the data memory means; and (ii) an output controller having means for generating addresses from which processed data signals are retrieved from the data memory means.

4. The system of claim 1 wherein the vector computation means includes a micro controller and a read-only memory connected to the micro controller for directing the operation of the micro controller.

5. The system of claim 1 wherein the supervisor means comprises a microprocessor, a randon access memory connected to the microprocessor for storage of at least data and a read-only memory connected to the microprocessor for storage of instructions for the microprocessor.

6. The system of claim 5 wherein the data memory means comprises:

(b) (i) a memory array for storing digital information; and (ii) a memory control connected to the memory array, for receiving addresses and for addressing the memory array.

7. The system of claim 2 wherein the vector computation means includes a micro controller and a read-only memory connected to the micro controller for directing the operation of the micro controller.

8. The system of claim 7 wherein the data memory means comprises:

(b) (i) a memory array for storing digital information; and (ii) a memory control connected to the memory array for receiving addresses and for addressing the memory array.

9. The system of claim 8 wherein the input/output means comprises:

(c) (i) an input controller having means for generating addresses at which incoming data signals will be stored in the data memory means; and (ii) an output controller having means for generating addresses from which processed data signals are retrieved from the data memory means.

10. The system of claim 9 wherein the memory array is a random access memory.

11. The system of claim 10 wherein the micro controller, the microprocessor, the means for generating addresses in the input controller and the means for generating addresses in the output controller are implemented in I²L circuitry.

12. An integrated circuit, micro-vector, multi-processor system comprising:

(a) supervisor means having a microprocessor for controlling the operation of the system and a program memory connected to the microprocessor for supplying data and instructions to the microprocessor, interrupt control means connected to the microprocessor for sending and receiving control signals, and address generating means connected to the microprocessor;

(b) at least one data memory means connected to the supervisor means for storage and retrieval of digital information;

(c) input/output means connected to the interrupt control means of the supervisor means and to the data memory means, adapted to receive input signals to be processed and to store the signals in the data memory means, to retrieve processed signals from the data memory means and to output the processed signals; and (d) at least one vector computation means connected to the interrupt control of the supervisor means and to the data memory means, responsive to the supervisor means for performing vector computations autonomously relative to the supervisor means, adapted to retrieve digital information from the data memory means required for the vector computations.

13. The system of claim 12 wherein the input/output means comprises:

(c) (i) an input controller having means for generating addresses at which incoming data signals will be stored in the data memory means; and (ii) an output controller having means for generating addresses from which processed data signals are retrieved from the data memory means.

14. The system of claim 12 wherein the vector computation means includes a micro controller and a read-only memory connected to the micro controller for directing the operation of the micro controller.

15. The system of claim 12 wherein the data memory means comprises:

(b) (i) a memory array for storing digital information; and (ii) a memory control, connected to the memory array, for receiving addresses and for addressing the memory array.

16. The system of claim 15 wherein the vector computation means includes a micro controller and a read-only memory connected to the micro controller for directing the operation of the micro controller.

17. The system of claim 16 wherein the input/output means comprises:

(c) (i) an input controller having means for generating addresses at which incoming data signals will be stored in the data memory means; and (ii) an output controller having means for generating addresses from which processed data signals are retrieved from the data memory means.

18. The system of claim 17 wherein the memory array is a random access memory.

19. The system of claim 18 wherein at least the microprocessor, the input and output controllers' means for generating addresses and the micro controller are implemented in I²L circuitry.

20. An integrated circuit micro-vector multiprocessor system comprising:
(a) supervisor means for controlling the operation of the system;
(b) at least one data memory means connected to the supervisor means for storage and retrieval of digital information;
(c) input/output means connected to the supervisor means and to the data memory means, adapted to receive input signals to be processed and to store the signals in the data memory means, and to retrieve processed signals from the data memory means and to output the processed signals; and
(d) at least one vector computation means having a micro controller for controlling vector computations, a read-only memory electrically connected to the micro controller for directing the operation of the micro controller, interface means electrically connected to the micro controller and to the supervisor means, address generating means for addressing the data memory means, and complex arithmetic means electrically connected to the data memory means for receiving data to be processed and for transmitting processed data to the addresses generated by the vector address generating means, the complex arithmetic means also electrically connected to the micro controller to perform specified vector computations.

21. The system of claim 20 wherein the data memory means comprises:
(b) (i) a memory array for storing digital information;
(ii) a memory control connected to the memory array, for receiving addresses and for addressing the memory array; and
(iii) a word swap multiplexer, connected to the memory array for receiving data to store and for retrieving data from the memory array, having means for selectively interchanging the upper portion of a data word with the lower portion of the data word.

22. The system of claim 21 wherein the memory control comprises means for arbitrating simultaneous requests for use of the data memory means from the input/output means, the supervisor means and the vector computation means.

23. The system of claim 21 wherein the memory control comprises means for selectively retrieving the next word in the memory array following the addressed word and transmitting the next word in parallel either into or out of the memory array.

24. The system of claim 23 wherein the memory control comprises means for arbitrating simultaneous requests for use of the data memory means from the input/output means, the supervisor means and the vector computation means.

25. The system of claim 20 wherein the input/output means comprises:
(c) (i) an input controller having means for generating addresses at which incoming data signals will be stored in the data memory means; and (ii) an output controller having means for generating addresses from which processed data signals are retrieved from the data memory means.

26. The system of claim 25 wherein the micro controller, the complex arithmetic means, and the means for generating addresses in the input and output controllers are implemented in I$^2$L circuitry.

27. The system of claim 26 wherein the memory array is a random access memory.

28. An integrated circuit, vector multi-processor system comprising:
(a) supervisor means having a microprocessor for controlling the operation of the system and a program memory connected to the microprocessor for supplying data and instructions to the microprocessor, interrupt control means connected to the microprocessor for sending and receiving control signals, and address generating means connected to the microprocessor;
(b) at least one data memory means connected to the supervisor means for storage and retrieval of digital information;
(c) input/output means connected to the interrupt control means of the supervisor means and to the data memory means, adapted to receive input signals to be processed and to store the signals from the data memory means, to retrieve processed signals from the data memory means and to output the processed signals; and
(d) at least one vector computation means having a micro controller for controlling vector computations, a read-only memory electrically connected to the micro controller for directing the operation of the micro controller, interface means electrically connected to the micro controller and to the supervisor means, address generating means for addressing the data memory means, and complex arithmetic means electrically connected to the data memory means for receiving data to be processed and for transmitting processed data to the addresses generated by the vector address generating means, the complex arithmetic means also electrically connected to the micro controller to perform specified vector computations.

29. The system of claim 28 wherein the data memory means comprises:
(b) (i) a memory array for storing digital information;
(ii) a memory control connected to the memory array, for receiving addresses and for addressing the memory array; and
(iii) a word swap multiplexer, connected to the memory array for receiving data to store and for retrieving data from the memory array, having means for selectively interchanging the upper portion of a data word with the lower portion of the data word.

30. The system of claim 29 wherein the memory array is a random access memory.

31. The system of claim 30 wherein the micro controller, the microprocessor, the complex arithmetic means, and the input and output controllers' means for generating addresses are implemented in I$^2$L circuitry.

* * * * *